(12) United States Patent
Chavan Patil et al.

(10) Patent No.: US 12,533,314 B2
(45) Date of Patent: Jan. 27, 2026

(54) LOW SODIUM OXYBATE ONCE NIGHTLY COMPOSITION

(71) Applicant: Tris Pharma, Inc., Monmouth Junction, NJ (US)

(72) Inventors: Mahesh Chavan Patil, Parsippany, NJ (US); Hiren Patel, Edison, NJ (US); Devins Patel, Somerset, NJ (US); Alfred Liang, Rahway, NJ (US); Paras Rameshlal Jain, Dayton, NJ (US)

(73) Assignee: Tris Pharma, Inc., Monmouth Junction, NJ (US)

( * ) Notice: Subject to any disclaimer, the term of this patent is extended or adjusted under 35 U.S.C. 154(b) by 0 days.

(21) Appl. No.: 18/979,844

(22) Filed: Dec. 13, 2024

(65) Prior Publication Data

US 2025/0108005 A1   Apr. 3, 2025

Related U.S. Application Data

(63) Continuation of application No. PCT/US2024/014347, filed on Feb. 2, 2024.

(60) Provisional application No. 63/483,059, filed on Feb. 3, 2023.

(51) Int. Cl.
  *A61K 9/00*   (2006.01)
  *A61K 9/48*   (2006.01)
  *A61K 9/50*   (2006.01)
  *A61K 31/19*  (2006.01)

(52) U.S. Cl.
  CPC .......... *A61K 9/0095* (2013.01); *A61K 9/0056* (2013.01); *A61K 9/485* (2013.01); *A61K 9/5021* (2013.01); *A61K 31/19* (2013.01)

(58) Field of Classification Search
  None
  See application file for complete search history.

(56) References Cited

U.S. PATENT DOCUMENTS

| | | |
|---|---|---|
| 3,051,619 A | 8/1962 | Laborit |
| 3,138,525 A | 6/1964 | Koff |
| 3,419,588 A | 12/1968 | De Man |
| 3,499,960 A | 3/1970 | Stauffer et al. |
| 3,901,232 A | 8/1975 | Michaels et al. |
| 3,903,297 A | 9/1975 | Robert |
| 4,221,778 A | 9/1980 | Raghunathan |
| 4,352,891 A | 10/1982 | Quinlan |
| 4,374,441 A | 2/1983 | Carter et al. |
| 4,393,236 A | 7/1983 | Klosa |
| 4,510,128 A | 4/1985 | Khanna |
| 4,575,539 A | 3/1986 | DeCrosta et al. |
| 4,687,662 A | 8/1987 | Schobel |
| 4,692,462 A | 9/1987 | Banerjee |
| 4,738,985 A | 4/1988 | Kluger et al. |
| 4,847,077 A | 7/1989 | Raghunathan |
| 4,894,239 A | 1/1990 | Nonomura et al. |
| 4,916,161 A | 4/1990 | Patell |
| 4,931,279 A | 6/1990 | Bawa et al. |
| 4,939,949 A | 7/1990 | Langenberg et al. |
| 4,983,632 A | 1/1991 | Gessa et al. |
| 4,996,047 A | 2/1991 | Kelleher et al. |
| 5,071,646 A | 12/1991 | Malkowska et al. |
| 5,260,292 A | 11/1993 | Robinson et al. |
| 5,275,820 A | 1/1994 | Chang |
| 5,294,430 A | 3/1994 | Borch et al. |
| 5,296,228 A | 3/1994 | Chang et al. |
| 5,368,852 A | 11/1994 | Umemoto et al. |
| 5,380,937 A | 1/1995 | Koehler |
| 5,415,870 A | 5/1995 | Gergely et al. |
| 5,594,030 A | 1/1997 | Conte et al. |
| 5,604,927 A | 2/1997 | Moore |
| 5,753,708 A | 5/1998 | Koehler et al. |
| 5,780,057 A | 7/1998 | Conte et al. |
| 5,808,107 A | 9/1998 | Hollingsworth |
| 5,840,331 A | 11/1998 | Van Cauter et al. |
| 5,908,631 A | 6/1999 | Arnaud et al. |
| 5,955,106 A | 9/1999 | Moeckel et al. |
| 5,972,389 A | 10/1999 | Shell et al. |
| 5,980,882 A | 11/1999 | Eichman |
| 5,990,162 A | 11/1999 | Scharf |
| 6,001,392 A | 12/1999 | Wen et al. |
| 6,022,562 A | 2/2000 | Autant et al. |
| 6,046,277 A | 4/2000 | Kolter et al. |

(Continued)

FOREIGN PATENT DOCUMENTS

| | | |
|---|---|---|
| CA | 2112663 C | 4/2002 |
| CN | 102905688 A | 1/2013 |

(Continued)

OTHER PUBLICATIONS

"Pharmaceutical dosage forms and active agent delivery systems", 6th Edition, Ansel et al., (Media, PA: Williams and Wilkins, 1995).
"Activase," Physicians Desk Reference (50th ed.), (1996), pp. 312, 1058-1061.
"HIB-Imune," Physicians Desk Reference (41st ed.), (1987), 1095-1096.
"HibVAX," Physicians Desk Reference (41st ed.), (1987), 870.
"Malic Acid," The Handbook of Pharmaceutical Excipients, 2nd Ed., (1994), pp. 285-286, 633.
"Phospholine Iodide," Physicians Desk Reference (50th ed.), (1996), 2784.
"Taxotere," Physicians Desk Reference (51st ed.), (1997), 2204-2207.
21 C.F.R. 184, Food and Drug Administration, HHS, (1998), pp. 441-535.

(Continued)

*Primary Examiner* — Robert A Wax
*Assistant Examiner* — William Craigo
(74) *Attorney, Agent, or Firm* — Howson & Howson LLP; Cathy A. Kodroff

(57) ABSTRACT

Compositions providing a once-a-night dose of oxybate are provided. The compositions containing bilayer-coated oxybate anion exchange resin complex multiparticulates provide modified release of the oxybate for 5 to 8 hours post-dosing. Also provided are methods of treating patients in need thereof with pharmaceutical compositions containing the oxybate—anion exchange resin complex.

29 Claims, 5 Drawing Sheets

(56) References Cited

U.S. PATENT DOCUMENTS

| | | | |
|---|---|---|---|
| 6,066,334 A | 5/2000 | Kolter et al. |
| 6,077,532 A | 6/2000 | Malkowska et al. |
| 6,120,803 A | 9/2000 | Wong et al. |
| 6,187,323 B1 | 2/2001 | Aiache et al. |
| 6,322,819 B1 | 11/2001 | Burnside et al. |
| 6,340,475 B2 | 1/2002 | Shell et al. |
| 6,384,020 B1 | 5/2002 | Flanner et al. |
| 6,436,998 B1 | 8/2002 | Cacciaglia et al. |
| 6,472,431 B2 | 10/2002 | Cook et al. |
| 6,472,432 B1 | 10/2002 | Perricone |
| 6,488,962 B1 | 12/2002 | Barner et al. |
| 6,512,950 B2 | 1/2003 | Li et al. |
| 6,667,058 B1 | 12/2003 | Goede et al. |
| 6,713,639 B1 | 3/2004 | Gurjar et al. |
| 6,780,889 B2 | 8/2004 | Cook et al. |
| 7,067,116 B1 | 6/2006 | Bess et al. |
| 7,262,219 B2 | 8/2007 | Cook et al. |
| 7,294,347 B2 | 11/2007 | Menjoge et al. |
| 7,405,238 B2 | 7/2008 | Markey et al. |
| 7,413,751 B2 | 8/2008 | Devane et al. |
| 7,568,822 B2 | 8/2009 | Ibrahim |
| 7,668,730 B2 | 2/2010 | Reardan et al. |
| 7,682,629 B1 | 3/2010 | Besse |
| 7,765,106 B2 | 7/2010 | Reardan et al. |
| 7,765,107 B2 | 7/2010 | Reardan et al. |
| 7,797,171 B2 | 9/2010 | Reardan et al. |
| 7,851,506 B2 | 12/2010 | Cook et al. |
| 7,895,059 B2 | 2/2011 | Reardan et al. |
| 7,906,145 B2 | 3/2011 | Castan et al. |
| 7,910,133 B2 | 3/2011 | Castan et al. |
| 7,976,870 B2 | 7/2011 | Berner et al. |
| 8,062,667 B2 | 11/2011 | Mehta et al. |
| 8,101,209 B2 | 1/2012 | Legrand et al. |
| 8,193,211 B2 | 6/2012 | Liang et al. |
| 8,202,537 B2 | 6/2012 | Mehta et al. |
| 8,202,542 B1 | 6/2012 | Mehta et al. |
| 8,263,125 B2 | 9/2012 | Vaya et al. |
| 8,263,650 B2 | 9/2012 | Cook et al. |
| 8,268,352 B2 | 9/2012 | Vaya et al. |
| 8,287,848 B2 | 10/2012 | Mehta et al. |
| 8,313,770 B2 | 11/2012 | Pathak et al. |
| 8,318,210 B2 | 11/2012 | Tengler et al. |
| 8,324,275 B2 | 12/2012 | Cook et al. |
| 8,343,546 B2 | 1/2013 | Hall et al. |
| 8,457,988 B1 | 6/2013 | Reardan et al. |
| 8,461,197 B2 | 6/2013 | Tung et al. |
| 8,461,203 B2 | 6/2013 | Cook et al. |
| 8,470,375 B1 | 6/2013 | McMahen et al. |
| 8,512,759 B1 | 8/2013 | McMahen et al. |
| 8,529,954 B2 | 9/2013 | Lebon et al. |
| 8,586,083 B2 | 11/2013 | Mohammad |
| 8,589,182 B1 | 11/2013 | Reardan et al. |
| 8,591,922 B1 | 11/2013 | Allphin et al. |
| 8,592,481 B2 | 11/2013 | Berner et al. |
| 8,598,191 B2 | 12/2013 | Liang et al. |
| 8,668,929 B2 | 3/2014 | Han et al. |
| 8,680,228 B2 | 3/2014 | Guo et al. |
| 8,731,963 B1 | 5/2014 | Reardan et al. |
| 8,747,902 B2 | 6/2014 | Mehta et al. |
| 8,759,394 B2 | 6/2014 | Tung et al. |
| 8,771,735 B2 | 7/2014 | Rourke et al. |
| 8,772,306 B1 | 7/2014 | Eller |
| 8,778,301 B2 | 7/2014 | Mamelak et al. |
| 8,778,398 B2 | 7/2014 | Rourke et al. |
| 8,790,700 B2 | 7/2014 | Mehta et al. |
| 8,802,157 B2 | 8/2014 | Berner et al. |
| 8,859,619 B2 | 10/2014 | Cook et al. |
| 8,901,173 B2 | 12/2014 | Allphin et al. |
| 8,952,062 B2 | 2/2015 | Cook et al. |
| 9,000,046 B2 | 4/2015 | Berner et al. |
| 9,050,302 B2 | 6/2015 | Eller |
| 9,132,107 B2 | 9/2015 | Allphin et al. |
| 9,161,911 B2 | 10/2015 | Hou |
| 9,301,934 B2 | 4/2016 | Berner et al. |
| 9,439,851 B2 | 9/2016 | Dharmadhkari et al. |
| 9,555,017 B2 | 1/2017 | Allphin et al. |
| 9,566,258 B2 | 2/2017 | Hou |
| 9,770,514 B2 | 9/2017 | Ghebre-Sellassie |
| 10,092,511 B2 | 10/2018 | Castan et al. |
| 10,272,062 B2 | 4/2019 | Mégret et al. |
| 10,398,662 B1 | 9/2019 | Allphin et al. |
| 10,736,866 B2 | 8/2020 | Mégret et al. |
| 10,925,844 B2 | 2/2021 | Grassot et al. |
| 10,952,986 B2 | 3/2021 | Megret et al. |
| 10,973,795 B2 | 4/2021 | Megret et al. |
| 11,000,498 B2 | 5/2021 | Megret et al. |
| 11,052,061 B2 | 7/2021 | Megret et al. |
| 11,337,920 B2 | 5/2022 | Jain et al. |
| 11,666,546 B2 | 6/2023 | Jain et al. |
| 11,896,572 B2 | 2/2024 | Dubow et al. |
| 12,109,186 B2 | 10/2024 | Dubow et al. |
| 12,115,142 B2 | 10/2024 | Dubow et al. |
| 12,115,143 B2 | 10/2024 | Dubow et al. |
| 12,115,144 B2 | 10/2024 | Dubow et al. |
| 12,115,145 B2 | 10/2024 | Dubow et al. |
| 12,128,021 B1 | 10/2024 | Megret et al. |
| 2002/0034541 A1* | 3/2002 | Valducci ............. A61K 9/4808 424/464 |
| 2003/0099711 A1 | 5/2003 | Meadows et al. |
| 2003/0180249 A1 | 9/2003 | Khanna et al. |
| 2004/0092455 A1 | 5/2004 | Mamelak et al. |
| 2004/0219186 A1 | 11/2004 | Ayres |
| 2005/0031688 A1 | 2/2005 | Ayla |
| 2005/0037077 A1 | 2/2005 | Legrand et al. |
| 2005/0136114 A1 | 6/2005 | Kulkarni et al. |
| 2005/0142192 A1 | 6/2005 | Benjamin et al. |
| 2005/0181050 A1 | 8/2005 | Hirsh et al. |
| 2005/0232986 A1 | 10/2005 | Brown et al. |
| 2005/0232987 A1 | 10/2005 | Srinivasan et al. |
| 2005/0232993 A1 | 10/2005 | Brown et al. |
| 2005/0266032 A1 | 12/2005 | Srinivasan et al. |
| 2006/0018933 A1 | 1/2006 | Vaya et al. |
| 2006/0024365 A1 | 2/2006 | Vaya et al. |
| 2006/0062844 A1 | 3/2006 | Chenevier et al. |
| 2006/0069040 A1 | 3/2006 | Memlak |
| 2006/0210630 A1* | 9/2006 | Liang .................. A61P 3/04 424/468 |
| 2007/0036843 A1 | 2/2007 | Hirsh et al. |
| 2007/0148239 A1 | 6/2007 | Hall et al. |
| 2007/0215511 A1 | 9/2007 | Mehta et al. |
| 2007/0270491 A1 | 11/2007 | Cook et al. |
| 2008/0003267 A1 | 1/2008 | Spencer et al. |
| 2008/0069871 A1 | 3/2008 | Vaughn et al. |
| 2008/0118571 A1 | 5/2008 | Lee et al. |
| 2008/0226564 A1 | 9/2008 | Weers et al. |
| 2008/0292700 A1 | 11/2008 | Nghiem et al. |
| 2008/0293698 A1 | 11/2008 | Johnson |
| 2009/0137565 A1 | 5/2009 | Frucht |
| 2009/0275530 A1 | 11/2009 | Tester et al. |
| 2010/0112056 A1 | 5/2010 | Rourke et al. |
| 2011/0039929 A1 | 2/2011 | Cook et al. |
| 2011/0111027 A1 | 5/2011 | Rourke et al. |
| 2012/0020833 A1 | 1/2012 | Cook et al. |
| 2012/0076865 A1 | 3/2012 | Allphin et al. |
| 2012/0148672 A1 | 6/2012 | Mehta et al. |
| 2012/0202879 A1 | 8/2012 | Cook et al. |
| 2012/0202880 A1 | 8/2012 | Cook et al. |
| 2013/0273159 A1 | 10/2013 | Howard et al. |
| 2014/0004202 A1 | 1/2014 | Suplie et al. |
| 2014/0037745 A1 | 2/2014 | Liang et al. |
| 2014/0093578 A1 | 4/2014 | Mehta et al. |
| 2014/0127306 A1 | 5/2014 | Mehta et al. |
| 2014/0348917 A1 | 11/2014 | Rourke et al. |
| 2015/0064251 A1 | 3/2015 | Ghebre-Sellassie et al. |
| 2015/0073052 A1 | 3/2015 | Cook et al. |
| 2015/0202588 A1 | 7/2015 | Allphin |
| 2016/0068463 A1 | 3/2016 | Peoples et al. |
| 2016/0228379 A1 | 8/2016 | Kumar et al. |
| 2016/0271070 A1 | 9/2016 | Singh et al. |
| 2016/0317388 A1 | 11/2016 | Bhargava et al. |
| 2016/0346200 A1 | 12/2016 | Sommer et al. |
| 2016/0346216 A1 | 12/2016 | Chen |
| 2017/0119627 A1 | 5/2017 | Bhargava et al. |
| 2017/0340519 A9 | 11/2017 | Bhargava et al. |

(56) References Cited

U.S. PATENT DOCUMENTS

| | | |
|---|---|---|
| 2018/0008539 A1 | 1/2018 | Singh et al. |
| 2018/0021284 A1 | 1/2018 | Mégret et al. |
| 2018/0318222 A1 | 11/2018 | Allphin et al. |
| 2019/0183836 A1 | 6/2019 | Mégret et al. |
| 2019/0269640 A1 | 9/2019 | Megret et al. |
| 2019/0269641 A1 | 9/2019 | Megret et al. |
| 2019/0274990 A1 | 9/2019 | Megret et al. |
| 2019/0282532 A1 | 9/2019 | Megret et al. |
| 2020/0197347 A1 | 6/2020 | Megret et al. |
| 2020/0276142 A1 | 9/2020 | Grassot et al. |
| 2020/0360319 A1 | 11/2020 | Grassot et al. |
| 2020/0368187 A1 | 11/2020 | Grassot et al. |
| 2021/0015744 A1 | 1/2021 | Jain et al. |
| 2021/0015745 A1 | 1/2021 | Jain et al. |
| 2021/0069105 A1 | 3/2021 | Jain et al. |
| 2021/0069136 A1* | 3/2021 | Jain ..................... A61K 9/1664 |
| 2021/0186916 A1 | 6/2021 | Megret et al. |
| 2024/0350437 A1 | 10/2024 | Grassot et al. |
| 2024/0350438 A1 | 10/2024 | Grassot et al. |

FOREIGN PATENT DOCUMENTS

| | | |
|---|---|---|
| CN | 102958930 A | 3/2013 |
| CN | 103209966 A | 7/2013 |
| CN | 103209967 A | 7/2013 |
| EP | 0203768 A2 | 12/1986 |
| EP | 0235408 A1 | 9/1987 |
| EP | 0344704 A1 | 12/1989 |
| EP | 0616804 A1 | 9/1994 |
| EP | 0635265 A1 | 1/1995 |
| EP | 0709087 B1 | 12/1999 |
| EP | 0635265 B1 | 2/2000 |
| EP | 1140061 A2 | 10/2001 |
| EP | 1140061 B1 | 5/2003 |
| EP | 1316309 A1 | 6/2003 |
| EP | 2931268 A1 | 10/2015 |
| EP | 2760911 B1 | 11/2017 |
| EP | 1434572 B1 | 12/2017 |
| GB | 922029 A | 3/1963 |
| JP | S57042651 A | 3/1982 |
| JP | 62-12715 A | 1/1987 |
| JP | 04049212 A | 2/1992 |
| JP | 05508422 A | 11/1993 |
| JP | H06-508839 A | 10/1994 |
| JP | 7-53365 A | 2/1995 |
| JP | H8-511257 A | 11/1996 |
| JP | 09-104620 A | 4/1997 |
| JP | H10-505604 | 6/1998 |
| JP | 2001513552 A | 9/2001 |
| JP | 2004514732 A | 5/2004 |
| JP | 2007521231 A | 8/2007 |
| JP | 2008512386 A | 4/2008 |
| JP | 2008519847 A | 6/2008 |
| JP | 2008-528571 A | 7/2008 |
| JP | 2009-532331 A | 9/2009 |
| JP | 2011-500865 A | 1/2011 |
| RU | 2210360 C1 | 8/2003 |
| WO | WO-1994/028880 A1 | 12/1994 |
| WO | WO-1996/040105 A1 | 12/1996 |
| WO | WO-1998/018610 A1 | 5/1998 |
| WO | WO-1999/009972 A1 | 3/1999 |
| WO | WO-2000/038672 A2 | 7/2000 |
| WO | WO-2002/045684 A2 | 6/2002 |
| WO | WO-2003/020242 A1 | 3/2003 |
| WO | WO-2005/016318 A1 | 2/2005 |
| WO | WO-2005/099671 A2 | 10/2005 |
| WO | WO-2006/022996 A3 | 3/2006 |
| WO | WO-2006/029155 A2 | 3/2006 |
| WO | WO-2006/053186 A2 | 5/2006 |
| WO | WO-2006/080029 A1 | 8/2006 |
| WO | WO-2007/001300 A1 | 1/2007 |
| WO | WO-2007/103200 A2 | 9/2007 |
| WO | WO-2007/109104 A3 | 9/2007 |
| WO | WO-2009/056550 A2 | 5/2009 |
| WO | WO-2010/053691 A1 | 5/2010 |
| WO | WO-2010/055260 A1 | 5/2010 |
| WO | WO-2011/119839 A1 | 9/2011 |
| WO | WO-2011/127252 A2 | 10/2011 |
| WO | WO-2011/135461 A2 | 11/2011 |
| WO | WO-2011/139271 A1 | 11/2011 |
| WO | WO-2011/140310 A2 | 11/2011 |
| WO | WO-2012/028688 | 3/2012 |
| WO | WO-2012/107652 A1 | 8/2012 |
| WO | WO-2014/078014 A2 | 5/2014 |
| WO | WO-2015/120006 A1 | 8/2015 |
| WO | WO-2015/120110 A2 | 8/2015 |
| WO | WO-2015/166473 A1 | 11/2015 |
| WO | WO-2015/186108 A1 | 12/2015 |
| WO | WO-2016/066256 A1 | 5/2016 |
| WO | WO-2016/087952 A1 | 6/2016 |
| WO | WO-2016/178132 A1 | 10/2016 |
| WO | WO-2017/182851 A1 | 10/2017 |
| WO | WO-2018/015563 A1 | 1/2018 |
| WO | WO-2019/126214 A1 | 6/2019 |
| WO | WO-2019/126215 A1 | 6/2019 |
| WO | WO-2019/126216 A1 | 6/2019 |
| WO | WO-2019/126218 A1 | 6/2019 |
| WO | WO-2020/178695 | 9/2020 |

OTHER PUBLICATIONS

Akifuddin et al., "Preparation, characterization, and in-vitro evaluation of microcapsules for controlled release of Dilitiazem hydrochloride by Ionotropic gelation technique," Journal of Applied Pharmaceutical Science (2013); 3.4: 35-42.

Anand et al., "Ion-exchange resin: carrying drug delivery forward," Drug Discovery Today (2001); 6.17: 905-914.

Arora et al., Floating Drug Delivery Systems: A Review, AAPS PharmScieTech, 2005, 6(3):E372-E390.

Banerjee et al., Investigation on crosslinking density for development of novel interpenetrating polymer network (IPN) based formulation, Journal of Scientific and Industrial Research, 2010, 69(10):777-784.

BASF's Volker Bühler Kollidon, Polyvinylpyrrolidone excipients for the pharmaceutical industry, 9th Revised Edition, 1-330, Mar. 2008.

Bedard, "Nocturnal γ-Hydroxybutyrate—Effect on Periodic Leg Movements and Sleep Organization of Narcoleptic Patients," Clin Neuropharmacol., 12 (1), Feb. 1989, 29-36.

Berner, J. E., "A Case of Sodium Oxybate Treatment of Tardive Dyskinesia and Bipolar Disorder," J. Clin. Psychiatry, 2008, 69:5, p. 862.

Berthier, et al., "Possible Involvement of Gamma-Hydroxybutyric Acid Receptor in Startle Disease," Acta Paediatr, (1994); 83: 678-680.

Bhardwaj et al., A Short Review on Gastro Retentive Formulations for Stomach Specific Drug Delivery: Special Emphasis on Floating In situ Gel Systems, African J of Basic & Applied Sciences, 2011, 3(6):300-312.

Bhardwaj et al., Interpenetrating Polymer Network (IPN): Novel approach in Drug delivery, Int. J. Drug Dev. Res., 4(3), Jul.-Sep. 2012.

Bhaskaran et al., "Extrusion Spheronization—a Review", International Journal of PharmTech Research, vol. 2(4):2429-2433, Oct. 2010.

Borgen et al., "The influence of gender and food on the pharmacokinetics of sodium oxybate oral solution in healthy subjects," J Clin Pharmacol (2003); 43(1): 59-65.

Borgen et al., "Xyrem® (sodium oxybate): A Study of Dose Proportionality in Healthy Human Subjects," J. Clin. Pharmacol. (2000); 40: 1053.

Broughton et al., "Effects of Nocturnal Gamma-Hydroxybutyrate on Spell/Walking Patterns in Narcolepsy-Cataplexy," Can J. Neural Sci (1980); 7(1): 23-31.

Broughton et al., "The Treatment of Narcolepsy-Cataplexy with Nocturnal Gammao-Hydroxybutyrate," Can J. Neural Sci (1979); 6(1): 1-6.

Broughton et al., Gamma-hydroxy-butyrate in the treatment of narcolepsy: a preliminary report, In: Guilleminault et al. (Eds.).

(56) References Cited

OTHER PUBLICATIONS

Narcolepsy (Advances in sleep research. vol. 3.). Holliswood, NY: Spectrum Publications, pp. 659-667, Jan. 1976.
Caballero et al., "Characterization of alginate beads loaded with ibuprofen lysine salt and optimization of the preparation method," International Journal or Pharmaceutical (2014); 460.1: 181-188.
Chem Abstract ES302338, SciFider®, (1964), 1pg.
Chemical Abstracts: Seventh Collective Index, vols. 56-65, (1962-1966), 4 pgs.
Chen et al., Cubic and Hexagonal Liquid Crystals as Drug Delivery Systems, BioMed Research International, 2014:1-12.
Davis et al., "Active chloride secretion in the normal human jejunum," J Clin Invest. (1980); 66(6): 1326-1333.
Davis SS et al., Transit of Pharmaceutical Dosage Forms Through the Small Intestine, Gut, 1986, 27(8): 886-892.
Defrancesco et al., GHB free acid: I. Solution formation studies and spectroscopic characterization by 1HNMR and FT-IR, Journal of Forensic Sciences, vol. 51(2):321-9, Mar. 2006.
Dolas et al., Raft Technology for Gatsro Retentive Drug Delivery, Human Journal, 2015, 3(1):232-252.
El Nabarawi et al., Formulation, release characteristics, and bioavailability study of gastroretentive floating matrix tablet and floating raft system of Mebeverine HC1, Drug Design, Development and Therapy, 2017, 11:1081-1093.
Erkoboni, D.F., "Chapter 15: Extrusion/Spheronization", In: Ghebre-Sellassie et al. (Eds.), Pharmaceutical Extrusion Technology (1st Ed., vol. 133), Marcel Dekker, Inc.: New York, pp. 277-322, May 2003.
Ferrara et al., "Pharmacokinetics of Y-Hydroxybutyric Acid in Alcohol Dependent Patients After Single and Repeated Oral Doses," Br. J. Clin. Pharmacol. (1992); 34: 231-235.
Ferris et al., "Synthesis, characterization, and detection of gamma-hydroxybutyrate slats," Forensic Science International, (2012); 216: 158-162.
Flamel Technologies, "Flamel Technologies Announces Positive Results of a Second Clinical Trial with Micropump® Sodium Oxybate", Dec. 19, 2014, retrieved Aug. 7, 2017 from http://www.marketwired.com/press-release/flamel-technologies-announces-positi.
Frucht et al., "A Pilot Tolerability and Efficacy Trial of Sodium Oxybate in Ethanol-Responsive Movement Disorders," Movement Disorders, vol. 20(10):1330-1337, Jun. 2005.
Frucht et al., "A Single-Blind, Open-Label Trial of Sodium Oxybate for Myoclonus and Essential Tremor," Neurology (2005); 65(12): 1967-1970.
Gallimberti, L., "Gamma-hydroxybutyric Acid for Treatment of Alcohol Dependence: A Double-Blind Study," Alcohol Clin. Exp. Res. (1992), 16(4):673-676.
Gallimberti, L., "Gamma-hydroxybutyric Acid for Treatment of Alcohol Withdrawal Syndrome," The Lancet, (1989); 2(8666): 787-789.
Gerra et al., "Flumazenil effects on growth hormone response to gamma-hydroxybutyric acid," Int Clin Psychopharmacol. (1994); 9(3): 211-215.
Gessa et al., "Gamma-hydroxybutyric Acid (GHB) for treatment of ethanol dependence," European Neuropsychopharmacology, (1993); 3(3): 224-225.
Gessa, G. L., "Gamma-hydroxybutyric Acid in the Treatment of Alcohol Dependence," Clin. Neuropharm., (1992); 15(1A): 303a-304a.
Grove-White et al., "Effect of Methohexitone, Diazepam and Sodium 4-Hydroxybutyrate on Short-Term Memory," Brit. J. Anaesth (1971); 43(2): 113-116.
Grove-White, I. G., "Critical Flicker Frequency after Small Doses of Methohexitone, Diazepam and Sodium 4-Hydroxybutyrate," Brit. J Anaesth (1971); 43(2): 110-112.
Gupta et al., Semi-interpenetrating polymer network beads of crosslinked chitosan-glycine for controlled release of chlorophenramine maleate, Journal of Applied Polymer Science, 2000, 76(5):672-683.
Handbook of Pharmaceutical Excipients, Ed. By A. Wade and P. J. Weller, (1994).
Hanninen et al., Mechanistic evaluation of factors affecting compound loading into ion-exchange fibers, Eur. J. Pharm. Sci., 2007, 31(5): 306-317.
Hasenbos et al., "Anaesthesia for bullectomy. A technique with spontaneous ventilation and extradural blockade," Anaesthesia (1985); 40(10): 977-980.
Hoes, M. J., "Gamma-hydroxybutyric acid (*) as hypnotic. Clinical and pharmacokinetic evaluation of gamma-hydroxybutyric acid as hypnotic in man," L'Encéphale: Revue de psychiatre clinique biologique et thérapeutique (1980); 6(1): 93-99.
Jain et al., Recent technologies in pulsatile drug delivery systems, Biomatter, 2011, 1(1):57-65.
Joshi et al., "Film coatings for taste masking and moisture protection." International Journal of Pharmaceutics 457.2 (2013): 395-406.
Klempner et al., Interpenetrating Polymer Networks, Advances in Chemistry; American Chemical Society, 1994, 21-38.
Koshmala et al., Preparation of interpenetrating networks of gelatin and dextran as degradable biomaterials, Biomaterials, 2000, 21(20):2019-2023.
Koul et al., Interpenetrating polymer network (IPN) nanogels based on gelatin and poly(acrylic acid) by inverse mini-emulsion technique: synthesis and characterization, Colloids Surf. B. Biointerfaces, 2011, 83(2):2014-213.
Kumar et al., Formulation and evaluation of floating in situ gelling system of losartan potassium, Der Pharmacia Lettre, 2015, 7(1):98-112.
Laborit, H., "Gamma-Hydroxybutyrate, Succinic Semialdehyde and Sleep." Laboratoire d'Eutonologie, (1973); 257-274.
Ladinsky et al., "Mode of Action of Gamma-Butyrolactone on the Central Cholinergic System," Naunyn-Schmiedeberg's Arch. Pharmacol. (1983); 322(1): 42-48.
Lam et al., Monocarboxylate Transporter-Mediated Transport of Gamma-Hydroxybutyric Acid in Human Intestinal Caco-2 Cells, Drug Metabolism and Disposition, 2010, 38(3):441-447.
Lammers, G.J., "Gammahydroxybutyrate and Narcolepsy: A Double-Blind Placebo-Controlled Study," Sleep (1993); 16 (3): 216-220.
Landfester et al., Synthesis of colloidal particles in miniemulsions, Annual Review of Materials Research, 2006, 36:231-279.
Lane, M. Dronabinol and prochlorperazine in combination for treatment of cancer chemotherapy-induced nausea and vomiting J Pain Symptom Manage. 1991; 6(6):352-359.
Lapierre et al., "The Effect of Gamma-Hydroxybutyrate on Nocturnal and Diurnal Sleep of Normal Subjects: Further Considerations on REM Sleep-Triggering Mechanism," Sleep (1990); 13(1): 24-30.
Lapierre et al., "The Effect of Gamma-Hydroxybutyrate: A Double-Blind Study of Normal Subjects," (1988); 17, 6 pages (Abstract only).
Lee, C.R., Evidence for the β-oxidation of orally administered 4-hydroxybutyrate in humans, Biochemical Medicine (1977); 17(3):284-291.
Liechti et al., Pharmacokinetics and pharmacodynamics of gamma-hydroxybutyrate in healthy subjects, British Journal of Clinical Pharmacology, 2016, 81:980-988.
Lohani et al., Interpenetrating Polymer Networks as Innovative Drug Delivery Systems, Journal of Drug Delivery, 2014, 2014:1-11.
Lu et al., One-step synthesis of interpenetrating network hydrogels: Environment sensitivities and drug delivery properties, Saudi J. Biol. Sci. 2016, 2016(3):S22-S31.
Lubrano et al., "Fibromyalgia in Patients with Irritable Bowel Syndrome. An Association with the Severity of the Intestinal Disorder," Int J Colorectal Dis (2001); 16(4): 211-215.
Madan Jr. et al., Development and evaluation of in situ gel of pregabalin, International Journal of Pharmaceutical Investigation, 2015, 5(4):226-233.
Mahore et al., "Ion exchange resins: pharmaceutical applications and recent advancement," Int J Pharm Sci Rev Res (2010); 1.2: 8-13.
Mamelak et al., "Treatment of Narcolepsy and Sleep Apnea with Gammhydroxybutyrate: A Clinical and Polysomnographic Case Study," Sleep (1981); 4(1): 105-111.

(56) References Cited

OTHER PUBLICATIONS

Mamelak et al., "Treatment of Narcolepsy with γ-Hydroxybutyrate. A Review of Clinical and Sleep Laboratory Findings," Sleep (1986); 9(1): 285-290.
Mamelak et al., The effects of gamma-hydroxybutyrate on sleep, Biological Psychiatry, vol. 12(2):273-88, Apr. 1977.
Mamelak, M., "Sleep-Inducing Effects of Gammahydroxybutyrate," The Lancet (1973); 302(7824): 328-329.
Mamelak, M., Gammahydroxybutyrate: An endogenous regulator of energy metabolism, Neuroscience and Biobehavioral Reviews (1989); 13(4): 187-198.
Moldofsky et al., "A Chronobiologic Theory of Fibromyalgia," J. Muscoloskel. Pain, (1993); 49(1).
Moldofsky et al., "A Muscoloskeletal Symptoms and Non-REM Sleep Disturbances in Patients with 'Fibrositis Symptoms' and Healthy Subjects," Psychosom. Med. (1975); 37(4): 341-351.
Morrison et al., Organic Chemistry, 3rd Edition, (1973), pp. 672-677.
Munot et al., "Ion exchange resins in pharmaceuticals: A review," Journal of Pharmacy Research (2010); 3(12): 2928-2929.
Nema et al., "Excipients and Their Use in Injectable Products," PDA J. Pharm. Sci. Technol. (1977); 51(4): 166-171.
Neuman, A., "GHB's Path to Legitimacy: An Administrative and Legislative History of Xyrem," Apr. 2004, Harvard Law School, Class of 2005, Food and Drug Law, Winter Term 2004, Professor Peter Barton Hutt. (2004), 1-39.
Nirmal et al., In-Situ gel: New trends in Controlled and Sustained Drug Delivery System, Int. J. of PharmTech Research, 2010, 2(2):1398-1408.
Ohta et al., "Development of a simple method for the preparation of a silica gel based controlled delivery system with a high drug content," European Journal of Pharmaceutical Sciences (2005); 26.1: 87-96.
Ondo et al., "Sodium Oxybate for Excessive Daytime Sleepiness in Parkinson Disease," Arch Neurol. (2008); 65(10): 1337-1340.
Outlaw et al., "Dyspepsia and its Overlap with the Irritable Bowel Syndrome," Curr Gastroenterol Rep. (2006); 8(4): 266-272.
Palatini et al., "Dose-dependent absorption and elimination of gamma-hydroxybutyric acid in healthy volunteers," Eur J Clin Pharmacol (1993); 45: 353-356.
Patel et al., Formulation and Evaluation of Floating Oral In Situ Gelling System of Amoxicillin, ISRN Pharmaceutics, 2011.
Patil et al., "A review on ionotropic gelation method: novel approach for controlled gastroretentive gelispheres," International Journal of Pharmacy and Pharmaceutical Sciences (2012); 4.4:27-32.
Prajapati et al., Raft forming system—An upcoming approach of gastroretentive drug delivery system, Journal of Controlled Release, 2013, 168(2):151-165.
Puguan et al., "Diffusion characteristics of different molecular weight solutes in Ca-alginate gel beads," Colloids and Surfaces A Physicochemical and Engineering Aspects (2015); 469: 158-165.
Qadri et al., Biomedical Applications of Interpenetrating Polymer Network System, Open Pharmaceutical Sciences Journal, 2015, 2: 21-30.
Rajesh et al., Taste masking of ciprofloxacin by ion-exchange resin and sustain release at gastric-intestinal through interpenetrating polymer network, Asian Journal of Pharmaceutical Sciences, 2015, 10(2015):331-340.
Rajesh et al., Taste masking of ofloxacin and formation of inter-penetrating polymer network beads for sustained release, Journal of Pharmaceutical Analysis, 2017, 7(2017):244-251.
Remington. The Science and Practice of Pharmacy. 20th Edition, Gennaro, Ed., Lippincott Williams & Wilkins. Chapter 45 (Oral Solid Dosage Forms) (2000).
Rohm and Haas, "Duolite AP143/1083 Pharmaceutical Grade Anion Exchange Resin," Feb. 2006, 4 pages.
Roth et al., "γ-Butyrolactone and γ-Hydroxybutyric Acid-I, Distribution and Metabolism," Biochemical Pharmacology (1966); 15(9): 1333-1348.
Roth et al., "γ-Butyrolactone and γ-Hydroxybutyric Acid-II. The Pharmacologically active form," Int. J. Neuropharmacol. (1966); 5(6): 421-428.
Russell et al., "Sodium Oxybate Relieves Pain and Improves Function in Fybromyalgia Syndrome: A Randomized, Double-Blind, Placebo-Controlled, Multicenter Clinical Trial," Arthritis & Rheumatism (2009); 60 (1): 299-309.
Sajan et al., Chromotherapeutics and Chronotherapeutic Drug Delivery Systems, Tropical Journal of Pharmaceutical Research, 2009, 8(5):467-475.
Scharf et al., "Effect of Gamma-Hydroxybutyrate on Pain, Fatigue, and the Alpha Sleep Anomaly in Patients with Fibromyalgia," J. Rheumatol. (1988); 25: 1986-1990.
Scharf et al., "GHB—New Hope for Narcopleptics?" Biol Psychiatry (1989); 26(4): 329-330.
Scharf et al., "The Effects and Effectiveness of γ-Hydroxybutyrate in Patients with Narcolepsy," J. Clin. Psychiatry (1985); 46(6): 222-225.
Scharf et al., "The Effects of Sodium Oxybate on Clinical Symptoms and Sleep Patterns in Patients with Fybromyalgia," J. Rheumatol. (2003); 30(5): 1070-1074.
Scrima et al., "Effect of Gamma-Hydroxybutyrate on a Patient with Obstructive Sleep Apnea," Sleep Research (1987); 16: 137.
Scrima et al., "Effect of High Altitude on a Patient with Obstructive Sleep Apnea," Sleep Research (1987); 16: 147.
Scrima et al., "Effects of Gamma-Hydroxybutyrate (GHB) on Narcolepsy-Cataplexy Symptoms and MSLT Results in Male and Female Patients," Association of Professional Sleep Societies (1988); 251.
Scrima et al., "Efficacy of Gamma-Hydroxybutyrate Versus Placebo in Treating Narcolepsy-Cataplexy: Double-Blind Subjective Measures," Biol. Psychiatry (1989); 26(4): 331-343.
Scrima et al., "Gamma-Hydroxybutyrate Effects on Cataplexy and Sleep Attacks on Narcoleptics," Sleep Research (1987); 16:134.
Scrima et al., "Narcolepsy," New England J. Med. (1991); 324(4): 270-272.
Scrima et al., "The Effect of γ-Hydroxybutyrate on the Sleep of Narcolepsy Patients: A Double-Blind Study," Sleep (1990); 13(6): 479-490.
Seno et al., "The Rheological Behavior of Suspensions of Ion-exchange Resin Particles," Bulletin of the Chemical Society of Japan (1966); 39.4: 776-778.
Series, F., "Effects of Enhancing Slow-Wave Sleep by Gamma-Hydroxybutyrate on Obstructive Sleep Apnea," Am. Rev. Respir. Dis. (1993); 145(6): 1378-1383.
Shah et al., Stomach Specific Floating Drug Delivery System: A Review, International Journal of PharmTech Research, 2009, 1(3):623-633.
Shailaja et al., A Review on Gastroretentive Drug Delivery System, International Journal of Research and Development in Pharmacy and Life Sciences, 2016, 5(4):2178-2187.
Sharma et al., Gastroretentive Drug Delivery System: An Approach to Enhance Gastric Retention for Prolonged Drug Release, International Journal of Pharmaceutical Sciences and Research, 2014, 5(4):1095-1106.
Singh et al., "Ion exchange resins: drug delivery and therapeutic applications," Fabad J. Pharm. Sci. (2007); 32: 91-100.
Smith, Wilder D. "Government and Society: Enzyme-based defense against GHB." (2004): 118-A.
Snead et al., "Ontogeny of γ-Hydroxybutyric Acid. I. Regional Concentration in Developing Rat, Monkey and Human Brain," Dev. Brain Res. (1981); 227(4):579-589.
Snead et al., "γ-Hydroxybutyrate Model of Generalized Absence Seizures: Further Characterization and Comparison with Other Absence Models," Epilepsia (1988); 29(4):361-368.
Sperling et al., Interpenetrating Polymer Networks, Polymer Blends Handbook, 2003, 417-447.
Srikanth et al., "Ion-exchange resins as controlled drug delivery carriers," Journal of Scientific Research (2010); 2.3: 597-611.
Stock, G., "Increase in brain dopamine after axotomy or treatment with Gammahydroxybutyric acid due to elimieniation of the nerve impulse flow," Nayun-Schmiedeberg's Arch. Pharmacol. (1973); 278(4): 347-361.

(56) References Cited

OTHER PUBLICATIONS

Strong, A.J., "γ-Hydroxybutyric acid and intracranial pressure," The Lancet (1984); 1(8389): 1304.
Subrahmanyam PJ, Design and development of guar gum and borax crosslinked guar gum matrix tablets of theophylline for colon specific drug, Journal of Chemical and Pharmaceutical Research, 2012, 4(2):1052-1060.
Suner et al., "Pediatric Gamma Hydroxybutyrate Intoxication," Acad Emerg Med (1997); 4: 1041-1045.
Supriya et al., "Pelletization Techniques: A Literature Review," International Research Journal of Pharmacy, vol. 3(3):43-47, Mar. 2012.
Takka et al., "Evaluation of chitosan/alginate beads using experimental design: formulation and in vitro characterization," AAPS PharmSciTech (2010); 11.1: 460-466.
Tunnicliff, G., "Sites of Action of Gamma-Hydroxybutyrate (GHB)—A Neuroactive Drug with Abuse Potential," Clinical Toxicology (1997); 35(6): 581-590.
Turnberg, LA., "Abnormalities in intestinal electrolyte transport in congenital chloridorrhoea," Gut. (1971); 12(7): 544-551.
United States Pharmacopeial Convention, Inc.: The National Formulary, 23/NF18, (1995), p. 2205.
Van Den Bogert et al., "Placentatransfer of 4-hydroxybutyric acid in man," Anaesthesiology and Intensive Care Medicine (1978); 110: 55-64.
Vickers, M.D. "Gammahydroxybutyric Acid," Int. Anest. Clinic (1969), 7 (1): 75-89.
Vijaya et al., Ion-activated In Situ Gelling Ophthalmic Delivery Systems of Azithromyin, Indian Journal of Pharmaceutical Sciences, 2011, 73(6):615-620.
Wermuth (Ed.), The Practice of Medicinal Chemistry, Academic Press, Third Edition, "Preparation of Water-Soluble Compounds Through Salt formation," Chapter 37, 2008, p. 758, 6 pages.
Yamada, Y. "Effect of Butyrolactone and Gamma-Hydroxybutyrate on the EEG and Sleep Cycle in Man," Electrocephalography and Clinical Neurophysiology (1967); 22(6): 558-562.
Yashwantrao et al., A Raft Forming System: An Novel Approach for Gastroretention, Int. J. Pure App. Biosci., 2015, 3(4): 178-192.
Zhang (Ed.), "Formulation and Analytical Development for Low Dose Oral Drug Products," John Wiley & Sons, Inc., Hoboken, New Jersey, Table 4.1, p. 65 (2009), 3 pages.

International Preliminary Report on Patentability issued Jun. 23, 2020 in related International Patent Application No. PCT/US2018/066299.
International Search Report and Written Opinion issued Apr. 2, 2019 in International Patent Application No. PCT/US2018/066299.
International Search Report and Written Opinion issued Apr. 3, 2019 in International Patent Application No. PCT/US2018/066301.
International Search Report and Written Opinion issued Apr. 3, 2019 in International Patent Application No. PCT/US2018/066303.
International Search Report and Written Opinion issued Apr. 15, 2019 in International Patent Application No. PCT/US2018/066300.
Roxane Laboratories, Inc.'s Answer and Affirmative Defenses to Plaintiff's Complaint, (Dec. 29, 2010).
Roxane Laboratories, Inc.'s Answer and Affirmative Defenses to Plaintiff's Complaint, (Jan. 4, 2013).
Roxane Laboratories, Inc.'s Answer and Affirmative Defenses to Plaintiff's Complaint, (Jun. 1, 2011).
Roxane Laboratories, Inc.'s Answer and Affirmative Defenses to Plaintiff's Complaint, (Mar. 9, 2011).
Roxane Laboratories, Inc.'s Answer and Affirmative Defenses to Plaintiff's Complaint, (Nov. 9, 2012).
Roxane Laboratories, Inc.'s Initial Invalidity and Noninfringement Contentions Pursuant to Local Patent Rule 3.6, (Apr. 14, 2011).
Order, filed Sep. 14, 2012, in case of *Jazz Pharmaceuticals, Inc.*, Plaintiff, v. *Roxane Laboratories, Inc.*, Defendant (United States District Court for the District of New Jersey, Civil 10-6108 ES), (Sep. 14, 2012).
Transcript of a Markman Hearing, dated Apr. 26, 2012, in the case of *Jazz Pharmaceuticals, Inc.*, Plaintiff, v. *Roxane Laboratories, Inc.*, Defendant (United States District Court for the District of New Jersey, Civil 10-6108 ES), (Apr. 26, 2012).
U.S. Appl. No. 15/593,506, filed May 12, 2017.
Final Office Action, dated May 29, 2020, issued in related U.S. Appl. No. 15/593,506.
Non-Final Office Action, dated Nov. 30, 2020, issued in related U.S. Appl. No. 15/593,506.
Non-Final Office Action, dated Sep. 19, 2019, issued in related U.S. Appl. No. 15/593,506.
Office Action issued in related European Patent Application No. 18840118.6, dated May 31, 2021.
Office Action issued in related European Patent Application No. 18840118.6, dated Nov. 10, 2022, and Response dated May 10, 2023.

\* cited by examiner

LOW SODIUM OXYBATE ONCE NIGHTLY COMPOSITION

CROSS-REFERENCE TO RELATED APPLICATIONS

This application is a continuation of International Patent Application No. PCT/US2024/014347, filed Feb. 2, 2024, which claims priority to U.S. Provisional Patent Application No. 63/483,059, filed Feb. 3, 2023. These applications are incorporated by reference herein in their entirety.

BACKGROUND OF THE INVENTION

Narcolepsy is a devastating disabling condition. The cardinal symptoms are excessive daytime sleepiness (EDS), cataplexy (a sudden loss of muscle tone triggered by strong emotions, seen in approximately 60% of patients), hypnogogic hallucination (HH), sleep paralysis (SP), and disturbed nocturnal sleep (DNS). Other than EDS, DNS is the most common symptom seen among narcolepsy patients. One of the major treatments for narcolepsy is sodium oxybate. The precise mechanism by which sodium oxybate produces an effect is unknown, however sodium oxybate is thought to act by promoting SWS (delta sleep) and consolidating night-time sleep. Sodium oxybate administered before nocturnal sleep increases Stages 3 and 4 sleep and increases sleep latency, while reducing the frequency of sleep onset REM periods (SOREMPs). Other mechanisms, which have yet to be elucidated, may also be involved.

Gamma-hydroxybutyrate (GHB), also known as "Oxybate" is an endogenous compound with hypnotic properties that is found in human body tissues, such as the mammalian brain. In the brain, the highest GHB concentration is found in the hypothalamus and basal ganglia and GHB is postulated to function as a neurotransmitter (Snead and Morley, 1981, Brain Res. 227 (4): 579-89). The neuropharmacologic effects of GHB include increases in brain acetylcholine, increases in brain dopamine, inhibition of GABA—ketoglutarate transaminase and depression of glucose utilization but not oxygen consumption in the brain. GHB treatment substantially reduces the signs and symptoms of narcolepsy, i. e. daytime sleepiness, cataplexy, sleep paralysis, and hypnagogic hallucinations. In addition, GHB increases total sleep time and REM sleep, and it decreases REM latency, reduces sleep apnea, and improves general anesthesia (e. g., U.S. Pat. Nos. 6,472,431; 6,780,889; 7,262,219; 7,851,506; 8,263,650; 8,324,275; and 8,772,302 each of which is incorporated herein by reference in its entirety). GHB has also been reported to be effective for relieving pain and improving function in patients with fibromyalgia syndrome, and in alleviating excessive daytime sleepiness and fatigue in patients with Parkinson's disease, improving myoclonus and essential tremor, and reducing tardive dyskinesia and bipolar disorder. See the references that are incorporated at the end of U.S. Pat. No. 6,472,431.

Sodium GHB is highly water-soluble, hygroscopic and strongly alkaline. See, e.g., WO2011/119839. Despite its high water solubility, it forms a gel when dissolved in water. See, e.g., U.S. Pat. No. 8,193,211, also published as US Patent Application US 2006/0210630 A1. These properties, along with the large amount of the drug that is required to achieve the clinical effect, present challenges in preparing solid unit dosage forms that are designed for immediate release of the sodium GHB into the gastrointestinal tract of the user. See, also, U.S. Pat. No. 8,193,211.

Two proprietary products which are approved for the treatment of cataplexy or excessive daytime sleepiness in patients 7 years and older with narcolepsy are Xyrem® (sodium oxybate oral solution) and Xywav® (a low-sodium oxybate oral solution formulation containing a mixture of calcium, magnesium, potassium, and sodium oxybate). Xyrem® is a commercially sold product comprised of 100% sodium oxybate (Na. GHB) and is approved for the treatment of excessive daytime sleepiness and cataplexy in patients with narcolepsy. Na. Xyrem® for use with patients with narcolepsy, is a chronically used product which requires high levels of the drug. The amount of sodium intake from the drug significantly increases the daily sodium intake for patients, which is undesirable for patients with hypertension, heart disease, renal disease or at risk of stroke.

Another approved formulation is Xywav® (a low-sodium oxybate oral solution formulation containing a mixture of calcium, magnesium, potassium, and sodium oxybate). Xywav® is a low-sodium oxybate oral solution containing a mixture of calcium, magnesium, potassium, and sodium oxybate. However, the therapeutic dose of 71.4 mEq/day (9 g sodium oxybate) is sufficiently high that shifting from sodium to another cation can push limits on acceptable daily intake of other cations and potentially cause other undesired side effects for certain patients. For example, potassium has poor tolerability in solution at high doses given on an empty stomach and can also be problematic for patients with kidney impairment. Excess magnesium results in a diarrhea. Therefore, treatments which reduce or eliminate sodium without adding any additional cations for once nightly extended release composition is desirable.

Despite a general record of safety when used as prescribed, there are risks of abuse and misuse of Xyrem® which can cause serious medical problems, including seizures, loss of consciousness, coma, and death (see, e. g., FDA product label dated Nov. 13, 2006 for NDA no. 021196, which is incorporated by reference in its entirety). Further, both Xyrem® and Xywav® drug products are immediate release compositions and require twice nightly dosing.

Hence, there is a need to develop GHB once nightly extended release formulations with lower sodium, and formulations with lower abuse potential.

SUMMARY OF THE INVENTION

In one embodiment, a once-a-night extended release oxybate powder used for an oral suspension is provided. Advantageously, this powder for oral suspension (POS) provides a desirable release profile and has a low sodium content.

In one embodiment, an extended release (ER) oxybate powder for oral suspension (POS) which provides a once-a-night oxybate dose is provided. The ER oxybate POS comprises a blend of oxybate-containing multiparticulates having different release profiles as defined in (a), (b) and (c):
(a) an immediate release oxybate—anion exchange resin complex multiparticulates which comprises oxybate bound to ion exchange sites in an anion exchange resin; (b) a pH-independent diffusion barrier coated oxybate—anion exchange resin complex—optional matrix multiparticulates, wherein the pH-independent diffusion barrier coating layer comprises a water-insoluble film-forming polymer which confers an extended release to the oxybate, and wherein the pH-independent diffusion barrier coating layer is over the oxybate—anion exchange resin complex—optional matrix; (c) oxybate multiparticulates which comprise a Small Intestine Targeted Drug Coating System (SITCS) over an oxybate—anion exchange resin complex—optional matrix of (b), wherein the SITCS is a bilayer coating layer system in which the outer layer comprises a blend of a pH-dependent polymer and a pH-independent polymer over an inner pH-independent diffusion barrier coating layer which is directly over the oxybate—anion exchange resin—optional matrix and wherein the coating system confers a delayed and extended release to the oxybate in the SITCS-coated oxybate—anion exchange resin—optional matrix. The oxybate—anion exchange resin complex—optional matrix of (a), (b) or (c) comprise oxybate bound to ion exchange sites in an anion exchange resin in an optional matrix which further comprises at least one hydrophilic or hydrophobic polymer. The complex—optional matrix in each of (a), (b), or (c) may be the same or may differ from each other. Further, the POS further comprises the equivalent of about 1 mEq to about 12 mEq of calcium chloride per 9 gm oxybate dose of the POS; and wherein the POS contains less than the equivalent of 200 mg of total sodium per 9 gm oxybate dose of the POS. In certain embodiments, the calcium chloride equivalent is a pharmaceutically acceptable salt which is selected from one or more of: magnesium chloride, sodium chloride, zinc chloride, potassium chloride, calcium carbonate, potassium carbonate, sodium bicarbonate and/or combination thereof.

In certain embodiments, an oral suspension resuspended by admixing the oxybate powder and an aqueous oral suspending agent is provided herein.

In certain embodiments, an extended release oxybate powder for oral suspension (POS) provides a once-a-night oxybate dose, which POS composition is a blend of oxybate-containing multiparticulates having different release profiles as defined in (a) and (b): (a) immediate release oxybate—anion exchange resin complex multiparticulates which comprises oxybate bound to ion exchange sites in an anion exchange resin; (b) at least two different extended release oxybate components comprising a drug—ion exchange resin complex. The POS further comprises the equivalent of about 1 mEq to about 12 mEq of calcium chloride per 9 gm oxybate dose of the POS; and less than the equivalent of 200 mg of total sodium per 9 gm oxybate dose of the POS. In certain embodiments, post-administration to a patient, a suspension comprising the POS provides a pharmacokinetic profile for oxybate of at least one of: a Cmax of (i) 87.98 µg/mL to 126 µg/mL, or about 107 µg/mL, a Cmax of 85.6 µg/mL to 133.76 µg/mL, or 77.04 µg/mL to 117.711 µg/mL, as calculated using arithmetic mean and/or (ii) a Cmax of about 105 µg/mL, or 84.38 µg/mL to 131.84 µg/mL, 94.92 µg/mL to 116.01 µg/mL, as calculated using geometric mean; an AUCinf of 518.20 hr*µg/mL to 719.725 hr*µg/mL; or about 575 hr*µg/mL, or of 304.11 hr*µg/mL to 846.67 hr*µg/mL, 460.62 hr*µg/mL to 719.725 hr*µg/mL, as calculated using arithmetic mean and/or an AUCinf of about 520 hr*µg/mL, or 428.58 hr*µg/mL to 669.66 hr*µg/mL; or about 482.16 hr*µg/mL to 589.30 hr*µg/mL, as calculated using geometric mean.

In certain embodiments, the POS contains the equivalent of about a 1 g, 4.5 g, 6 g, 7.5 g, 9 g, or 10 gm dose oxybate, as determined based on the equivalent of sodium oxybate. In case of 10 g or dose higher than the 9 g dose, lower strengths can be dose proportional to higher strength.

In a further aspect, a method of treating a patient having narcolepsy or idiopathic hypersomnia using an oxybate composition is provided. In still other aspect, the composition(s) are used for treatment of a patient who has or is predisposed to hypertension for a condition responsive to GHB (oxybate) is provided. The method comprises providing said patient with a therapeutically effective amount of a composition as described herein, wherein said composition has reduced sodium content as compared to a composition having an equivalent dose of sodium oxybate.

In another aspect, a method is provided for treating a patient having cataplexy and alcohol withdrawal and dependence. The method comprises providing said patient with a therapeutically effective amount of a composition as described herein.

In a further embodiment, a method of treating a patient having chronic fatigue syndrome, cataplexy, sleep apnea, Parkinson's disease, schizophrenia, binge eating, essential tremor and non-Parkinson's movement disorders, chronic cluster headache, and/or reducing constipation associated with opioids and opioid-related drugs is provided. The method comprises providing said patient with a therapeutically effective amount of a composition as described herein.

In another aspect, a kit for treating a patient with one or more oxybate—anion exchange resin compositions is provided.

Still other aspects and advantages of the invention will be apparent from the following detailed description of the invention.

DETAILED DESCRIPTION OF THE INVENTION

Figure 1:
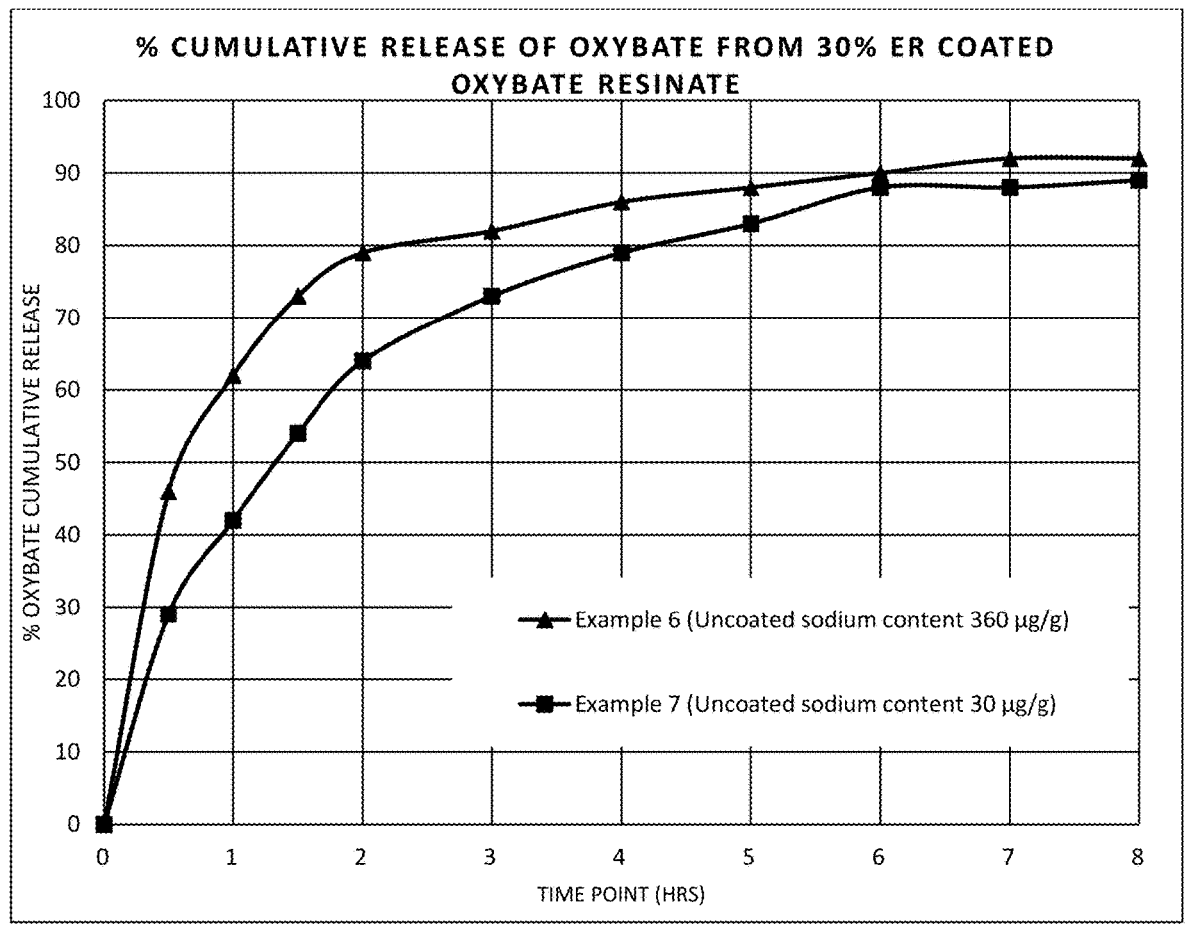
FIG. 1 provides the percentage of cumulative release of oxybate from a 30% extended release (ER) coated oxybate—anion exchange resin complex (resinate) as described in Example 6 (360 µg/g uncoated sodium content) or Example 7 (30% ER coated resinate, uncoated sodium content 30 µg/mg).

Provided herein is an Oxybate extended release (ER) powder for oral suspension (POS) once nightly drug product is to contain sodium oxybate in a complex with cholestyramine resin. The inclusion of cholestyramine resin in that drug product is intended to delay the release of oxybate from ER product. It is observed that drug release from Oxybate ER formulation is modulated by the concentration of sodium content in the formulation. The developed unique formulation technique to control the sodium content in the formulation. The sodium content in the coated drug resin complex contributes significantly to the dissolution properties of the drug resin particles which in turn would affect bioavailability of Oxybate in vivo. The dissolution properties of Oxybate resin complex are also modulated by addition of a calcium chloride equivalent in the Oxybate ER formulation.

As used herein, the combination of sodium ion and calcium chloride or its equivalent can be used to achieve desired dissolution profile in vitro/in vivo. In certain embodiments, a calcium chloride equivalent is a pharmaceutically acceptable salt which is selected from one or more of: magnesium chloride, sodium chloride, zinc chloride, potassium chloride, calcium carbonate, potassium carbonate, sodium bicarbonate and/or combination thereof. In certain embodiments, a POS comprises the equivalent of about 1 mEq to about 12 mEq of calcium chloride per 9 gm oxybate dose of the POS; and wherein the POS contains less than the equivalent of 200 mg of total sodium per 9 gm oxybate dose of the POS. In other formulations, suitable amounts of calcium chloride equivalents may be selected.

The initial release from the formulation is required to achieve desired Cmax for Oxybate once nightly formulation. In certain embodiments, the combination of an immediate release (IR), extended release (ER) and Small Intestine Targeted Drug Coating System (SITCS) oxybate components with low sodium and calcium chloride concentration (1 to 12 mEq) provides a desirable maximum plasma concentration level (Cmax) for oxybate, and allows therapeutic levels to be maintained to about five to six hours post-dose. Thereafter, the compositions permit oxybate levels to completely clear within about 10 hours post-dose.

As used herein, the composition contains a combination of oxybate-containing components, each with a different release profile. Each of the three components comprises a complex of an oxybate and an anion exchange resin, wherein the oxybate is bound to anion exchange resin through available anionic groups on the resin. The three components include (1) an immediate release component comprising an oxybate—anion exchange resin complex; (2) an extended release component comprising an oxybate anion exchange complex coated with a layer of a pH independent diffusion barrier comprising a water-insoluble film-forming polymer or co-polymer; and (3) a SITCS component comprising an oxybate—anion exchange resin complex coated having a pH-independent barrier coating layer over the oxybate—anion exchange resin complex and a delayed release coating layer which comprises an blend of a pH-dependent, enteric polymer or copolymer system and a pH-independent diffusion barrier polymer or co-polymer system, calcium chloride, or the equivalent counterion thereof, and the equivalent of less than 200 mg sodium per 9 gm dose.

As used herein, sodium content in the composition (e.g., POS) is more critical for initial release of oxybate as measured in vitro or in vivo. In certain embodiments, the sodium content in the composition is present in an amount equivalent to less than 200 mg of sodium per 9 g oxybate dose (wherein the oxybate dose is determined based on the equivalent to sodium oxybate). In certain embodiments, the sodium content is about 5 mg to about 175 mg per 9 g oxybate dose or about 150 mg, by weight, per 9 g oxybate dose. For doses less than 9 g, the sodium amount is titrated down to be in a similar ratio of sodium to the equivalent of 9 g oxybate dose (e.g., no more than 0.2 g sodium/9 g oxybate dose equivalent, or about 0.005 g sodium/9 g oxybate to about 0.175 g sodium/9 g oxybate dose equivalent, or about 0.150 g sodium/9 oxybate dose equivalent).

The concentration of calcium chloride is critical for initial release of oxybate in vitro/in vivo. As used herein oxybate ER formulations contains calcium chloride in the concentration of 1 mEq to 12 mEq to facilitate. In a preferred embodiment, the chloride ions are selected from the group consisting of Calcium chloride, sodium chloride, magnesium chloride, and/or zinc chloride or any other salts of chloride and/or combinations thereof. Calcium chloride is preferred for oxybate ER formulation.

The formula for mEq is calculated based on the following formula and is well known to those of skill in the art: mEq=Mass X valence/Molecular Weight As used herein, the compositions and methods minimize and/or eliminate adverse events associated with high levels of sodium and certain other salts, improve patient compliance. Further the composition provided herein are taken once per night, thus avoiding the need to wake up during the night for a second dose.

As used herein, a "powder for suspension" or "POS" refers to a composition which is formulated as a powder which designed to be suspended in a suspension base prior to oral ingestion by a patient.

In certain embodiments, the manufacturing process for drug resinate complex was developed such that the concentration of sodium content is less than 200 mg/9 gm dose. Sodium oxybate dose of 9 gm contains 1640 mg of sodium. Method of manufacturing presented in certain embodiment reduces sodium content of the formulation from 1640 mg to less than 200 mg per 9 gm dose. In certain embodiment, this required sodium content of less than 200 mg per 9 gm dose is necessary to achieve desired dissolution in initial hours for extended release once nightly dosage form. These sodium ions in the coated drug resinate complex act as a pore former to enhance the dissolution of oxybate from coated drug resinate complex.

A composition of oxybate ER POS may comprise of calcium chloride to facilitate dissolution of oxybate ER POS at initial hours post-dosing. In certain embodiments, the oxybate compositions provided herein (e.g., ER POS) contain approximately 1 mEq to 12 mEq of calcium chloride to obtain the desired dissolution profile. Without wishing to be bound by theory, it is believed that Calcium chloride will generate calcium ions in biological fluid, and it exchanges oxybate ions from the drug resinate (complex) that increases the dissolution of oxybate in initial hours post dosing. The dissolution of oxybate in initial hours is contributes to providing the desired initial plasma concentrations of oxybate from the oxybate ER compositions (e.g., POS) provided herein. Oxybate has a short plasma half-life of about 30-45 minutes.

The combination of an immediate release (IR) and extended release (ER) drug resinate particles, low sodium content and calcium chloride provides a desirable maximum plasma concentration level (Cmax) for oxybate and allows therapeutic levels to be maintained to about five hours post-dose. Thereafter, the compositions permit oxybate levels to completely clear within about 10 hours post-dose. Optionally, one or more of the immediate release, extended release or delayed release components comprise an oxybate—anion exchange resin complex—optional matrix. At least one coating layer is present in the component, which at least one coating is over the oxybate—anion exchange resin complex—matrix. Optionally, one or more of the immediate release, extended release or delayed, extended release components comprise an oxybate—anion exchange resin complex—optional matrix. Where at least one coating layer is present in the component, this at least one coating is over the oxybate—anion exchange resin complex—matrix.

Provided herein are pharmaceutical compositions and formulations comprising total oxybate Immediate Release (IR) component(s) from 30% to 75% w/w, total oxybate resinate Extended-Release (ER) components from 25% to 70% w/w, less than 200 mg of sodium and 75 mg (1 mEq)-882 mg (12 mEq) of Calcium chloride per 9 g of dose. In certain embodiments, the compositions further comprise a floating interpenetrating network (IPN) forming system.

In certain embodiments, the oxybate immediate release component is present in an amount of about 30% w/w to 80% w/w, or about 20% to 75%, or about 65 to 70% w/w (based on total oxybate in the composition). In certain embodiments, the oxybate extended release component is present in an amount of about 25% w/w to 70% w/w, or 25% % w/w to 60% w/w, or about 40% w/w (based on total oxybate in the composition).

In certain embodiments, there are two different extended release components, as described herein, wherein the total oxybate in the extended release component comprising a pH-independent coating with no functional enteric or pH-dependent coating is about 5% to about 30% w/w of the total oxybate in the composition. In certain embodiments, the total oxybate in extended release comprising a pH-independent coating with no functional enteric or pH-dependent coating is about 10% to about 15% w/w of the total oxybate in the composition.

The SITCS component does not release a significant amount of oxybate in the initial hours post dose when the immediate release component is releasing oxybate at significantly faster rate, as defined herein. In certain embodiments, the novel combination of immediate release, extended release and SITCS coated components work together to achieve effective plasma oxybate levels at 1 hour (C1) post-dosing, a controlled Cmax, effective plasma levels up to 5 hr (C5) post-dosing without a decrease in AUC: Without wishing to be bound by theory, it is believed to help in controlling the Cmax and initial plasma concentrations and hence control the side effects. The SITCS release component starts releasing oxybate at higher pH, most preferably above a pH of about 4, which is the pH present in the small intestine.

In certain embodiments, providing a delayed effect for about 2 hours post dosing, the SITCS component provides an ER for about 3 to about 6 hours. In certain embodiments, the best results are obtained when the dosage form is administered about 2 hours after the evening meal.

The immediate release component begins to release oxybate without any lag time post-dosing (e.g., may begin in under 10 minutes, or about 10 minutes) and contributes to initial oxybate plasma concentration levels. In certain embodiments, the immediate release component (i.e., oxybate—anion exchange resin complex) releases no less than about 75% to about 80% of its oxybate in about 1 hour, or no less than 75% to 80% of its oxybate in 1 hour. This may be assessed in an in vitro dissolution assay, e.g., as defined later. The extended release component provides oxybate release for about 5 to about 8 hours, post-dose.

Solids and liquid dosage forms are described herein. In one particularly suitable embodiment, the compositions are a powder for suspension dosage form. In certain embodiments, the powder for suspension is manufactured using all the components in the specific ratio selected based on w/w of the oxybate dose along with diluent granules containing excipients.

Certain pharmaceutically acceptable salts of GHB are referred to as "oxybates", e.g., sodium oxybate. Using a similar terminology, complexes formed between a GHB salt (having its counterion removed) and an anion exchange resin are termed herein "oxybate—anion exchange resin complexes". The term GHB and oxybate may be used interchangeably in this document, unless otherwise specified.

Optionally, the powder composition may contain a dye which dissolves in an aqueous alcoholic liquid produces a distinctive color, to facilitate safety. In another alternative, the composition may contain a flavor which when admixed with alcohol provides a noxious flavor to the composition. Further, the composition provides an extended release for oxybate which is clinically advantageous, as it avoids the need for the patient to wake up during the night to take a second dose. This composition also reduces the possibility of errors which may occur in the preparation of multiple individual doses.

In certain embodiments, the composition provided herein provides a single plasma concentration peak. In certain embodiments, the compositions provided herein provide are characterized by a plateau in the mean plasma concentration levels for oxybate, which may be measured using arithmetic mean and/or geometric mean.

As used herein, a "functional coat" is a coating layer which functions to modify the release profile of the coated active drug, e.g., GHB. Such release may be in a time-dependent, pH-dependent, or pH-independent manner, or a combination thereof. In one embodiment, the functional coat is a pH-independent diffusion barrier coating. In another embodiment, the functional coat is a pH-dependent (e.g., enteric), delayed release coating, which is in combination with the diffusion barrier coating. These and other suitable coatings are described in more detail below.

As provided herein, a "floating IPN" comprises a full IPN or a semi-IPN and entrapped gas. Suitably, the floating IPN further contains the active drug(s).

As used herein, a "interpenetrating polymer network (IPN)" comprises two or more polymer networks which are at least partially interlocked on a molecular scale but not covalently bonded to each other and cannot be separated unless chemical bonds are broken. An IPN may be formed sequentially, i.e., in sequential IPN the second polymeric network is formed following the completion of cross-linking of first polymeric network. Alternatively, an IPN may be formed simultaneously, i.e., prepared by a process in which all polymer networks are formed concurrently.

As used herein a "semi IPN" refers to an IPN system wherein less than all of the polymer networks is interlocked on a molecular scale. For example, in an IPN system containing two polymer/polysaccharide components which can be crosslinked, a semi-IPN would reference the system when only one of the two components is crosslinked (networked). For example, in an IPN system containing two crosslinkable polymer/polysaccharide components which can be crosslinked, a semi-IPN would reference the system when only one of the two polymer components is cross-linked (networked). A composition as provided herein, suitable for oral ingestion, may contain a fully crosslinked (full IPN), or a semi IPN.

Oxybate—Anion Exchange Resin Complex

An oxybate—anion exchange resin complex may be used in the immediate release component and the modified release oxybate components of the composition which are described herein. In the immediate release oxybate component, typically no functional coating is provided over the oxybate—anion exchange resin complex. Such a complex may be in an optional matrix. An immediate oxybate—anion exchange resin complex—optional matrix may have a non-functional coat. If present, the non-functional coat is typically present in a single coating layer. In the examples below, the term "resinate" is used interchangeably with "anion exchange resin complex"; i.e., oxybate resinate and oxybate—anion exchange resin complex refer to the same component.

An "anion exchange resin" is an insoluble organic polymer containing basic groups for exchanging anions when in a suspension with a second moiety containing anions. In certain embodiments, a "strong anion exchange resin" is a "strongly basic anion exchange resin".

Unless otherwise specified, it will be understood that reference to "anion exchange resin" throughout this specification is inclusive of "strongly basic anion exchange resins" and "cholestyramine resins" as described herein. An example of an anion exchange resin is a pharmaceutically acceptable grade of a cholestyramine resin, a strong base (Type 1) anion exchange resin powder comprising a polystyrene matrix and quaternary ammonium functional groups (e.g., polystyrene trimethylbenzyl ammonium chloride). The exchangeable anionic counterion is generally chloride which can be exchanged for, or replaced by, virtually any anionic species. Other commercially available pharmaceutical grade cholestyramine resins may include Type II resins, e.g., is PUROLITE® A430MR resin (DuPont De Nemours). As described by its manufacturer, this resin has an average particle size range of less than 150 microns, a pH in the range of 4-6, and an exchange capacity of 1.8-2.2 eq/dry gm. Another pharmaceutical grade cholestyramine resin is available as DUOLITE™ AP143/1094 [DuPont De Nemours], described by the manufacturer as having a particle size in the range of 95% less than 100 microns and 40%, less than 50 microns. The commercial literature from the suppliers of these and other resin is incorporated herein by reference (PUROLITE® A-430 MR; DOW Cholestyramine USP, Form No. 177-01877-204, [DuPont De Nemours; DUOLITE™ AP143/1083, DuPont De Nemours). In a further embodiment, DUOLITE™ AP143/1096 is selected, which has a particle size in which ≥55% of the particles are less than 150 microns and the mean diameter is ≥130 microns, as determined using dry sieving method derived from USP <811> and <796>. The Dow Chemical resins have a pH in the range of 4 to 6 as determined using USP <891> and an ion exchange capacity of 1.8 to 2.2 as determined using HPLC/UV methods. In certain embodiments, weakly basic anion exchange resins may be selected for use in the methods and/or compositions provided herein. Ion exchange resins with primary, secondary and tertiary amine groups as active functional groups show weak basicity, so they are called weakly basic anion exchange resins (WBAERs). There are several types of WBAERs: one with only one kind of amine groups and the other with more than two kinds of amine groups, e.g., DIAION® WA10 (acrylic acid type with tertiary amine groups), WA20, WA21J (mixtures of primary and secondary amine groups), and WA30 (tertiary amine groups). For example, the weakly basic anion exchange resins include the "DIAION" @series [Mitsubishi Chemical Corporation], which are described by the manufacturer as having two types with different alkalinity strengths, Type I with a trimethyl ammonium group and Type II with a dimethylethanol ammonium group. Other products may comprise chitosan hydrochloride. Other suitable anion exchange resins may include, e.g., POROS® XQ anion exchange resins available from ThermoFisher Scientific.

Both regularly and irregularly shaped particles may be used as resins. Regularly shaped particles are those particles that substantially conform to geometric shapes such as spherical, elliptical, cylindrical and the like, (e.g., three dimensional shapes readily described by a three dimensional space group). Irregularly shaped particles are all particles not considered to be regularly geometrically shaped (for example not readily described by a three dimensional space group), such as particles with amorphous shapes and particles with increased surface areas due to surface channels or distortions. The regular and irregularly shaped particles can comprise any of the anion exchange resins disclosed herein.

The oxybate—anion exchange resin complex may be prepared using a conventional ion exchange resin loading (complexing) processes or variations thereof. See, e.g., techniques described in U.S. Pat. No. 8,062,667; US Patent Publication No. US2005/181050; U.S. Pat. Nos. 8,343,546; 5,980,882 with the following modification. This complexation involves dissolving an oxybate salt (e.g., sodium oxybate or magnesium oxybate) —as a starting material and admixing in an aqueous medium with the water-insoluble anion exchange resin. Typically, the oxybate—anion exchange resin complex thus formed is collected by filtration and washed to remove any the counterion (e.g., sodium, calcium, potassium or magnesium), unbound oxybate or by-products. Such a washing step may involve water or another aqueous solution. The complexes can be air-dried in trays, in a fluid bed dryer, or other suitable dryer, at room temperature or at elevated temperature.

In certain embodiments, more than one loading step (equilibration) is utilized in order to achieve the desired oxybate levels complexed onto the anion exchange resin. The use of two or more loading stages, separating the resin from the liquid phase between stages, may be used to maximize loading of the oxybate onto the anion exchange resin. For example, a single equilibration (complexing) may provide about 0.1% w/w to about 20% w/w oxybate, or 1% w/w to 20% w/w, or 5% w/w to 15%, or 7% w/w to 10% w/w in the resulting oxybate—anion exchange resin complex. However, in certain embodiments, loading of about 15% w/w to about 35% w/w, about 15% w/w to about 25% w/w, or higher than is 25% is desired, which has been found to require multiple loading steps. In certain embodiments, about 25% w/w to about 30% w/w oxybate, or 25% w/w to 29% w/w can be achieved, wherein the weight is based on the total weight of the oxybate—anion exchange resin complex. In certain embodiments, about 27% w/w to 29.5% w/w oxybate is present, wherein the weight is based on the total weight of the oxybate—anion exchange resin complex. In certain embodiments, 28% w/w to 29.5% w/w oxybate is present, wherein the weight is based on the total weight of the oxybate—anion exchange resin complex. In certain embodiments, about 27% w/w oxybate is present, wherein the weight is based on the total weight of the oxybate—anion exchange resin complex. Such oxybate—anion exchange resin complexes may be admixed with suitable hydrophilic or hydrophobic polymeric components to form a matrix, which oxybate—anion exchange resin complex—matrix is optionally coated. Optionally, a non-functional seal coat may be applied to the oxybate—anion exchange resin complex, oxybate—anion exchange resin complex—matrix, and/or coated oxybate—anion exchange resin complex—optional matrix. Optionally or additionally, one or more functional coating may be provided over an oxybate—anion exchange resin complex matrix and no separate non-functional coat is utilized.

An oxybate—anion exchange resin complex may be admixed with a suitable granulating agent, e.g., a hydrophilic polymer or hydrophobic excipient which forms a matrix. The resulting matrix contains the oxybate—anion exchange resin complex in a matrix with the hydrophilic or hydrophobic polymer, or hydrophobic excipient. In certain embodiments, the matrix-forming polymer or excipient is present in an amount of about 10% to about 50% by weight, of the resulting matrix, more preferably about 20% to about 40%, or about 30%, by weight. In certain of the working examples below, a "medium" molecular weight polyvinylpyrrolidone (PVP) is used. (e.g., KOLLIDON® K30) This product, having the chemical formula $(C_6H_9NO)_n$, has a K-value of 27.0-32.4 and an average molecular weight of about 44,000 to about 54,000 Das in accordance with European and U.S. Pharmacopoeias. It is calculated from the relative viscosity in water [H. Fikentscher, Cellulos Chemie 13 (1932): 58-64 und 71-74. See, e.g., BASF's Volker Bühler KOLLIDON®

Polyvinylpyrrolidone excipients for the pharmaceutical industry, 9th revised edition, pp. 1-330 (March 2008). For example, average molecular weight (MW) may be determined using light scattering, or an ultracentrifuge. Alternative methods, include number average (Mn, determined by osmometry, membrane filtration) or average viscosity). However, other PVP polymers, e.g., those have an average molecular weight of about 28,000 to about 100,000 which are soluble in water at room temperature may also be selected.

In certain embodiments, the oxybate—anion exchange resin complex is granulated with a hydrophobic material which provides a release retardant function, such as glyceryl behenate. However, another hydrophobic material which is preferably a pH-independent, high melt temperature, matrix-forming, water-insoluble wax or waxy substance is selected. As used herein, a "pH-independent, high melt temperature, matrix-forming, water-insoluble wax or waxy substance" includes hydrophobic waxes or wax-like substances which are solids at room temperature. While waxes having melting points in the range of about 30° C. to about 50° C. may be utilized, blending or other processing may need to be performed at cold temperatures to counter heat generated during processing for waxes or wax-like substances having lower melting points. Particularly desired are waxes and waxy-like substance which have melting point in the range of about 50° C. to about 80° C. Examples of a suitable pH-independent, high melt temperature, matrix-forming, water-insoluble wax or waxy substance include, e.g., stearyl alcohol, acetyl alcohol, glyceryl palmitostearate, glyceryl monostearate; and waxes selected from one or more of carnauba wax, beeswax, candelilla wax, microcrystalline wax, ozokerite wax, paraffin waxes, glyceryl behenate, glyceryl stearate, glyceryl oleate, glyceryl myristate, cetyl palmitate, cetyl caprylate, stearyl palmitate, stearyl stearate, derivatives and mixtures thereof. In one embodiment, glyceryl behenate is used. Glyceryl behenate is available under the trade name of COMPRITOL® 888 ATO (Gattefosse, France) has a melting point of approximately 70° C. and a hydrophilic-lipophilic balance (HLB) value of 2. In another embodiment, glyceryl palmitostearate or glyceryl behenate is used. The glyceryl palmitostearate under the trade name of PRECIROL® ATO 5 (Gattefosse, France) is a wax type lipid excipient with a melting point of approximately 56° C. and an HLB value of 2. In still another embodiment, cetostearyl alcohol is used, which has a melting point in the range of about 48° C. to about 56° C., or about 52° C. In a further examples, acetyl alcohol, which has a melting point in the range of about 45° C. to about 52° C. may be used alone or in combination with one or more waxes or waxy substances; Suitably, pharmaceutical grade waxes or waxy substances are used in the compositions. Examples of other such substances are Carnauba wax, vegetable wax, fruit wax, stearic acid, microcrystalline wax, bees wax, hydrocarbon wax, paraffin wax, cetyl esters wax, emulsifying wax, candelilla wax, free wax acids (of which stearic acid is one example), esters of wax acids, propylene glycol monostearate, glycerol monostearate, palm wax, lignite wax, ozokerite, ceresin wax, lardaceine, China wax, stearyl alcohol, cetyl alcohol, cetostearyl alcohol, lauryl alcohol, myristyl alcohol, hydrogenated vegetable oil, hydrogenated castor oil, fatty acid, fatty acid ester, fatty acid glyceride, and polyethylene glycol (with Mol. Wt. higher than 3000). Optionally, the resin may be granulated with the polymeric materials that are used for coating (e.g. SURELEASE®, EUDRAGIT® RLS/RS or KOLLICOAT® SR30D) followed again by the coating with these polymers. In other embodiments, polymers and co-polymers may contain hydrophobic polymers/co-polymers and/or blends of hydrophobic and hydrophilic polymers/copolymers. See, e.g., applications US Published Patent Application Nos. US 2005/0232986; US 2005/0232987; US 2005/0232993; US 2005/0266032; U.S. Pat. Nos. 7,067,116; 6,667,058, 6,001,392, the disclosures of which are incorporated herein by reference, among others.

Alternatively, in certain embodiments, the matrix components avoid the use of polymers which may function to retard release of the oxybate (e.g., hydrophobic polymers). In such embodiments, the matrix forming component comprises primarily a hydrophilic polymer. Examples of suitable hydrophilic polymers and co-polymers (e.g., polyvinylpyrrolidone) are described above. Other suitable hydrophilic polymer systems for admixing with the complex may include, e.g., propylene glycol, polyethylene glycol, polyethylene oxide, polyvinyl alcohol, mannitol, methyl cellulose, hydroxypropyl methylcellulose, hydroxypropyl cellulose, and sorbitol. Still other polymers may be selected and admixed or granulated with the complex to form a matrix.

In certain embodiments, An oxybate—anion exchange resin complex—matrix may contain about 5% by weight to about 50% by weight, or about 20% to about 40% by weight, or about 25% by weight of the matrix forming polymer, with the remainder of the weight being provided by the oxybate—anion exchange resin complex.

Immediate Release Component

In certain embodiments, a composition as provided herein contains an immediate release oxybate component. Suitably, such an immediate release component may be an oxybate—anion exchange resin complex—optional matrix which meets an immediate release profile as described below. Such a component typically lacks any functional coating in order to retain its immediate release profile. In certain embodiments, a strong anion exchange resin which is a cholestyramine anion exchange resin is selected.

By "immediate release" is intended a composition wherein not less than (>) 75% of the oxybate releases within a period of less than an hour, usually between about 0.1 hour and about 1 hour, and in certain embodiments, less than about 0.75 hours, from ingestion (post-dose). In certain embodiments, the immediate release oxybate—cholestyramine anion exchange resin complex of (a) releases at least 80% of its oxybate in less than one hour. Release rate may be determined in an in vitro release assay. See, e.g., 900 mL in 0.1 HCl and other conditions described in the figures and examples herein.

Any suitable GHB drug (e.g., an oxybate salt), or mixtures thereof, may be selected to complex with anion exchange resin for the immediate release component. In certain embodiments, the immediate release component is a powder which comprises an oxybate—anion exchange resin complex. The compositions provided here are designed to avoid the presence of uncomplexed oxybate, oxybate salts, e.g., calcium oxybate, magnesium oxybate, or potassium oxybate, and the counterions of oxybate salts. As used herein, the immediate release powder is a relatively homogenous mixture of separate particles. As described herein, the immediate release particles generally have an average size of about 250 microns to about 425 microns. In certain embodiments, the oxybate—anion exchange resin complex—optional matrix has a moisture barrier coating. Such a moisture barrier coat serves to preserve the integrity and stability of the active drug during shelf-life storage and/or facilitates application of color.

As used herein, a "non-functional coating" is optional and refers to a coating which contributes no detectable modified drug release functions to a coated drug and may alternatively be referred to as a "seal coat". In other words, such a coating will not change the drug release profile of an immediate release drug to a modified release profile. The non-functional coating may contain a polymer, or a non-polymeric material, which is a moisture barrier to preserve the integrity of the coated drug (granules) during storage and/or further processing. The non-functional coating may additionally or alternatively comprise oxygen barrier properties. In certain embodiments, the non-functional coating assists in protecting the coated drug product against interaction with the packaging in which the product is stored (e.g., an aluminium foil pouch). As provided herein, some of these non-functional materials are available commercially. See, e.g., a low molecular Hypromellose; methylhydroxy ethylcellulose; hydroxypropyl cellulose; polyvinyl pyrrolidone; polyvinyl alcohol (see, e.g., OPADRY® II (polyvinyl alcohol, polyethylene glycol, talc) or OPADRY® AMB (Colorcon Inc., Harleysville, PA); carboxymethyl cellulose; a combination of polyacrylic resin, carbomer, and a powdered cellulose coat. As used herein, a "low molecular weight" has a viscosity of about 100 cP to about 5000 cP. Weight percentages of these non-functional coatings, where present, are provided as weight added, in an amount of about 1% to about 50%, or about 10% to about 40%, or about 20% to about 30% weight added to the finished resinate particle or particulate.

The immediate release component may contain one or more different immediate release forms, e.g., two different anion exchange resin may utilized, and/or one complex may have a matrix and the other may have no matrix. In certain embodiments, the immediate release component is an oxybate—anion exchange resin complex—optional matrix as described herein, but which lacks a functional coat. In certain embodiments, the immediate release component lacks the counterion of any pharmaceutically acceptable salt from the salt of GHB used to generate the oxybate—anion exchange resin (i.e., sodium free, sodium and/or potassium free, etc).

Modified Release Components

In addition to the immediate release oxybate component discussed above, the composition contains an extended release oxybate component (also referred to as ER component) and an oxybate component which has a bilayer coating system comprising a blend of delayed and extended release coating polymers in a layer over a diffusion barrier coating layer (also referred to as SITCS component), which is over the oxybate—anion exchange resin complex (resinate) or oxybate resinate matrix. These two modified release oxybate components contain a first oxybate resinate—optional matrix as described in the immediate release component with a single diffusion barrier coating layer and a second oxybate resinate—optional matrix with a bi-layer SITCS coating. The extended release oxybate component comprises a pH-independent, diffusion barrier coating layer over the oxybate—anion exchange resin complex—optional matrix, wherein the barrier coating layer provides an extended release profile to the oxybate in the complex. The SITCS oxybate component provides a bilayer coating which provides a delay or lag time and contributes to the extended release post-dosing for oxybate.

In general, the term "modified release" includes sustained release, controlled release, prolonged release, delayed release, timed release, retarded release, slow release, and extended release. The release rate can be controlled by the use of modified release polymers such those described herein. As described herein, due to the nature of the active component of the compositions, i.e., an oxybate—anion exchange resin complex, the modified release for the oxybate is designed to have a modified release which provides release for 3 hours to 8 hours, 3.5 hours to 8 hours, 4 hours to 8 hours, 4.5 hours to 8 hours, 5 hours to 8 hours, preferably no more than about 7.5 hours, and more preferably no more than 7 hours. In certain embodiments, there is substantially complete release of oxybate in about 8 hours post-dose. In certain embodiments, plasma levels are below 25 microgram per ml at 8 hours. In still other embodiments, there are no detectable plasma levels of an oxybate drug at 10 hours, preferably none at 9 hours, and more preferably, none at 8.5 hours. In other embodiments, a composition having a higher dose is designed to have therapeutic effect at no more than about 6 hours, or at no more than about 5 hours. For example, a composition as provided herein may have a modified release profile and provide a therapeutic effect for about 3.5 to 7 hours. In certain embodiments, release may be determined using an in vitro release assay.

In certain embodiments, the compositions contain three oxybate multiparticulate components, each with a different release profile: (a) immediate release oxybate—anion exchange resin complex—optional matrix multiparticulates, (b) an extended release oxybate resinate multiparticulate component, and (c) a SITCS oxybate resinate multiparticulate component.

In certain preferred embodiments, the coating layers do not contain any active compound (e.g., no oxybate components).

A. Extended Release Component

In one embodiment, an extended release component comprises a barrier coated, oxybate—anion exchange resin complex—optional matrix. In certain embodiments, the matrix is present. In other embodiments, no matrix is present. As described herein, the extended release component of the composition is believed to help achieve significantly higher plasma concentration levels at 5 hours post-dose (C5), which is desirable for a once a night dosage regimen.

As used herein, the term "extended release coating" refers to the coating layer functioning to modify the rate of release of the oxybate from the coated oxybate—anion exchange resin complex—optional matrix, as compared to an immediate release oxybate, such as a free oxybate active pharmaceutical ingredient (API) (e.g., sodium oxybate or another pharmaceutically acceptable salt thereof) which may be used as a point of reference or the immediate release oxybate—anion exchange resin complex—optional matrix provided herein. Suitably, the diffusion barrier coating has a pH-independent release (i.e., it is not an enteric or reverse enteric coating which has pH-dependent release) and is a water-insoluble, water-permeable coating material. The diffusion barrier coating is applied over the oxybate—anion exchange complex—optional matrix (e.g., as an aqueous dispersion or a solution), dried, and milled or passed through a screen such that the barrier coated oxybate—anion exchange complex—optional matrix multiparticulates are, e.g., an average of about 125 microns to about 1 mm, or an average of about 300 microns to about 900 microns, or about 400 microns to about 800 microns.

In one embodiment, the diffusion barrier coating layer is about 10% w/w to about 90% w/w, or about 15% w/w to about 80% w/w, or about 15% w/w to about 50% w/w, based on the weight of the oxybate—anion exchange resin complex (and the weight of the complex prior to any matrix component) prior to coating. In certain embodiments, the diffusion barrier coating layer comprises a polyvinyl acetate polymer with a stabilizer and a plasticizer, as described herein. However, other diffusion barrier coatings such as are described herein may be selected, such as, e.g., a barrier coating comprising, a low-permeability, pH-independent polymer or co-polymer comprising trimethylammonium methyl methacrylate chloride, methyl methacrylate, ethyl acrylate polymer (e.g., EUDRAGIT® RS), and a plasticizer, a barrier coating comprising cellulose acetate and a plasticizer, and/or a pH-independent coating, e.g., a coating comprising a neutral copolymer based on ethyl acrylate and methyl methacrylate (e.g., EUDRAGIT® NM brand poly (ethyl acrylate-co-methyl methacrylate) 2:1) with a plasticizer, or mixtures thereof.

Generally, a plasticizer or a mixture of plasticizers combined for a total amount of about 2% to about 50% by weight of the coating layer, more preferably about 2% to about 30% by weight of the coating layer on the coated oxybate—anion exchange resin complex—optional matrix. Preferably a suitable plasticizer is in a range of about 2.5 to about 15% by weight of the coating layer based on the coated complex provides the most desirable properties. Suitable plasticizers may be water soluble and water insoluble. Examples of suitable plasticizers include, e.g., dibutyl sebacate, propylene glycol, polyethylene glycol, polyvinyl alcohol, triethyl citrate, acetyl triethyl citrate, acetyl tributyl citrate, tributyl citrate, triacetin, and SOLUPHOR® P (2-pyrrolidone), and mixtures thereof. Other plasticizers are described in patent application publication US 2003/0099711 A1, May 29, 2003, page 4 (0041) the disclosure of which is incorporated herein by reference.

In one embodiment, the diffusion barrier coating is applied as an aqueous dispersion which is dried in order to provide the desired modified release profile. The coating may be admixed with a plasticizer and/or cured in order to provide the desired release profile, e.g., in the case of an aqueous-based polyvinyl acetate coating. In one embodiment, the barrier coating is applied as an aqueous dispersion of a water insoluble polymer comprising a polyvinyl acetate polymer, or a blend of polymers comprising a polyvinyl acetate polymer. In one embodiment, the barrier coating further contains a plasticizer which enhances the tensile strength of the barrier coating layer.

In certain embodiments, a diffusion barrier coating is applied in the form of an aqueous dispersion containing polyvinyl acetate (PVA) polymer based aqueous coating dispersion and a plasticizer. The PVA is insoluble in water at room temperature. The PVA may be used in either substantially pure form or as a blend. Suitably, a hydrophilic polymer is combined with the PVA in order to provide the oxybate drug with the desired release profile. For example, where the barrier coating comprises a PVA polymer, the PVA polymer is present in an amount of about 10% to about 80% w/w of the final barrier coating layer, at least about 75%, at least about 50%, about 15% w/w of the final barrier coating layer. In one embodiment, the barrier coating layer includes a hydrophilic polymer in an amount of about 5% to about 70% w/w, or about 10% to about 50%, or about 15% to about 45% w/w of the coating layer. The use of polyvinylpyrrolidone is described below as a suitable hydrophilic polymer. However, other suitable hydrophilic polymers may be readily selected, e.g., propylene glycol, polyethylene glycol, polyvinyl alcohol, polyvinyl pyrrolidone (e.g., KOLLIDON® K30)m mannitol, methyl cellulose, hydroxypropyl methylcellulose, hydroxypropyl cellulose, and sorbitol.

A commercial polyvinyl acetate blend contains primarily a polyvinyl acetate polymer, a stabilizing component, and minor amounts of a surfactant such as sodium lauryl sulfate. Where the barrier coating comprises PVP as the stabilizer component, the final barrier coating layer generally contains about 5 to about 10% w/w of polyvinyl pyrrolidone. In one desired embodiment, the aqueous based barrier coating solution is KOLLICOAT® SR 30 D (BASF Corporation) and whose composition is about 27% PVA polymer, about 2.7% polyvinylpyrrolidone (PVP), and about 0.3% sodium lauryl sulfate (an anionic surfactant) (solids content 30% w/w), mixed with a plasticizer. Generally, stabilizing components are present in an amount totaling less than about 10% w/w, and preferably less than about 5% w/w. See, also, U.S. Pat. Nos. 6,066,334 and 6,026,277, which is incorporated by reference herein. Where this product is selected, additional hydrophilic polymer may be added to facilitate a more rapid release, i.e., in less than 8 hours as described herein. Optionally, a selected surfactant is present in an amount of about 1% or less. In one embodiment, the surfactant is a non-ionic surfactant. Optionally, an ionic surfactant may be selected.

In certain embodiments, the barrier coating layer is formed by application of the aqueous dispersion containing the KOLLICOAT® SR-30D—plasticizer is dried and cured. Preferably, the coating is cured for about 1 to about 24 hours. In alternate embodiments, the coating is cured for about 4 to about 16 hours, and preferably about 5 hours at high temperature, e.g., about 50° C. to about 65° C., and preferably about 60° C. See, e.g., US Published Patent Application No. US 2007/0215511A, published Sep. 20, 2007, and its counterpart application, WO 2007/109104, the disclosures of which are incorporated herein by reference.

Another diffusion barrier coating polymer or co-polymer may be selected. In such other embodiment, a non-aqueous solvent-based ethylcellulose, such as the commercially available ETHOCEL™ products (DuPont DeNemours) or an aqueous SURELEASE® ethylcellulose [Colorcon] may be modified in order to achieve the barrier coating characteristics defined herein, e.g., by addition of a sufficient amount of plasticizer to improve flexibility and/or by curing to a sufficient temperature to achieve the desired release rate. Dow's website describes three of these products, Std 7 (viscosity of 6-8 mPa-s (CP); Std 10 (9-11 mPa-s (CP)); Std 20 (18-22 mPa-s (CP)), each of which has a 48.0-49.5% ethoxyl content) as being useful for tablet coating. Further, optionally combining one of these polymers in combination with a water-soluble active and/or water-soluble excipient such as a METHOCEL® cellulose ether and/or CARBOWAX® polyethylene glycols is further described. Alternatively, it may be possible to modify an aqueous based ethylcellulose barrier coating in order to achieve the modified release barrier coating characteristics required herein, e.g., by addition of a sufficient amount of plasticizer to improve flexibility and/or by curing to a sufficient temperature to achieve the desired release rate. See, e.g., the barrier coatings described in U.S. Pat. Nos. 6,066,334 and 6,046,277; see, also, e.g., U.S. Pat. Nos. 6,046,277 and 6,001,392; US Published Patent Application No. 2003/0099711 and related application WO 03/020242; WO 2006/022996 and related applications US Published Patent Application Nos. US 2005/0232986; US 2005/0232987; US 2005/0232993; US 2005/0266032; U.S. Pat. Nos. 7,067,116; 6,667,058, 6,001,392, the disclosures of which are incorporated herein by reference, among others.

It may be possible to utilize other aqueous or non-aqueous solvent based systems which do not require curing. For example, an aqueous based acrylic polymer (a Eudragit® RL30D and Eudragit® RS30D blend is described herein) but benefits from the addition of an anti-tacking agent in order to facilitate processing and even coating. Suitable anti-tacking agents include, e.g., talc, glycerol monostearate (GMS), and mixtures thereof. These agents are present in an amount of about 0.2%-4.5% w/w based on the dry weight of the coating polymer applied to form the coating layer of the modified release component. In certain embodiments, the coating layer resulting from application of an acrylic polymer based coating does not require curing.

In one embodiment, the coating may be a EUDRAGIT® brand acrylate based co-polymer coating materials [including, e.g., a poly (ethyl acrylate-co-methyl methacrylate-co-trimethylammonioethyl methacrylate chloride) polymer system]. For example, Eudragit® RS 30D [a pH-independent, 30% aqueous dispersion of poly (ethyl acrylate-co-methyl methacrylate-co-trimethylammonioethyl methacrylate chloride) 1:2:0.1)], or Eudragit® RL 30D [a 30% aqueous dispersion, pH-independent polymer, poly (ethyl acrylate-co-methyl methacrylate-co-trimethylammonioethyl methacrylate chloride) 1:2:0.2)] may be selected as the barrier coating. In one embodiment, a blend of Eudragit® RS 30D and Eudragit® RL 30D may be prepared to optimize the hydrophilicity or hydrophobicity of the film in order to achieve desirable release profiles.

A diffusion barrier coating as described herein may be applied using techniques described by the polymer manufacturer and/or techniques which are known to those of skill in the art. Suitable methods and apparatus have been described in the patent and non-patent literature and include, e.g., spraying in a fluid bed processor or use of a pan coating. The coating solution can be sprayed in a fluid bed processor (e.g., VECTOR™ FLM-1 fluid bed processor) using the Wurster process. The diffusion barrier coated oxybate—anion exchange resin complex—(optional matrix) is then dried and/or cured.

B. Bilayer Small Intestine Targeted Drug Coating System (SITCS) Oxybate Component In addition to the extended release component, a SITCS modified release component is provided. In certain embodiments, the composition comprises a bilayer SITCS coated oxybate—anion exchange resin complex—optional matrix. The SITCS bilayer system comprises a pH-independent barrier coating over the oxybate—anion exchange resin complex—optional matrix which further comprises a coating layer which comprises a blend of at least one pH-dependent polymer or copolymer (i.e., enteric coat) and at least one pH-independent, diffusion barrier coat polymer or co-polymer over the barrier coated oxybate—anion exchange resin complex. In preferred embodiments, this component comprises only two functional coating layers, with the barrier coating being the inner layer directly over the oxybate resin complex—optional matrix and the blended pH-independent/pH-dependent release coating layer being the outer layer.

In certain embodiments, the blended polymer coating layer comprises two different pH-independent barrier coating polymer/copolymers. In one embodiment there is a first pH-independent barrier coating layer over the oxybate—anion exchange resin complex. This may be the same or different from the pH-independent barrier coating layer in the extended release component. In certain embodiments, the pH-independent polymer/copolymer in the blended pH-dependent/pH-independent layer which further comprises an enteric polymer/copolymer differs from the polymer/copolymers used in the pH-independent diffusion barrier coating layer. Suitably, the blended pH-dependent/pH-independent coating layer comprises a blend of pH-independent polymer/copolymers and pH-dependent enteric coating polymers/copolymers which are compatible. Examples of suitable polymer/copolymer combinations for the blended pH-dependent/pH-independent coating layer include, e.g., polyvinylacetate (pH-independent; barrier coating) and polyvinyl acetate phthalate (enteric) or a methylacrylic acid copolymer enteric coat polymer and an ethyl acrylate and methyl methacrylate copolymer pH-independent coating polymer. Other suitable combinations may be selected as described herein.

Because the blended pH-dependent/pH-independent outer coating reduces exposure of the extended release coating to bodily fluids until after the component reaches the small intestine and exposure to bodily fluids having a pH greater than 4, or in certain embodiments, pH 4.5 or higher, there is a lag time between dosing (oral ingestion) and the onset of release of oxybate in the delayed, extended release component. In certain embodiments, the SITCS component provides a lag time post-dosing of about 1 hour to about 3 hours and reduced release of oxybate in the acidic medium of the stomach. In certain embodiments, the lag time is about 1.5 hours to about 2.5 hours, or about 1.75 hours to about 2.5 hours, of values therebetween.

In certain embodiments, the blended pH-independent/pH-dependent release coating layer comprises a range of about 1:9 to about 9:1, more preferably about 3:7 to about 7:3, more preferably about 4:6 to about 6:4. In certain embodiments, the blended pH-independent/pH-dependent release coating layer comprises about 40% w/w pH-dependent enteric coating polymer or copolymer to about 60% w/w pH-independent diffusion barrier coating polymer or copolymer, based on the weight of polymers/copolymers in the coating layer. In certain embodiments, the blended pH-independent/pH-dependent release coating later comprises about 60% w/w pH-dependent enteric coat polymer to about 40% w/w pH-independent enteric coat polymer or copolymer, based on the weight of the polymers/copolymers in the coating layer. In certain embodiment, the blended pH-independent/pH-dependent release coating layer comprises about 50% w/w enteric coating polymer/copolymer to about 50% w/w pH-independent barrier coating polymer/copolymer, based on the weight of polymers/copolymers in the coating layer. Optionally, the blended pH-independent/pH-dependent release coating layer further comprises about 0.5% w/w to about 10% w/w of a plasticizer, and one or more homogenizers and/or one or more surfactants.

Suitably, the pH-dependent enteric polymer component of the blended pH-independent/pH-dependent release coating layer is selected such that the delayed release coating component permits release of the oxybate when the dosage form reaches the small intestine or a region in which the pH is greater than pH 4, and more generally in the range of pH 4 to 8. Preferred coating pH-sensitive materials, which remain intact in the lower pH environs of the stomach, but which disintegrate or dissolve at the pH commonly found in the small intestine of the patient. The enteric polymer coating material begins to dissolve in an aqueous solution at a pH between about 4.5 to about 5.5, dissolving more rapidly at a pH above about 5.5. The pH-solubility behavior of the enteric polymers of the present invention are such that significant dissolution of the enteric polymer coating will not occur until the dosage form has emptied from the stomach. The pH of the small intestine gradually increases from about 4.5 to about 6.5 in the duodenal bulb to about 7.2 in the distal portions of the small intestine (ileum). In order to provide predictable dissolution corresponding to the small intestine transit time of about 3 hours and permit reproducible release therein, the coating should begin to dissolve within the pH range of the duodenum and continue to dissolve at the pH range within the small intestine. Therefore, the amount of enteric polymer coating should be such that it is substantially dissolved during the approximately three hour transit time within the small intestine.

In certain embodiments, this extended release component of the blended pH-dependent/pH-independent release coating layer may use the same extended release polymer is present in the non-delayed extended release coating layer, but at a lower weight percentage. In other embodiments, the extended release coating layer of the delayed extended release component comprises a different extended release polymer system than in present in the extended release component.

The oxybate—anion exchange resin complex—optional matrix is prepared as described herein and coated with an inner, barrier coating layer. The barrier coating layer may be applied as described in the extended release component, although the weight percent for the barrier coating layer is generally lower than is present in the extended release component. In certain embodiments, the pH-independent barrier coating layer is about 10% w/w to about 50% w/w, or about 20% w/w to about 45% w/w, based on the coated complex. In certain embodiments, the weight percent is about 15% w/w to about 50% w/w, or about 20% w/w to 50% w/w, or 25% w/w to 40% w/w, or about 30% w/w to about 45% w/w, about 25% w/w, about 30% w/w, or about 35% w/w.

In this embodiment, the barrier coated oxybate—anion exchange resin complex—optional matrix is provided with a second coating layer which is an outer pH-dependent enteric coating, which is applied over the barrier coating layer.

A variety of delayed-release (enteric) coating materials are known and may be selected. Examples include, e.g., cellulose acetate trimellitate, methacrylic acid, methyl methacrylate copolymer, cellulose acetate phthalate, cellulose acetate succinate, hydroxypropyl cellulose phthalate, hydroxypropyl ethyl cellulose phthalate, hydroxyl propyl methyl cellulose phthalate, hydroxyl propyl methyl cellulose acetate succinate, hydroxyethyl cellulose phthalate, methylcellulose phthalate, polyvinyl acetate phthalate, polyvinyl acetate hydrogen phthalate, amylase acetate phthalate, cellulose ester phthalates, cellulose ether phthalates, sodium cellulose acetate phthalate, starch acid phthalate, cellulose acetate butyrate, cellulose acetate maleate, cellulose acetate propionate, styrene maleic acid dibutyl phthalate copolymer, styrene maleic acid polyvinyl acetate phthalate copolymer propionate, shellac and mixtures thereof. Still other enteric polymers include, e.g., hydroxypropyl methylcellulose (HPMC) phthalate, HPMC acetate succinate, and pH-dependent acrylate polymers and co-polymers, and/or mixtures thereof. Still other enteric polymers include, e.g., one or more of a methacrylic acid copolymer dispersion, an ethyl acrylate and methyl methacrylate copolymer dispersion, and/or mixtures thereof. Certain of these polymers are commercially available in the EUDRAGIT® product line by Evonik Industries (e.g., the EUDRAGIT® L series (L30 D-55 or L100-55 (dissolution above pH 5.5), L100 or L12,5 (dissolution above pH 6.0)), or the S series (S100, S12,5, FS 30D (dissolution above pH 7.0)). EUDRAGIT® L-30-D 55 is an aqueous acrylic resin dispersion, an anionic copolymer derived from methacrylic acid and ethyl acrylate with a ratio of free carboxyl groups to the ester of approximately 1:1, and a mean molecular weight of approximately 250,000, that is supplied as an aqueous dispersion containing 30% w/w of dry lacquer substance. In certain embodiments, the pH-dependent polymer or co-polymer is selected from one or more of: a methacrylic acid copolymer, a methylacrylate copolymer, or polyvinylacetate phthalate, a methacrylic acid copolymer dispersion, an ethyl acrylate and methyl methacrylate copolymer dispersion, hydroxypropyl methyl cellulose (HPMC) acetate succinate, HPMC phthalate, polyvinyl acetate phthalate and/or mixtures containing same. Other commercially available enteric coating polymers may include, such as hydroxypropyl methylcellulose phthalate HP50 (HPMCP-HP50) (USP/NF 220824), HP55 (HPMCP-HP55) (USP/NF type 200731) and HP55S available from Shin Etsu Chemical, COATERIC® (polyvinyl acetate phthalate) (Berwind Pharmaceutical Services, Inc, SURETERIC® (polyvinyl acetate phthalate) (Colorcon, Ltd.), or AQUATERIC® (cellulose acetate phthalate) (FMC Corp.).

The enteric coating layer may also preferably contain a plasticizer, e.g., diethyl phthalate, triethyl citrate (Citroflex-2), triacetin, tributyl sebecate, or polyethylene glycol. Optionally an anti-adherent (anti-agglomerant) which is advantageously a hydrophobic material such as talc, magnesium stearate or fumed silica.

As discussed above, the blended pH-independent/pH-dependent coating layer further comprises a pH-independent diffusion barrier coating polymer or copolymer which may be the same or different in the extended release barrier layer and in the blended coating layer. These may be selected from the materials described in other sections of this application. In certain embodiments, the water-insoluble polymer or copolymer is one or more of: polyvinyl acetate, ethylcellulose, or an ethyl acrylate and methyl methacrylate copolymer, and/or mixtures containing same.

Other components may be present in the blended pH-independent and pH-dependent coating layer including, e.g, a surfactant, a pore-forming component, a stabilizer, plasticizers, antifoaming agents, solubilizing agents and coloring agents, and the like. Where present, these will amount to about 5% to about 15% by weight of enteric polymer, based on the total weight of the blending coating layer with the preferred range being from about 9% to about 12% based on the same weight. Examples of suitable stabilizers can include, but not limited to, sodium hydroxide, potassium hydroxide, magnesium hydroxide, calcium hydroxide, magnesium oxide, calcium oxide, sodium carbonate, potassium carbonate, magnesium carbonate, calcium carbonate, sodium hydrogen carbonate, potassium hydrogen carbonate, sodium phosphate, magnesium silicate, magnesium aluminate, magnesium metasilicate aluminate, synthetic hydrotalcite, aluminum hydroxide-magnesium, meglumine, lysine, ethylenediamine, N,N'-dibenzyl ethylenediamine, procaine, chloroprocaine, choline, diethanolamine and mixtures thereof. Examples of suitable pore forming substances can include, but are not limited to, mannitol, dextrose, sucrose, lactose, HPMC, HPC, carboxyvinyl polymer, polyethylene glycol 6000, mannitol, an organic acid and mixtures thereof. Optionally, a coloring agent or dye may be incorporated into this outer layer or a separate color coat may be applied. These enteric polymer systems may be applied as an aqueous solution or a solvent-based system using suitable coating techniques, e.g., spray coating or pan coating of the barrier coated, oxybate—anion exchange resin complex—optional matrix. Following coating, the delayed release coated, barrier coated, oxybate—anion exchange resin complex—optional matrix is dried and optionally cured.

In certain embodiments, the total weight of solids in the coating layers in the SITCS release component is about 30% w/w to about 90% w/w based on the total weight of the component, more preferably about 50% w/w to about 80% w/w. In certain embodiments, the total weight of solids in the SITCS coating is about 35% w/w to about 70% w/w, or about 40% w/w to 65% w/w, or 35% w/w to 75% w/w, or about 45% w/w to about 75% w/w, or about 45% to about 65% w/w. In certain embodiments, the extended release coating layer comprises about 15% w/w to about 35% w/w, or about 20% w/w to 35% w/w, or about 25% w/w to about 35% w/w, or about 30% w/w of the total coating in the delayed release component. In certain embodiments, the blended release layer is about 20% w/w to about 80% w/w, about 25% w/w to about 65% w/w, about 30% w/w to about 40% w/w of the diffusion barrier coated resinate or about 45% w/w to about 75% w/w or about 50% w/w to 70% w/w or about 55% w/w to about 65% w/w of the coated resinate.

In certain embodiments, the ratio of the blended pH-independent/pH-dependent coating layer and the pH-independent diffusion barrier coating layer is about 10:90 to about 90:10.

C. Final Formulation

The compositions may be, e.g., a powder, powder for suspension (POS), powder in capsule, or suspension. The excipients for the composition are selected accordingly. For example, excipients in a tablet may include binders, diluents, disintegrating agent, osmogents, release retarding polymers, flow aids, compression aids, lubricants and/or anti-adherents. Excipients in a suspension and/or ER POS may include suspending agents and/or thickening agent, wetting agents, and/or preservatives. Excipients are discussed in subsequent section.

In certain embodiments, a final product contains, at a minimum, (a) an immediate release component, (b) an extended release barrier coated oxybate—anion exchange resin complex—optional matrix, (c) a SITCS coated oxybate—anion exchange resin complex—optional matrix, (d) the equivalent of about 1 mEq to about 12 mEq of calcium chloride per 9 gm oxybate dose of the composition; and wherein the POS contains less than the equivalent of 200 mg of total sodium per 9 gm oxybate dose of the POS, and optional diluent granules.

Examples of compositions and suitable excipients are described in U.S. Pat. Nos. 11,337,920, and 11,666,546, which are incorporated herein by reference. In certain embodiments, an orally administrable composition is provided which comprises the GHB components described herein and a floating IPN forming system comprising at least one nontoxic gas generating agent, two or more anionic polymers, and at least one cross-linking agent. In certain embodiments, the composition comprises two or more anionic polymers comprise 0.5% w/w to 10 w/w %, or about 0.5% w/w to 5% w/w, or values therebetween, e.g., about 1% w/w, about 2% w/w, etc, based on the total dry components (e.g., POS, powder blend, or tablet). In certain embodiments, the anionic polymers are selected from pectin, gellan gum, carrageenan, or combinations thereof. In certain embodiments, the cross-linking agent(s) comprises about 0.5% w/w to 15% w/w, or 0.5% w/w to 5% w/w, of the composition based on the total dry components (e.g., powder blend). In certain embodiments, the gas generating agent(s) comprises about 0.5 wt % to about 15 wt %, or about 1 wt % to about 10 wt %, or about 7 wt %, or about 11 wt % of the composition based on the total dry components (e.g., powder blend). In certain embodiments, the gas generating agent is a bicarbonate. In certain embodiments, the bicarbonate is a potassium bicarbonate. In certain embodiments, the remainder of the composition comprises excipients such as diluents, binders, disintegrating agents, and the like. One or more anionic polymers may be used to form an IPN or semi-IPN, optionally in combination with galactomannan and/or another polymer, e.g., a non-ionic polymer. Such anionic polymers may include, without limitation, at least of each pectins, alginic acid, gellan gum, carrageenan, xanthan gum, and/or combinations thereof. In certain embodiments, pectins are included. Pectins have a polymer backbone which mainly comprises α-(1-4)-D galacturonic acid residues. Free calcium ions, which cross-link the galacturonic acid chains. A source of divalent ions, generally calcium ions is required to produce vehicles for drug delivery. The main advantage of using pectin for these formulations is that it is water soluble, so organic solvents are not necessary in the formulation. Calcium ions in the complexed form may be included in the formulation for the induction of pectin cross-linking. In other embodiments, alginic acid is included. Alginic acid is a linear block copolymer polysaccharide consisting of β-D-mannuronic acid and α-L-glucuronic acid residues joined by 1,4-glycosidic linkages. Dilute aqueous solutions of alginates undergo crosslinking with di and trivalent metal ions by a cooperative process involving consecutive glucuronic residues in the α-L-glucuronic acid blocks of the alginate chain. Gellan gum (commercially available as Gelrite™ or Kelcogel™) is an anionic deacetylated exocellular polysaccharide secreted by *Pseudomonas elodea* with a tetrasaccharide repeating unit of one α-L-rhamnose, one β-D-glucuronic acid and two β-D-glucuronic acid residues. The chemical structure of the polysaccharide has a tetrasaccharide repeat unit consisting of two glucose (Glc) residues, one glucuronic acid (GlcA) residue, and one rhamnose (Rha) residue. Similar to alginic acid and pectin, gellan gum chains are crosslinked by divalent or trivalent metal ions. Carrageenans are a family of linear sulfated polysaccharides that are extracted from red edible seaweeds. There are three main varieties of carrageenan, which differ in their degree of sulphation. Kappa-carrageenan has one sulphate group per disaccharide, Iota-carrageenan has two, and Lambda-carrageenan has three. Iota carrageenan is cross linked by divalent cations while kappa carrageenan is crosslinked by monovalent cations. Xanthan gum is anionic polysaccharide composed of pentasaccharide repeat units, comprising glucose, mannose, and glucuronic acid in the molar ratio 2:2:1. In certain embodiments, an IPN forming system comprises about 1% w/w to about 30% w/w of one or more anionic polymer(s), or about 1% w/w to about 20% w/w, or about 1% w/w to about 15% w/w, or about 1% w/w to about 10% w/w, or about 2%, or about 1% w/w to about 5% w/w, or about 10% w/w to about 30% w/w, or about 15% w/w to about 25% w/w. One or more cross-linking agents suitable for anionic polymers may be selected from the following non-limiting list of divalent and trivalent metal salts: calcium salts such as, e.g., calcium carbonate, calcium chloride, calcium gluconate; magnesium salts, ferrous salts, ferric salts, aluminum salts, zinc salts, or combinations thereof. In certain embodiments, the cross-linking agents can be the counter ions coming from the excipients and/or the active agents. In other embodiments, cross-linking metal ions might be provided by crosslinking agent in the composition or such metal ion might be provided by mono- or di- or polyvalent metal ion salt forms of moiety. Otherwise, such crosslinking metal ion may be provided by an excipient. For example, calcium carbonate can be used as gas generating agent but it also provides calcium ions for crosslinking anionic polymers including pectin, carrageenan iota, gellan gum, xanthan gum and the like. In certain embodiments, an IPN forming system comprises about 0.5% w/w to about 15% w/w of the anionic polymer(s) cross-linking agent(s), or about 0.5% w/w to about 5%, or 0.7%, to about 1.5%, or about 1%.

In certain embodiments, the composition includes a gas generating agent. As provided herein, a "gas generating agent" refers to an agent that generates nontoxic gas upon contact with gastric fluid. Suitable gas-generating agents include, without limitation, carbonates or bicarbonates of an alkali or alkaline earth metal, such as potassium carbonate or potassium bicarbonate, sodium carbonate or sodium bicarbonate, calcium carbonate, sodium glycine carbonate, magnesium carbonate, and aluminum carbonate; and sulfites such as sodium sulfite, sodium bisulfite, and sodium metabisulfite. These salts may be used alone or in combination with an acid source as a gas-generating couple.

In one embodiment, silicon dioxide (Syloid® 244FP) is provided in an amount of about 0.001% to about 1% w/w. In one embodiment, sodium methyl paraben is provided in an amount of about 5.26% to about 10% w/w. In one embodiment, sodium propyl paraben is provided in an amount of about 1.05% to about 2% w/w. In one embodiment, Povidone, USP (Kollidon® K30) is present in an amount of about 1% w/w to about 15% w/w. In one embodiment, sucralose is provided in an amount of about 0.01% w/w to about 3% w/w, or about 0.5% w/w to about 2% w/w, or about 1% w/w to about 2% w/w or about 1.5% w/w, or about 9.47%-18% w/w. In one embodiment, carrageenan is provided in an amount of about 0.25% w/w to about 5% w/w, or about 0.5% w/w to about 2% w/w (based on the total weight of the solids in the composition (e.g., a POS)). In one embodiment, potassium bicarbonate is provided in an amount of about 5% w/w/ to about 30% w/w or about 7.27% w/w to about 11.82% w/w (based on the total weight of the solids in the composition. In one embodiment, Gellan gum is provided in an amount of about 0.5 w/w/ to about 12.22% w/w (based on the total weight of the solids in the composition). In one embodiment, calcium chloride is provided in an amount of about 0.5% w/w to about 10% w/w, or about 0.5% w/w to about 5% w/w, or about 1% w/w (based on the total weight of the solids in the composition). In one embodiment, calcium chloride dihydrate is provided in an amount of about 1 to 5% w/w. In one embodiment, Methacrylic Acid and Methyl Methacrylate Copolymer (1:1) Eudragit L100 is provided in an amount of about 1% w/w to about 5% w/w. In one embodiment, microcrystalline cellulose, hypromellose, and/or mannitol are provided in an amount of about 15% w/w to about 40% w/w (based on the total weight of the solids in the composition). In other embodiments, higher or lower amounts are selected.

One or more superdisintegrants can be selected from low-substituted hydroxypropyl cellulose, microcrystalline cellulose, cross-linked sodium or calcium carboxymethyl cellulose, cellulose fiber, cross-linked polyvinyl pyrrolidone, cross-linked polyacrylic acid, cross-linked Amberlite resin, alginates, colloidal magnesium-aluminum silicate, corn starch granules, rice starch granules, potato starch granules, pregelatinised starch and sodium carboxymethyl starch. Examples of suitable binders include, but are not limited to, starch, pregelatinized starch, polyvinyl pyrrolidone (PVP), copovidone, cellulose derivatives, such as hydroxypropylmethyl cellulose (HPMC), hydroxypropyl cellulose (HPC) and carboxymethyl cellulose (CMC) and their salts. Examples of suitable diluents include, but are not limited to, starch, dicalcium phosphate, microcrystalline cellulose, lactose monohydrate, dextrate hydrated and the like. Examples of suitable lubricants include, but are not limited to, magnesium stearate, calcium stearate, stearic acid, talc, and sodium stearyl fumarate. Compositions may optionally also include a glidant such as, but not limited to, colloidal silica, silica gel, precipitated silica, or combinations thereof. Suitable examples of osmogents or pharmaceutically acceptable inert water-soluble compounds are selected from the group comprising carbohydrates such as xylitol, mannitol, sorbitol, arabinose, ribose, xylose, glucose, fructose, mannose, galactose, sucrose, maltose, lactose, dextrose and raffinose; water-soluble salts of inorganic acids such as magnesium chloride, magnesium sulfate, potassium sulfate, lithium chloride, sodium chloride, potassium chloride, lithium hydrogen phosphate, sodium hydrogen phosphate, potassium hydrogen phosphate, lithium dihydrogen phosphate, sodium dihydrogen phosphate, potassium dihydrogen phosphate, and sodium phosphate tribasic; water-soluble salts of organic acids such as sodium acetate, potassium acetate, magnesium succinate, sodium benzoate, sodium citrate, and sodium ascorbate; water-soluble amino acids such as glycine, leucine, alanine, methionine; urea or its derivatives; propylene glycol; glycerin; polyethylene oxide; xanthan gum; hydroxypropylmethyl cellulose; or mixtures thereof.

One or more desired excipients, including, e.g., flavorants, sweeteners, viscosity builders, flow-aids, pH-adjuster, preservatives, or other excipients may be blended into the final powder mix and/or added to the suspension. Optionally, one or more excipients is included in the final powder-for-suspension blend as a diluent granule, which facilitates reconstitution of the particulate oxybate—anion exchange resin complex, particulate barrier coated oxybate—anion exchange resin complex and optionally also provides agents for improving the flow of the powder (e.g., glidants), sweeteners or other flavorings, or suspending agents. In one embodiment, a diluent granule contains a buffering species used to control pH in the liquid suspension formulation. Optionally, the diluents granule may contain one or more other excipients including, e.g., a glidant, a flavoring agent, a preservative, a suspending agent, or mixtures of such excipients.

In certain embodiments, the composition is a blended particulate powder for suspension. In certain embodiments, the powder is formulated into a solid dosage form selected from: a capsule, a tablet, a molded tablet, pellets, a layered tablet, or a tablet within tablet. In certain embodiments, a composition is provided a single dose of oxybate has a therapeutic effect over about 5 hours to about 8 hours.

As discussed above, the immediate release component advantageously avoids the use of any oxybate salts, e.g., free API. The extended release component comprises a pH-independent diffusion barrier coating layer having a water insoluble film-forming polymer which confers an extended release to the oxybate in the complex—optional matrix. The bilayer SITCS component comprises an inner coating layer and an outer coating layer over an oxybate—cholestyramine anion exchange resin complex—optional matrix which comprises oxybate bound to ion exchange sites in a cholestyramine anion exchange resin. When the complex is in a matrix, it further comprises at least one hydrophilic or hydrophobic polymer.

The first (e.g., inner) coating layer is a pH-independent diffusion barrier coating layer having a water-insoluble film-forming polymer which confers an extended release to the oxybate in the complex—optional matrix, and the second coating layer is a blended coating layer which comprises a blend of a pH-dependent polymer and pH-independent polymer/copolymer over the pH-independent diffusion barrier coating layer, wherein the pH-dependent release coating layer confers delay release to the oxybate—cholestyramine anion exchange resin—optional matrix comprising the pH-independent barrier coating inner layer.

In certain embodiments, the composition is a powder for suspension which, following oral ingestion by a patient (human subject), has a therapeutic effect over at least about 5 hours to about 8 hours. The formulations provided herein may be packaged, stored, and shipped as a powder designed for reconstitution in an aqueous liquid (e.g., drinking water) prior to dosing as a liquid suspension. In other embodiments, two or more different types of oxybate—anion exchange resin complex components are formulated together into a solid dose tablet, are or loaded into capsules.

As an added safety feature, the composition may further contain a pharmaceutically acceptable dye which dissolves if the composition is placed in an aqueous liquid to provide a distinctive color.

1. Powder Formulation

To provide a final powder formulation suitable for reconstitution in water, the powder oxybate—anion exchange resin complex may be mixed with excipients. Such excipients may be one or more of a glidant or lubricant, one or more preservative(s), pH buffering agent, viscosity building agent, or combinations thereon, or the like may be admixed and the powder packaged into a suitable pack (e.g., aluminum foil sachet) or bottle. In certain embodiments, the powder includes buffering agents designed to adjust the pH to the range of about 4 to about 8, or about 5.5 to 7.5, or about 6.0.

Optionally, one or more desired excipients, including, e.g., flavorants, sweeteners, viscosity builders, glidants, pH-adjuster, preservatives, or other excipients may be blended into the final powder mix and/or added to the suspension. Optionally, one or more excipients is included in the final powder-for-suspension blend as a diluent granule, which facilitates reconstitution of the particulate oxybate—anion exchange resin complex, particulate barrier coated oxybate—anion exchange resin complex, and particulate STICS coated oxybate—anion exchange resin complex, and optionally also provides agents for improving the flow of the powder (e.g., glidants), sweeteners or other flavorings, or suspending agents. In one embodiment, a diluent granule contains a buffering species used to control pH in the liquid suspension formulation. Optionally, the diluents granule may contain one or more other excipients including, e.g., a glidant, a flavoring agent, a preservative, a suspending agent, or mixtures of such excipients.

2. Tablet Formulations

The oxybate tablets may be prepared using the three components described above and a solid oxybate—anion exchange resin complex—optional matrix, and one or more of a filler, one or more disintegrant, one or more binder, one or more a buffering agent, one or more lubricant, one or more glidant, one or more diluents, superdisintegrants, osmogents, release retarding agent, flow aids, compression aids, lubricants and/or anti-adherents, or combinations of one or more of these components. Suitably, the tablets also include taste and/or mouth feel enhancers including, e.g., one or more of a sweetener, a flavorant, a gum, or blends of these components.

In one embodiment, a tablet is formulated as an orally disintegrating tablet. Such orally disintegrating tablets may disintegrate in the mouth in less than about 30 seconds or less. In another embodiment, a tablet is formulated as a chewable tablet. Typically, a chewable tablet will contain a filler or a mixture of fillers in the range of about 10% w/w to about 90% w/w, about 50% w/w to about 85% w/w, or about 50% w/w to about 70% w/w of the total tablet weight. Suitable fillers may include, e.g., mannitol, lactose, maltose, fructose, sucrose, xylitol, maltitol, microcrystalline cellulose, dicalcium phosphate, guar gum, xanthan gum, tragacanth gum, pre-gelatinized starch, compressible sugar, calcium carbonate, magnesium carbonate, calcium sulfate, dextrates, maltodextrin. In one embodiment, a chewable tablet contains a blend of mannitol, xanthan gum, microcrystalline cellulose, and guar gum in an amount of about 60% w/w to about 75% w/w. In one embodiment, a gum or a combination of gums is provided in an amount of about 0.25% w/w to about 5% w/w, or about 0.25% to about 1% w/w. In another embodiment, microcrystalline cellulose is provided in an amount of about 5% w/w to about 25% w/w, or about 10% w/w to about 15% w/w based on the total tablet weight prior to any non-functional coating. A product containing a combination of microcrystalline cellulose and guar gum is commercially available as AVICEL®, which contains a ratio of 80 parts by weight microcrystalline cellulose to 20 parts by weight guar gum. This blend of microcrystalline cellulose (MCC) and guar gum may be present in an amount of about 5% w/w to about 25% w/w of the total tablet weight. A chewable tablet will also contain a disintegrant or blend of disintegrants in the range of about 1% w/w to about 25% w/w, or about 5% w/w to about 15% w/w, or about 10% w/w to about 14% w/w based on the total tablet weight. Suitable disintegrants include, e.g., crospovidone, sodium starch glycollate, croscarmellose sodium, carboxymethyl cellulose sodium, and carboxymethylcellulose calcium, starch. In one embodiment, a tablet as described herein contains crospovidone in a range of about 5% w/w to about 10% w/w, or about 12% w/w based on the tablet weight prior to any non-functional coating being applied.

The binder may be absent (i.e., 0%), or optionally, present in an amount of about 1% w/w to about 15% w/w of the total tablet weight. Examples of suitable binders include polyvinylpyrrolidone (Povidone), hydroxypropyl methyl cellulose, hydroxypropyl cellulose, hydroxyethyl cellulose, methyl cellulose, polyvinyl alcohol, starch, acacia, alginic acid, sodium alginate.

In one embodiment, the tablet contains a sweetener in an amount of about 0.01% w/w to about 3% w/w, or about 0.5% w/w to about 2% w/w, or about 1% w/w to about 2% w/w or about 1.5% w/w, based on the total tablet weight exclusive of any optional non-functional coating. Suitable sweeteners may include, e.g., aspartame, saccharin, saccharin sodium, sucralose, sodium cyclamate, xylitol, acesulfamate potassium, and blends thereof. Optionally, in addition to functioning as a sweetener, an excipient may function as a filler. Examples of suitable sweeteners/fillers including, e.g., fructose, sucrose, xylitol, maltitol. Optionally, when performing both functions, the excipient may be present in an amount in excess of about 10% w/w of the tablet. In such an instance, additional sweetener may be omitted (e.g., present in 0% added sweetener). Alternatively, a second sweetener or a combination of sweeteners which differs from the filler is added in the amount provided in this paragraph in order to further enhance taste.

Suitably, the tablet is provided with a buffering agent in an amount of about 0.1% w/w to about 5% w/w, or about 0.5% w/w to about 1.5% w/w based on the total tablet weight. Examples of suitable buffering agents include, e.g., citric acid, tartaric acid, malic acid, lactic acid, and acceptable salts thereof, and mixtures thereof.

When an additional flavoring agent is added, the flavoring agent(s) may be added in an amount of about 0.05% w/w to about 3% w/w, or about 0.1% to about 1% w/w or about 0.5% w/w, based on the total weight of the tablet (exclusive of any optional non-functional coating). Suitable flavoring agents may include, both natural and artificial flavoring agents such as are generally available through several custom manufacturers around the world such as Fona International [Illinois, US], Givaudan International (Vernier, Switzerland), Ungerer & Company (Lincoln Park, N.J.), and International Flavors & Fragrances (New York, N.Y.) to name a few. Those skilled in the art will recognize that there are several commercial sources available including custom blenders. The flavorings may be blended prior to addition to the pharmaceutical composition or added separately. Still other flavoring agents such as bubble gum, cherry, strawberry, vanilla, grape, banana and other flavors or mixtures thereof may be selected.

Optionally, a colorant may be provided to the tablet to provide a desired visual appeal or trade dress. Such colorants may be added in the range of about 0.001 to about 1% w/w, or about 0.01% w/w to about 0.08% w/w or about 0.05% w/w, based on the total weight of the tablet (exclusive of any non-functional coating). Such colorants are available from a variety of sources including, e.g., Colorcon (Harleysville, PA, USA), Lubrizol Pharmaceuticals (UK), and Spectra Colourtech (India Pvt Ltd). In one embodiment, no colorants are used in the tablet.

In order to facilitate production of the chewable tablet, excipients such as lubricants and glidants may be utilized. A lubricant may be utilized in an amount of about 0.1% w/w to about 5% w/w, about 0.2% w/w to about 4.5% w/w, or about 1.5% w/w to about 3% w/w of the total weight of the tablet. Examples of lubricants may include, e.g., magnesium stearate, sodium stearyl fumarate, stearic acid, zinc stearate, calcium stearate, magnesium trisilicate, polyethylene glycol, and blends thereof. In one embodiment, a glidant may be used in an amount of about 0.01% w/w to about 0.5% w/w, or about 0.1% w/w to about 0.3% w/w, based on the total weight of the tablet. Examples of suitable glidants include, e.g., silicon dioxide and tribasic calcium phosphate. In one embodiment, the glidant is silicon dioxide which is used in an amount of about 0.001% w/w to about 0.3% w/w or about 0.2% w/w.

Optionally, other excipients may be selected from conventional pharmaceutically acceptable carriers or excipients and well-established techniques. Without being limited thereto, such conventional carriers or excipients include diluents, binders and adhesives (i.e., cellulose derivatives and acrylic derivatives), lubricants (i.e., magnesium or calcium stearate, or vegetable oils, polyethylene glycols, talc, sodium lauryl sulfate, polyoxy ethylene monostearate), thickeners, solubilizers, humectants, disintegrants, colorants, flavorings, stabilizing agents, sweeteners, and miscellaneous materials such as buffers and adsorbents in order to prepare a particular pharmaceutical composition. The stabilizing agents may include preservatives and antioxidants, amongst other components which will be readily apparent to one of ordinary skill in the art.

| Components | Illustrative Compositions | | | |
|---|---|---|---|---|
| IR Oxybate components based on weight of solids in composition | 10-80% w/w, or 10-75% ww/w (based on weight total free oxybate in composition ) | | | |
| | | Immediate release Oxybate—anion exchange resin complex | 5-35% w/w (based on weight total free oxybate in composition) | |
| Modified release oxybate based on weight of solids in composition | 20-90% w/w, or 25% w/w to 75% w/w (based on weight total free oxybate in composition | | | |
| Single coated (barrier coated with no enteric coat top layer) | | Barrier Coating Layer/plasticizer Polymeric/Matrix polymers | 10-90% w/w of coated resinate 5-50% w/w of coated resinate | |
| Dual Coated (delayed-extended release top coat; inner barrier coating layer oxybate—anion exchange resin complex | | Delayed-Extended Release outer coating layer Barrier Coating Layer Polymeric/Matrix Components | 10-90% w/w of coated resinate 10% w/w-50% w/w of coated resinate Plasticizer, 0.5 to 10% of total coating layers Matrix forming polymers, 10-40% w/w of coated resinate | |
| Optional one or more other MR Oxybate component Excipients | | | 5-15% w/w | |

| Components | Illustrative Compositions | |
| --- | --- | --- |
| | Calcium chloride equivalent or dihydrate | 1-10% w/w of solids in composition |
| | Gas Generating Agent(s) (e.g., potassium bicarbonate) | 0.5-2% w/w of total solids in composition |
| | One or more Raft/IPN forming polymers (e.g., carrageenan, gellan gum) | 0.5% 10% w/w of total solids in composition, or 0.5% to 5% w/w |

Still other suitable excipients may be selected in view of the teaching provided herein.

Suspension Excipients

The compositions provided herein are generally dosed in the form of suspensions From powders admixed with a suspension base, preferably an aqueous suspension base. As used herein, an aqueous suspension refers to a suspension in which at least about 50% v/v of the liquid component of the suspension is water, preferably greater than about 60% w/v, greater than about 80% w/w, at least about 90% up to 100%. The suspension base may further contain comprises binders, diluents, salivating agents, surfactants, flavors, sweeteners, colorants, souring agents, viscolizers, glidants, chelating agents, lubricants, solubilizers, stabilizers, suspending agents, preservatives, cosolvents, anti-caking agents, buffers and the like or any combinations thereof. Examples of suitable binders include, but are not limited to, starch, pregelatinized starch, polyvinyl pyrrolidone, copovidone, cellulose derivatives, such as hydroxypropylmethyl cellulose, hydroxypropyl cellulose and carboxymethyl cellulose and their salts. Examples of suitable diluents include, but are not limited to, starch, microcrystalline cellulose, lactose, xylitol, mannitol (e.g., Pearlitol® 100SD), maltose, polyols, fructose, guar gum, sorbitol, magnesium hydroxide, dicalcium phosphate, coprocessed mannitol and calcium silicate and the like or any combinations thereof. Examples of lubricants include, but are not limited to, magnesium stearate, calcium stearate, stearic acid, talc, and sodium stearyl fumarate. Suitable glidants includes but are not limited to, colloidal silica, silica gel, precipitated silica, or combinations thereof. Suitable salivating agents include, but are not limited to, micronised polyethylene glycol, sodium chloride or precipitated micronised silica. Examples of solubilizers include, but are not limited to cetostearyl alcohol, cholesterol, diethanolamine, ethyl oleate, ethylene glycol palmitostearate, glycerin, glyceryl monostearate, isopropyl myristate, lecithin, medium-chain glyceride, monoethanolamine, oleic acid, propylene glycol, polyoxyethylene alkyl ether, polyoxyethylene castor oil glycoside, polyoxyethylene sorbitan fatty acid ester, polyethylene sorbitan fatty acid ester, polyoxyethylene stearate, propylene glycol alginate, sorbitan fatty acid ester, stearic acid, sunflower oil, triethanolmine, or combinations thereof. Souring agents include, but are not limited to, monosodium fumarate and/or citric acid. The compositions may also include stabilizers such as, but not limited to, those described above under drug-resin complexes. Suitable chelating agents that may be employed have been discussed herein above. Suitable viscolizers include, but are not limited to, coprocessed microcrystalline cellulose such as but not limited to, Avicel RC591, Avicel CL-611, D-sorbitol solution, polyalkylene oxides such as, but not limited to polyethylene oxide; cellulose ethers such as, but not limited to hydroxyethyl cellulose, hydroxypropylcellulose, hydroxypropyl methyl cellulose, methyl cellulose, ethyl cellulose, sodium carboxy methylcellulose, calcium carboxymethyl cellulose, microcrystalline cellulose; gums such as but not limited to gum arabic alginates, agar, sodium alginate guar gum, locust bean, carrageenan, tara, gum arabic, tragacanth, pectin, xanthan, gellan, maltodextrin, galactomannan, pusstulan, laminarin, scleroglucan, gum arabic, inulin, karaya, whelan; polyols such as, but not limited to dipropylene glycol, polypropylene glycol, propylene glycol, polyethylene glycol (PEG), sorbitol and glycerol; carbopol, starch and starch-based polymers such as, but not limited to, pregelatinized starch, acrylic acid and methacrylic acid polymers, and esters thereof, maleic anhydride polymers; polymaleic acid; poly(acrylamides); poly(olefinic alcohol)s; poly(N-vinyl lactams); polyoxyethylated saccharides; polyoxazolines; polyvinylamines; polyvinylacetates; polyimines; povidone (e.g., povidone USP (such as sold as Kollidon® K30)), vinylpyrrolidone/vinyl acetate copolymer and polyvinyl acetate, mixture of polyvinyl acetate and polyvinylpyrrolidone, chitin, cyclodextrin, gelatin, chitosan and the like or any mixtures thereof. Suitable surfactants include, but are not limited to, anionic, nonionic, cationic, and zwitterionic surfactants or a mixture thereof. The non-ionic surfactants employed in the composition may include, but are not limited to, ethoxylated fatty acid ester, ethoxylated fatty acid ethers, ethoxylated sorbitan ethers, ethoxylated alkyl-phenols, glycerol esters, glycerol sugar esters, polyoxyethyleneglycerol monolaurate, polyoxyethyleneglycerol monostearate, polyoxyethylene-20-cetyl stearate, polyoxyethylene-25-cetyl stearate, polyoxyethylene (25)-oxypropylene monostearate, polyoxyethylene-20-sorbitan monopalmitate, poly-oxyethylene-16-tert-octyl phenol, polyoxyethylene-20-cetyl ether, polyethylene glycol(1000) monocetyl ether, ethoxylated castor oil, polyoxyethylene sorbitol-lanolin derivatives, polyoxyethylene(25)propylene glycol stearate, polyoxyethylenesorbitol esters, polyoxyethylene-20-sorbitan monopalmitate, polyoxyethylene-16-tert-octylphenol, polyoxyethylene-20-cetyl ether, glyceryl undecylenate and Polysorbate 60, capmul (medium chain glyceride), peceol (glyceryl monooleate), glyceryl laurate and glyceryl caprylate (Capmul MCM), PEG sorbitan fatty acid esters like PEG-20 sorbitan monolaurate (Tween 20), PEG-20 sorbitan monostearate (Tween 60), PEG-20 sorbitan monooleate (Tween 80), sorbitan fatty acid esters like sorbitan monolaurate (Span 20), glyceryl stearate (Cithrol GMS) or the like and mixtures thereof. Suitable cationic surfactants include, but are not limited to, quaternary ammonium compounds, alkylamidoamines and quaternary ester compounds, distearyl dimethyl ammonium chloride, dimyristyl dimethyl ammonium chloride, dipalmityl dimethyl ammonium chloride or the like and mixtures thereof. Suitable anionic surfactants include, but are not limited to, fatty alcohol sulfates, alpha olefin sulfonates, sulfosuccinates, phosphate esters, carboxylates, sarcosinates, alkyl benzene sulfonates, alkyl sulfonates, olefin sulfonates, alkyl ethersulfonates, glycerol ethersulfonates, a-methyl estersulfonates, sulfonic fatty acids, alkyl sulfates, fatty alcohol ethersulfates, glycerol ethersulfates, mixed hydroxy ethersulfates, monoglyceride (ether)sulfates, fatty acid amide (ether)sulfates, sulfosuccinates, sulfosuccinamates, sulfotriglycerides, amide soaps, ether carboxylic acids, isethionates, sarcosinates, taurides, alkyl oligoglycoside sulfates, alkyl (ether)phosphates or the like and mixtures thereof. Suitable zwitterionic surfactants employed include, but are not limited to, N-alkyl-N,N-dimethyl ammonium glycinates, for example cocoalkyl dimethyl ammonium glycinate, N-acyl aminopropyl-N,N-dimethyl ammonium glycinates, cocoacyl aminoethyl hydroxyethyl carboxymethyl glycinate or the like and mixtures thereof. Further, the composition of the present invention may further comprise a preservative such as but not limited to methyl parahydroxybenzoate, propyl parahydroxybenzoate, sodium methyl paraben, sodium propyl paraben and sodium benzoate. Suitable cosolvent that may be used includes, but is not limited to, ethanol and polyhydric alcohols such as, but not limited to, glycerin, propylene glycol, low molecular weight polyethylene glycols, and mixtures thereof. Further anti-caking agents that may be optionally incorporated include, but are not limited to, colloidal silicon dioxide (e.g., Syloid® 244 FP), tribasic calcium phosphate, powdered cellulose, magnesium trisilicate, starch, and mixtures thereof. Suitable sweetening agent includes, but is not limited to, aspartame, stevia extract, glycyrrhiza, saccharine, saccharine sodium, acesulfame, sucralose, dipotassium glycyrrhizinate, galactose, fructose, high fructose corn syrup, dextrose, sucrose, sugar, maltose, partially hydrolyzed starch, corn syrup solids, sorbitol, xylitol, mannitol and the like or mixtures thereof. The compositions may comprise one or more natural and/or artificial flavors such as, but not limited to, mint flavor, orange flavor, lemon flavors, strawberry aroma, vanilla flavor, raspberry aroma, cherry flavor, tutti frutti flavor, magnasweet 135, key lime flavor, grape flavor, trusil art 511815, and fruit extracts and the like. Suitable colorants include, but are not limited to, pigments and dyes such as FD&C Red, FD&C Yellow, FD&C Green, and FD&C Blue, titanium dioxide and the like or combinations thereof.

In certain embodiments, compositions described herein are shelf-stable as it maintains its physical stability for about 18 months to about 24 months. In certain embodiments, compositions described herein are shelf-stable as it maintains its chemical stability for about 18 months to about 24 months. In certain embodiments, the composition is a powder formulated for reconstitution into a suspension with water. In certain embodiments, the shelf-stable solid oxybate composition is a reconstituted aqueous liquid suspension which provides therapeutic levels of oxybate for about 3 hours to about 8 hours following oral ingestion of the reconstituted aqueous liquid suspension.

In certain embodiments, an ER oxybate POS provides a once-a-night 4.5 g sodium oxybate equivalent dose. In other embodiments, the ER oxybate POS provides a once-a-night 6.0 g sodium oxybate equivalent dose. In other embodiments, the ER oxybate POS provides a once-a-night 7.5 g sodium oxybate equivalent dose. In certain embodiments, the ER oxybate POS provides a once-a-night 9.0 g sodium oxybate equivalent dose. The POS comprise a blend of oxybate-containing multiparticulates having different release profiles: (a) an immediate release oxybate—anion exchange resin complex multiparticulates which comprises oxybate bound to ion exchange sites in an anion exchange resin; (b) a pH-independent diffusion barrier coated oxybate—anion exchange resin complex—optional matrix multiparticulates, wherein the pH-independent diffusion barrier coating layer comprises a water-insoluble film-forming polymer which confers an extended release to the oxybate, and wherein the pH-independent diffusion barrier coating layer is over the oxybate—anion exchange resin complex—optional matrix; and (c) a bilayer SITCS oxybate multiparticulates which comprise a blended pH-independent/pH-dependent release coating layer over pH-independent diffusion barrier coated oxybate—anion exchange resin complex—optional matrix of (b), wherein the bilayer coating layer comprises a blend of a pH-dependent polymer and a pH-independent polymer, wherein the SITCS bilayer coating confers a delayed and extended release to the oxybate in the oxybate—anion exchange resin—optional matrix comprising the first pH-independent barrier coating inner layer. The oxybate—anion exchange resin complex—optional matrix of each of these components may be the same or may differ from each other. The POS further optionally comprises diluent granules. In certain embodiments, an ER oxybate composition provides a 6 g sodium oxybate equivalent dose. In certain embodiments, an ER oxybate composition provides a 7.5 g sodium oxybate equivalent dose. In certain embodiments, an ER oxybate composition provides a once-a-night 8 g sodium oxybate equivalent dose. In certain embodiments, an ER oxybate composition provides a once-a-night 9 g sodium oxybate equivalent dose. In certain embodiments, an ER oxybate composition provides a once-a-night 10 g sodium oxybate equivalent dose. In certain embodiments, an ER oxybate composition provides a once-a-night 11 g sodium oxybate equivalent dose. In certain embodiments, an ER oxybate composition provides a once-a-night 12 g sodium oxybate equivalent dose.

In certain embodiments, the compositions herein provide a pharmacokinetic profile for oxybate in which the ratio of arithmetic mean maximum plasma concentration peak (Cmax) to the arithmetic mean plasma concentration at 5 hours (C5) post ingestion (the Cmax/C5 ratio) is less than 5, as determined in a patient following oral ingestion of the oral suspension at least about two hours post meal conditions.

In certain embodiments, a dosing with a composition provided herein provides an oxybate pharmacokinetic profile with one or more of: a Cmax, an AUCinf, and/or a Tmax or a Cmax. AUCinf and/or Tmax which is 80% to 125%, 90% to 115%, or 95% to 110% of the values in the following table, as determined following a single 9 g dose in a patient:

| Summary of PK parameters for Oxybate ER POS, 9 gm | | | | | |
|---|---|---|---|---|---|
| | Kel (1/hr) | T½ (hr) | Tmax (hr) | Cmax (µg/mL) | AUC t (hr*µg/mL) | AUC inf (hr*µg/mL) |
| N | | | | 14 | | |
| GeoMean | 0.6303 | 1.10 | 1.99 | 105.47 | 520.55 | 535.73 |
| Arith Mean | 0.8191 | 1.71 | 2.16 | 107.01 | 542.03 | 575.78 |
| SD | 0.4824 | 2.05 | 0.95 | 19.02 | 162.88 | 270.89 |
| % CV | 58.90 | 119.49 | 43.91 | 17.78 | 30.05 | 47.05 |
| Median | 0.7843 | 0.88 | 1.75 | 108.00 | 498.78 | 491.36 |
| Minimum | 0.1037 | 0.40 | 1.00 | 80.50 | 325.12 | 348.73 |
| Maximum | 1.7338 | 6.68 | 4.25 | 146.00 | 868.81 | 1386.19 |

In certain embodiments, an oxybate ER POS as provided herein, at a dose equivalent to 9 g oxybate, provides an oxybate pharmacokinetic profile as follows in an adult post-dosing: a Cmax of 87.98 ug/mL to 126 ug/mL. or about 107 ug/mL, a Cmax of 85.6 ug/mL to 133.76 ug/mL, or 77.04 ug/mL to 117.711 ug/mL, as calculated using arithmetic mean; and/or an AUCinf of 518.20 hr*µg/mL to 719.725 hr*µg/mL; or about 575 hr*µg/mL, or of 304.11 to 846.67, 460.62 hr*µg/mL to 719.725 hr*µg/mL, as calculated using arithmetic mean and/or a Tmax of about 1.944 hr to 2.376 hr, about 2 hours, or 1.2 hr to 3 hr, 1.728 h to 2.7 h, or, as calculated using arithmetic mean hr.

Cmax of about 105 µg/mL, or 84.38 µg/mL to 131.84 µg/mL, 94.92 µg/mL to 116.01 µg/mL, as calculated using geometric mean; and/or an AUCinf of about 520 hr*µg/mL, or 428.58 hr*µg/mL to 669.66 hr*µg/mL; or about 482.16 hr*µg/mL to 589.30 hr*µg/mL, as calculated using geometric mean and/or a Tmax of about 2 hr, or 1.59 h to 2.49 h, or about 1.79 hr to 2.19 hr, as calculated using geometric mean.

"Cmax" is the maximum observed plasma concentration, calculated as the geometric or arithmetic mean of the individual maximum blood plasma concentrations. The term "C5" refers to the blood plasma concentration at 5 hours post-dosing.

The term "mean maximum plasma concentration" (mean Cmax) is defined for the purposes of the present invention as the maximum mean plasma drug concentration.

"Mean plasma concentration" may be calculated as the arithmetic mean blood plasma levels or geometric mean blood plasma concentration.

The term "Tmax" is the time at which the peak (maximum) observed blood plasma drug concentration for each individual participating in the bioavailability study. This may be calculated using a geometric or arithmetic method.

The term "AUC0-∞" or "AUCinf" is the mean area under the plasma concentration-time curve extrapolated to infinity. It is calculated as the arithmetic mean of the area under the plasma concentration-time curve from time 0 extrapolated to infinity, calculated for each individual participating in the bioavailability study. The release profile may be assessed via in vitro dissolution using techniques known to those of skill in the art [e.g., USP basket method, Paddle Method, channel flow method, or other methods known in the literature]. The release profile can be assessed in vivo (e.g., for bioavailability determinations), using plasma concentrations to assess maximum plasma concentration (Cmax) and area under the curve (AUC). Such assays are well known to those of skill in the art. [see, e.g., W. Wargin, et al., Pharmacokinetics of methylphenidate in man, rat and monkey. J Pharmacol Exp Ther August 1983 226:382-386].

In certain embodiments, the ratio of oxybate in the immediate release component (i.e., an oxybate—anion exchange resin complex—optional matrix) to oxybate in the combined modified release components is about 1:10 to about 10:1, or about 1:5 to about 5:1, or about 1:2 to about 2:1, out about 1:2, or about 1:1. The ratio is determined based on the weight of uncomplexed oxybate (free oxybate) in each component rather than the weight of the entire complex.

In certain embodiments, the ratio of oxybate in the barrier coated, oxybate—anion exchange resin complex—optional matrix to oxybate in the pH-dependent enteric coated, barrier coated, oxybate—anion exchange resin complex—optional matrix is about 1:2 to 2:1, or about 1 to about 1.

In certain embodiments, the combination of the barrier coated, oxybate—anion exchange resin complex—optional matrix to oxybate in the enteric coated, barrier coated, oxybate—anion exchange resin complex—optional matrix is about 65 parts by weight to about 90 parts by weight, or about 75 parts by weight to about 85 parts by weight, based on the total weight of oxybate in the powder. In certain embodiments, the immediate release oxybate—anion exchange resin complex—optional matrix is about 15 parts by weight to about 35 parts by weight, or about 20 parts by weight to about 30 parts by weight, based on the total weight of oxybate in the composition.

The composition may be formulated with a suitable dose, taking into consideration the age of the patient and the condition being treated. In one embodiment, the composition provides a powder-for-suspension which provides an oxybate dose equivalent to 4.5 g of sodium oxybate. In another embodiment, the composition provides a powder-for-suspension which provides an oxybate dose equivalent to 6 g of sodium oxybate. In another embodiment, the composition provides a powder-for-suspension which provides an oxybate dose equivalent to 7.5 g of sodium oxybate. In another embodiment, the composition provides a powder-for-suspension which provides an oxybate dose equivalent to 9 g of sodium oxybate. In another embodiment, the composition provides a powder-for-suspension which provides an oxybate dose equivalent to 12 g of sodium oxybate.

Uses and Therapeutic Methods

In certain embodiments, provided herein, low sodium extended release (ER) oxybate powder for oral suspension (POS) containing less than 200 mg of Sodium and 1 mEq to 12 mEq of calcium chloride which provides a once-a-nightly oxybate dose. Oxybate ER POS comprises of a blend of oxybate-resinate particulates having different release profiles as defined in (a) and (b): (a) an immediate release (IR) oxybate—anion exchange resin complex which comprises oxybate bound to ion exchange sites in an anion exchange resin; (b) a pH-independent diffusion barrier coated oxybate—anion exchange resin complex—optional matrix, wherein the pH-independent diffusion barrier coating layer comprises of a water-insoluble film-forming polymer which confers an extended release to the oxybate, and wherein the pH-independent and/or pH dependent diffusion barrier coating layer is over the oxybate—anion exchange resin complex—optional matrix. The composition optionally further comprises diluent granules.

Provided herein are pharmaceutical compositions and formulations comprising once nightly extended release gamma-hydroxybutyrate ("GHB") resinate powder for oral suspension which has less than 200 mg of sodium, which are useful in the treatment of conditions responsive to GHB, for example, fibromyalgia and sleep disorders such as apnea, sleep time disturbances, narcolepsy, excessive daytime sleepiness (EDS) cataplexy, sleep paralysis, hypnagogic hallucination, sleep arousal, insomnia, and nocturnal myoclonus. Provided herein are pharmaceutical compositions and formulations comprising of Oxybate resinate Immediate Release component from 10% to 80% w/w, Oxybate resinate Extended-Release component from 5% to 70% w/w and less than 200 mg of sodium per 9 gm of dose. Provided herein are pharmaceutical compositions and formulations comprising of Oxybate Immediate Release component from 10% to 80% w/w, Oxybate resinate Extended-Release component from 5% to 70% w/w, less than 200 mg of sodium and 75 mg (1 mEq)-882 mg (12 mEq) of Calcium chloride per 9 g of dose.

In certain embodiments, the reduction in sodium content involves the use of manufacturing process to reduce the sodium content in the Oxybate resinate Extended release formulation such that it achieves desired dissolution profile of the coated and finished product drug resinate extended-release particles.

In another embodiment, the pharmaceutical composition of Oxybate-resinate ER formulation comprises of mixture of sodium ions and calcium chloride to achieve desired dissolution profile.

In another embodiment the pharmaceutical composition is given to the patient as once nightly Extended-release powder for suspension. The required volume to be used for redispersion is 20 mL to 300 mL, 50 mL to 300 mL, 100 mL to 250 mL, or 175 mL to 225 mL.

In additional aspects, a method of treating narcolepsy and associated disorders and symptoms in a patient in need thereof may include administering an oral pharmaceutical composition comprising gamma-hydroxybutyrate once nightly, where the composition is dose proportional. The formulation composition for one or more strengths (1 g, 4.5 g, 6 g, 7.5 g, and 9 g) can be dose proportional to the higher strengths. The Cmax of the composition may be dose proportional across one or more of 1 g, 4.5 g, 6 g, 7.5 g, and 9 g doses of the composition.

Provided herein are uses and therapeutic methods to treat conditions amenable to treatment by oxybate, such as those discussed herein below, by administering an effective amount of one or more dosage forms (e.g., a suspension reconstituted from a POS). In certain embodiments, dosage forms described herein can be administered to treat a human afflicted with narcolepsy, idiopathic hypersomnia, to reduce cataplexy and/or excessive daytime sleepiness (EDS), sleep disorders such as apnea, sleep paralysis, hypnagogic hallucination, sleep arousal, insomnia, and nocturnal myoclonus. In still further embodiments, the present dosage forms can be administered to humans, particularly in the elderly (>50 years old), to improve the quality of sleep, or in conditions in which an increase in growth hormone levels in vivo is desired. In certain one embodiment, the formulations and pharmaceutical compositions provided herein can be used to treat conditions responsive to GHB, for example, fibromyalgia.

In another embodiment, the pharmaceutical compositions and/or formulations disclosed herein can be used to treat a disease or condition selected from the group consisting of a sleeping disorder, drug abuse, alcohol and opiate withdrawal, a reduced level of growth hormone, anxiety, analgesia, a neurological disorder (e.g., Parkinson's Disease and depression), an endocrine disturbance, hypoxia or anoxia of tissues (such as from stroke or myocardial infarction), or an increased level of intracranial pressure. The dosage forms described herein may be provided as a kit comprising, separately packaged, a container comprising an effective amount of the oxybate powder composition in a sachet or other suitable package. For example, the powder may be packaged aluminum foil envelopes, or in a blister pack. The powder can be packaged in many conformations with or without desiccant or other materials to prevent ingress of water. Instruction materials or means, such as printed labeling, can also be included for their administration, e.g., sequentially over a preselected time period and/or at preselected intervals, to yield the desired levels of sodium oxybate in vivo for preselected periods of time, to treat a preselected condition.

A kit for treating a patient with an oxybate composition, said kit comprising (a) a container comprising an oxybate composition as described herein; (b) a syringe; (c) a measuring cup; (d) a press-in-bottle adapter (e) dosing cup; and optionally at least one empty pharmacy container with a child-resistant cap.

A daily dose of a composition as provided herein in an amount of the equivalent of about 1 mg/kg to about 50 mg/kg of sodium oxybate can be administered to accomplish the desired therapeutic results. For example, a daily dosage of about 0.5 g to 20 g equivalent to sodium oxybate can be administered, preferably about 1 to 15 g, in single dose. In other embodiments, doses may range from about 1.5 g to about 12 g per night, or about 4.5 g to about 9 g per night, or about 6 g, based on equivalents to sodium oxybate.

The compositions described herein may be useful in the treatment of a variety of conditions amenable to treatment by sodium oxybate, such as narcolepsy to reduce cataplexy and/or daytime sleepiness, to improve the quality of sleep, or in conditions in which an increase in growth hormone levels in vivo is desired, and to treat fibromyalgia or chronic fatigue syndrome. The present dosage forms may be used to treat a host of other indications including drug and alcohol abuse, anxiety, cerebrovascular diseases, central nervous system disorders, neurological disorders including Parkinson's Disease and Alzheimer Disease, Multiple Sclerosis, autism, depression, inflammatory disorders, including those of the bowel, such as irritable bowel disorder, regional ileitis and ulcerative colitis, autoimmune inflammatory disorders, certain endocrine disturbances and diabetes.

The compositions may also be administered for the purpose of tissue protection including protection following hypoxia/anoxia such as in stroke, organ transplantation, organ preservation, myocardial infarction or ischemia, reperfusion injury, protection following chemotherapy, radiation, progeria, or an increased level of intracranial pressure, e.g., due to head trauma. The present dosage forms can also be used to treat other pathologies believed to be caused or exacerbated by lipid peroxidation and/or free radicals, such as pathologies associated with oxidative stress, including normal aging. See Patent Publication US 2004/0092455 A1 incorporated herein by reference. The compositions may also be used to treat movement disorders including restless leg syndrome, myoclonus, dystonia and/or essential tremor. See Frucht et al, Movement Disorders, 20(10), 1330 (2005) incorporated herein by reference.

As described herein, a composition may be dosed orally once per day at bedtime, e.g., 10 μm to 12 pm. This is particularly well suited for treatment of narcolepsy. Optionally, smaller doses may be delivered at bedtime and at different intervals during the night, or in the morning and at intervals during the day. Other variations may be selected depending upon the patient and the indication being treated (e.g., fibromyalgia, etc).

As used herein, the term "powder" is a plurality of "particles" or "granules". In certain embodiments, each particles or granules is a subunit which contain one immediate release component and/or at least one modified release component. In other embodiments, the particles or granules contain a separate immediate release GHB component and a separate modified release GHB component, which are admixed. The terms "particles", "granules", "particulates" or "multiparticulates" and "resinates" are used interchangeably herein to refer to the oxybate—anion exchange resin complexes (which may be further in a matrix and coated). An "oxybate—ion exchange resin complex" refers to the product resulting from loading at least oxybate onto an anion exchange resin. The complexation occurs when the active drug(s) and the ion exchange resin are mixed together in an aqueous medium to facilitate the "exchange" between a salt of the drug and the "ion" of the ion exchange resin and the formation of the complex.

As used herein "a GHB drug" includes, GHB, as well as pharmaceutically acceptable salts, hydrates, tautomers, solvates, prodrugs and complexes of GHB, and mixtures thereof. Suitable salts of GHB include, e.g., the calcium, lithium, potassium, sodium and magnesium salts. Representative salts are also described in US 2012/0076865, incorporated by reference herein. The sodium salt of GHB, "sodium oxybate", refers to a compound of formula (Ia) below:

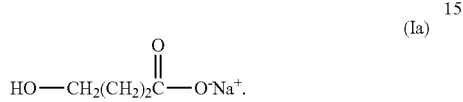

(Ia)

In one embodiment, an alternative to the sodium oxybate may be used as the immediate release component, or as the starting material to prepare a drug—ion exchange resin complex as provided herein. Such alternative salts useful in the present invention include compounds of formula (I):

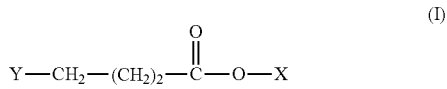

(I)

wherein X is a pharmaceutically-acceptable cation and may be selected from the group consisting of potassium, calcium, lithium and magnesium and Y is OH. By "oxybate salt" is intended a compound of formula I wherein X is a pharmaceutically-acceptable cation and may be selected from the group consisting of sodium, potassium, calcium, lithium and magnesium and Y is OH. Sodium oxybate is a white to off-white, crystalline powder that is very soluble in aqueous solutions. Other salts may be selected, such as calcium oxybate, magnesium oxybate, potassium oxybate, and/or lithium oxybate. Methods of making GHB salts are described, for example, in U.S. Pat. No. 4,393,236, the disclosure of which is incorporated herein by reference.

A "dissolution rate" refers to the quantity of drug released in vitro from a dosage form per unit time into a release medium. In vitro dissolution rates in the studies described herein were performed on dosage forms placed in a USP Type II or USP type 7 dissolution apparatus set to 370° C.±2° C. under suitable experimental conditions; see, e.g., US2012/007685, incorporated by reference herein. The dissolution media may be purified water, 0.1 N HCl, simulated gastric or intestinal fluid, or other media known in the art.

Unless as expressly stated to the contrary, the doses and strengths of oxybate are expressed as equivalent to gram (g) weights of sodium oxybate. As used herein, the term "equivalent" to sodium oxybate is used to refer to the weight of the oxybate portion of the anion exchange resin complex, without taking into account the weight of the anion exchange resin or any matrix or coating component.

As used herein in reference to numeric values provided herein, the term "about" may indicate a variability of as much as 10% (+10%).

The various embodiments will be further described by reference to the following detailed examples.

EXAMPLES

The following examples are illustrative only and are not intended to be a limitation on the present invention. In the following examples, the term "oxybate—anion exchange resin complex" and "oxybate resinate" or "oxybate—cholestyramine resinate" are used interchangeably unless otherwise specified.

Example 1: Removal of the Exchangeable Ions from Oxybate—Anion Exchange Resin Complex for Use in Extended-Release Powder for Oral Solution (ER POS)

Uncoated Oxybate-Cholestyramine Resinate:

Oxybate-cholestyramine resinate was manufactured using a multistage complexation process. Unbound sodium oxybate is removed throughout the multistage complexation process. The sodium content in the drug resinate complex is controlled by amount of water or other aqueous solution, mixing time, mixing speed and temperature of process. The sodium content in the drug resinate complex is further controlled by amount of water used in each multistage complexation and at the final equilibrium stage.

TABLE 1

Uncoated Oxybate-cholestyramine resinate (Example 1)

|  | Stage-1 | Stage-2 | Stage-3 | Stage-4 | Stage-5 |
|---|---|---|---|---|---|
| Batch Size[1] | 24.501 kg | | | | |

| PART I | | | |
|---|---|---|---|
| Ingredients | Kg/batch | Kg/batch | Kg/batch |
| Sodium Oxybate, CI | 10.0 | 10.0 | 10.0 |
| Purified Water, USP[2] | 50.0 L | 40.0 L | 40.0 L |
| Cholestyramine Resin, USP | 10.0 | Stage-1 Resinate | Stage-2 Resinate |
| Sodium Oxybate Filtrate | ~35 L | ~35 L | ~35 L |
| Additional Purified water, USP[2] | 70.0 L | 70.0 L | 70.0 L |

| PART II | | | | | |
|---|---|---|---|---|---|
| Ingredients | Kg/batch | Kg/batch | Kg/batch | | |
| Sodium Oxybate Filtrate | PART I/ Stage-1 | PART I/ Stage-2 | PART I/ Stage-3 | NA | NA |
| Sodium Oxybate, CI | NA | NA | NA | 10.0 | 10.0 |
| Purified Water, USP[2] | 50.0 L | 1 L | 1 L | 40.0 L | 40.0 L |
| Cholestyramine Resin, USP | 10.0 | Part II/ Stage-1 Resinate | Part II/ Stage-2 Resinate | PART II/ Stage-3 Resinate | PART II/ Stage-4 Resinate |
| Additional Purified water, USP[2] | 70.0 L | 70.0 L | 70.0 L | 70.0 L | 70.0 L |

TABLE 1-continued

Uncoated Oxybate-cholestyramine resinate (Example 1)

| Stage-1 | Stage-2 | Stage-3 | Stage-4 | Stage-5 |
| --- | --- | --- | --- | --- |

PART III

| Ingredients | Kg/batch |
| --- | --- |
| Sodium Oxybate, CI | 22.0 |
| Purified Water, USP[2] | 70.0 L |
| Oxybate-Cholestyramine Resinate (PART I & PART II) | — |
| Additional Purified water, USP[2] | 120.0 L |

[1]Quantity based on actual yield after multistage drug resinate complexation
[2]Removed during processing (PART I) Sodium oxybate is dissolved in purified water (45% w/w) and cholestyramine resin is added to it gradually. Stirring is continued at room temperature for 2 hours. The dispersion is then filtered to remove excess sodium oxybate. The wet resinate is treated two times with 35.0 L of purified water. The resinate dispersion is filtered to remove water used for the removal of excess API. The wet resinate (process Stage-1) is dispersed in fresh sodium oxybate solution of Stage-2 and stirred for 2 hours. It is filtered and the wet resinate is treated two times with 35.0 L of Purified water. The resinate dispersion is filtered to remove the water used for the removal of excess API. In the Stage-3 process, the wet resinate of Stage-2 is complexed, filtered and treated two times similar to the Stage-2 process. The resulting wet resinate is dried for a target % LOD of 7% w/w followed by screening through a sieve # 60.

(PART II) Sodium oxybate filtrate from PART I/Stage-1 is used for complexation with the fresh cholestyramine resinate in Part II. The resinate is dispersed in the filtrate and stirred for 2 hours. The complex is filtered and treated two times with 35.0 L of Purified water. The wet complex is used for the next step where PART I/Stage-2 sodium oxybate filtrate is added and stirred for 2 hours. The dispersion is filtered and treated two times with 35.0 L of purified water. The wet complex is used for the next step where PART I/Stage-3 sodium oxybate filtrate is added and stirred for 2 hours. The dispersion is filtered and treated two times with 35.0 L of purified water. Similarly, in the Stage-4 and Stage-5 process, the wet resinate is complexed with Stage-4 and stage-5 sodium oxybate fresh solution for 2 hours followed by filtration and two times treatment with 35.0 L of Purified water.

The wet complex along with the PART I complex are dispersed in the sodium oxybate solution in the PART III step. The dispersion is stirred for 4 hours and filtered followed by treating wet mass with 60 L of purified water. The resulting wet resinate is dried for a target % LOD of 7% w/w followed by screening through a sieve # 50.

The assay of resinate is about 29% w/w of Oxybate, % LOD of about 6.5% w/w and elemental sodium content about 2500 μg/g.

Example 2

In another experiment, sodium content is adjusted by changing the amount of purified water used for each stage of equilibrium. Similar process is following with change in amount of purified water used between each stage for controlling sodium content in the drug resinate complex.

TABLE 2

Uncoated Oxybate-cholestyramine resinate (Example 2)

| | Stage-1 | Stage-2 | Stage-3 | Stage-4 | Stage-5 |
| --- | --- | --- | --- | --- | --- |
| Batch Size[1] | 19.701 kg | | | | |

PART I

| Ingredients | Kg/batch | Kg/batch | Kg/batch | | |
| --- | --- | --- | --- | --- | --- |
| Sodium Oxybate, CI | 8.0 | 8.0 | 8.0 | | |
| Purified Water, USP[2] | 40.0 L | 32.0 L | 32.0 L | | |
| Cholestyramine Resin, USP | 8.0 | Stage-1 Resinate | Stage-2 Resinate | | |
| Sodium Oxybate Filtrate | ~30 L | ~32 L | ~32 L | | |
| Additional Purified water, USP[2] | 48.0 L | 48.0 L | 48.0 L | | |

PART II

| Ingredients | Kg/batch | Kg/batch | Kg/batch | | |
| --- | --- | --- | --- | --- | --- |
| Sodium Oxybate Filtrate | PART I/Stage-1 | PART I/Stage-2 | PART I/Stage-3 | NA | NA |
| Sodium Oxybate, CI | NA | NA | NA | 8.0 | 8.0 |
| Purified Water, USP[2] | 2 L | 1 L | 1 L | 32.0 L | 32.0 L |
| Cholestyramine Resin, USP | 8.0 | Part II/Stage-1 Resinate | Part II/Stage-2 Resinate | PART II/Stage-3 Resinate | PART II/Stage-4 Resinate |

PART I

| | Kg/batch | Kg/batch | Kg/batch | | |
| --- | --- | --- | --- | --- | --- |
| Additional Purified water, USP[2] | 48.0 L | 48.0 L | 48.0 L | 48.0 L | 48.0 L |

PART III

| Ingredients | Kg/batch |
| --- | --- |
| Sodium Oxybate, CI | 17.6 |
| Purified Water, USP2 | 56.0 L |
| Oxybate-Cholestyramine Resinate (PART I & PART II) | — |
| Additional Purified water, USP[2] | 96.0 L |

[1]Quantity based on actual yield after multistage drug resinate complexation
[2]Removed during processing The assay of resinate is about 29% w/w of Oxybate, % LOD of about 6.5% w/w and elemental sodium content about 3000 μg/g.

Example 3

In another experiment (Example 3), sodium content is controlled by changing the amount of purified water used for the final stage of equilibrium. Similar process is followed as Example 1 with a change in amount of purified water used between each stage of complexation process.

TABLE 3

Uncoated Oxybate-cholestyramine resinate (Example 3)

| | Stage-1 | Stage-2 | Stage-3 | Stage-4 | Stage-5 |
| --- | --- | --- | --- | --- | --- |
| Batch Size[1] | 19.701 kg | | | | |

PART I

| Ingredients | Kg/batch | Kg/batch | Kg/batch | | |
| --- | --- | --- | --- | --- | --- |
| Sodium Oxybate, CI | 8.0 | 8.0 | 8.0 | | |
| Purified Water, USP[2] | 40.0 L | 32.0 L | 32.0 L | | |

TABLE 3-continued

Uncoated Oxybate-cholestyramine resinate (Example 3)

|  | Stage-1 | Stage-2 | Stage-3 | Stage-4 | Stage-5 |
|---|---|---|---|---|---|
| Cholestyramine Resin, USP | 8.0 | Stage-1 Resinate | Stage-2 Resinate |  |  |
| Sodium Oxybate Filtrate | ~30 L | ~32 L | ~32 L |  |  |
| Additional Purified water, USP[2] | 48.0 L | 48.0 L | 48.0 L |  |  |

PART II

| Ingredients | Kg/batch | Kg/batch | Kg/batch |  |  |
|---|---|---|---|---|---|
| Sodium Oxybate Filtrate | PART I/ Stage-1 | PART I/ Stage-2 | PART I/ Stage-3 | NA | NA |
| Sodium Oxybate, CI | NA | NA | NA | 8.0 | 8.0 |
| Purified Water, USP[2] | 2 L | 1 L | 1 L | 32.0 L | 32.0 L |
| Cholestyramine Resin, USP | 8.0 | Part II/ Stage-1 Resinate | Part II/ Stage-2 Resinate | PART II/ Stage-3 Resinate | PART II/ Stage-4 Resinate |
| Additional Purified water, USP[2] | 48.0 L | 48.0 L | 48.0 L | 48.0 L | 48.0 L |

PART III

| Ingredients | Kg/batch |
|---|---|
| Sodium Oxybate, CI | 17.6 |
| Purified Water, USP[2] | 56.0 L |
| Oxybate-Cholestyramine Resinate (PART I & PART II) | — |
| Additional Purified water, USP[2] | 280.0 L |

[1] Quantity based on actual yield after multistage drug resinate complexation
[2] Removed during processing
The assay of resinate is about 28% w/w of Oxybate, % LOD of about 6.0% w/w and elemental sodium content about 30 µg/g.

Example 4

In another experiment (Example 4), sodium content is controlled by changing the amount of purified water used for final stage of equilibrium. Similar process is followed as Example 1 with change in amount of purified water used in the final stage of complexation process.

TABLE 4

Uncoated Oxybate-cholestyramine resinate (Example 4)

|  | Stage-1 | Stage-2 | Stage-3 | Stage-4 | Stage-5 |
|---|---|---|---|---|---|
| Batch Size | 19.701 kg |  |  |  |  |

PART I

| Ingredients | Kg/batch | Kg/batch | Kg/batch |  |  |
|---|---|---|---|---|---|
| Sodium Oxybate, CI | 8.0 | 8.0 | 8.0 |  |  |
| Purified Water, USP[2] | 40.0 L | 32.0 L | 32.0 L |  |  |
| Cholestyramine Resin, USP | 8.0 | Stage-1 Resinate | Stage-2 Resinate |  |  |
| Sodium Oxybate Filtrate | ~32 L | ~32 L | ~32 L |  |  |
| Additional Purified water, USP[2] | 48.0 L | 48.0 L | 48.0 L |  |  |

PART II

| Ingredients | Kg/batch | Kg/batch | Kg/batch |  |  |
|---|---|---|---|---|---|
| Sodium Oxybate Filtrate | PART I/ Stage-1 | PART I/ Stage-2 | PART I/ Stage-3 | NA | NA |
| Sodium Oxybate, CI | NA | NA | NA | 8.0 | 8.0 |
| Purified Water, USP[2] | 2 L | 1 L | 1 L | 32.0 L | 32.0 L |
| Cholestyramine Resin, USP | 8.0 | Part II/ Stage-1 Resinate | Part II/ Stage-2 Resinate | PART II/ Stage-3 Resinate | PART II/ Stage-4 Resinate |
| Additional Purified water, USP[2] | 48.0 L | 48.0 L | 48.0 L | 48.0 L | 48.0 L |

PART III

| Ingredients | Kg/batch |
|---|---|
| Sodium Oxybate, CI | 17.6 |
| Purified Water, USP[2] | 24.0 L |
| Oxybate-Cholestyramine Resinate (PART I & PART II) | — |
| Additional Purified water, USP[2] | 186.0 L |

[1] Quantity based on actual yield after multistage drug resinate complexation
[2] Removed during processing
The assay of resinate is about 28% w/w of Oxybate, % LOD of about 6.0% w/w and elemental sodium content about 360 µg/g.

Example 5 and Example 6

A. Coated Oxybate-Cholestyramine Resinate

The coated oxybate-cholestyramine resinate can be prepared by coating the resin particles using water-insoluble film forming polymer/s. Combination of Polyvinyl acetate-based aqueous coating system and ethyl acrylate & methyl methacrylate copolymer dispersion is used as one of the approaches (Table 5).

TABLE 5

Formulation of coated oxybate resinate

|  | Batch size | | |
|---|---|---|---|
|  | 22.491 kg (Example 6) | 23.459 kg (Example 5) |  |
| Ingredients | Kg/batch | Kg/batch | % w/w |
| Purified Water, USP[1] | 9.500 | 11.340 |  |
| Triacetin, USP | 0.149 | 0.178 | 0.6% |
| Talc, USP | 0.149 | 0.178 | 0.6% |

TABLE 5-continued

Formulation of coated oxybate resinate

| | Batch size | | |
|---|---|---|---|
| | 22.491 kg (Example 6) | 23.459 kg (Example 5) | |
| Ingredients | Kg/batch | Kg/batch | % w/w |
| Polyvinyl Acetate Dispersion 30% (KOLLICOAT® SR30D) pH-independent barrier coating layer | 10.450 | 12.474 | 13.3% |
| pH-independent [EUDRAGIT® NM 30D] Ethyl Acrylate & Methyl Methacrylate Copolymer Dispersion, NF pH-independent barrier coating layer | 6.650 | 7.938 | 8.5% |
| Uncoated Oxybate-Cholestyramine Resinate | 17.500 (prepared as in Example 4) | 18.00 (preparing as in Example 3) | 77% |
| Elemental sodium content (μg/g) | 360 | 30 | |

[1] Removed during processing

Triacetin is dissolved in purified water and upon mixing, talc is added to it. The dispersion is stirred for 15 minutes and divided into two equal parts; one part is added gradually to a polyvinyl acetate dispersion with stirring while the other is added to ethyl acrylate & methyl methacrylate copolymer dispersion. Both of the dispersions are mixed together gradually and stirred for 1 hour, followed by screening through Screen #60. The oxybate-cholestyramine resinate with different level of sodium content are coated in fluid bed coater (VFC FLO-COATER VFC-60) using the prepared dispersion at a product temperature of about 22° C. to 27° C. The coated particles are cured and screened through Sieve #45. Coated oxybate resinate particles are tested in vitro for release of oxybate. The dissolution conditions are: USP App. II (Paddle), 75 RPM, 1 L Vessel, 0.02 N HCl with pH change after 2 hours. Results are summarized in FIG. 1.

Examples 7-13

The release of oxybate from coated oxybate resinate complex is dependent on the amount of sodium content in the drug resinate complex as presented below. Faster release observed with higher sodium content in the oxybate resinate complex at the same level of barrier coating.

Release rate of the oxybate from the oxybate resinate is further controlled by application of additional extended-release coating using water-insoluble film forming polymer/s or with pH-independent or pH-dependent water-insoluble film forming polymer/s.

Examples 1, 2, and 3 oxybate resinate are coated with 30% w/w of pH independent water insoluble barrier coating followed by additional polyvinyl acetate-based aqueous coating system as one of the approaches.

Figure 2:
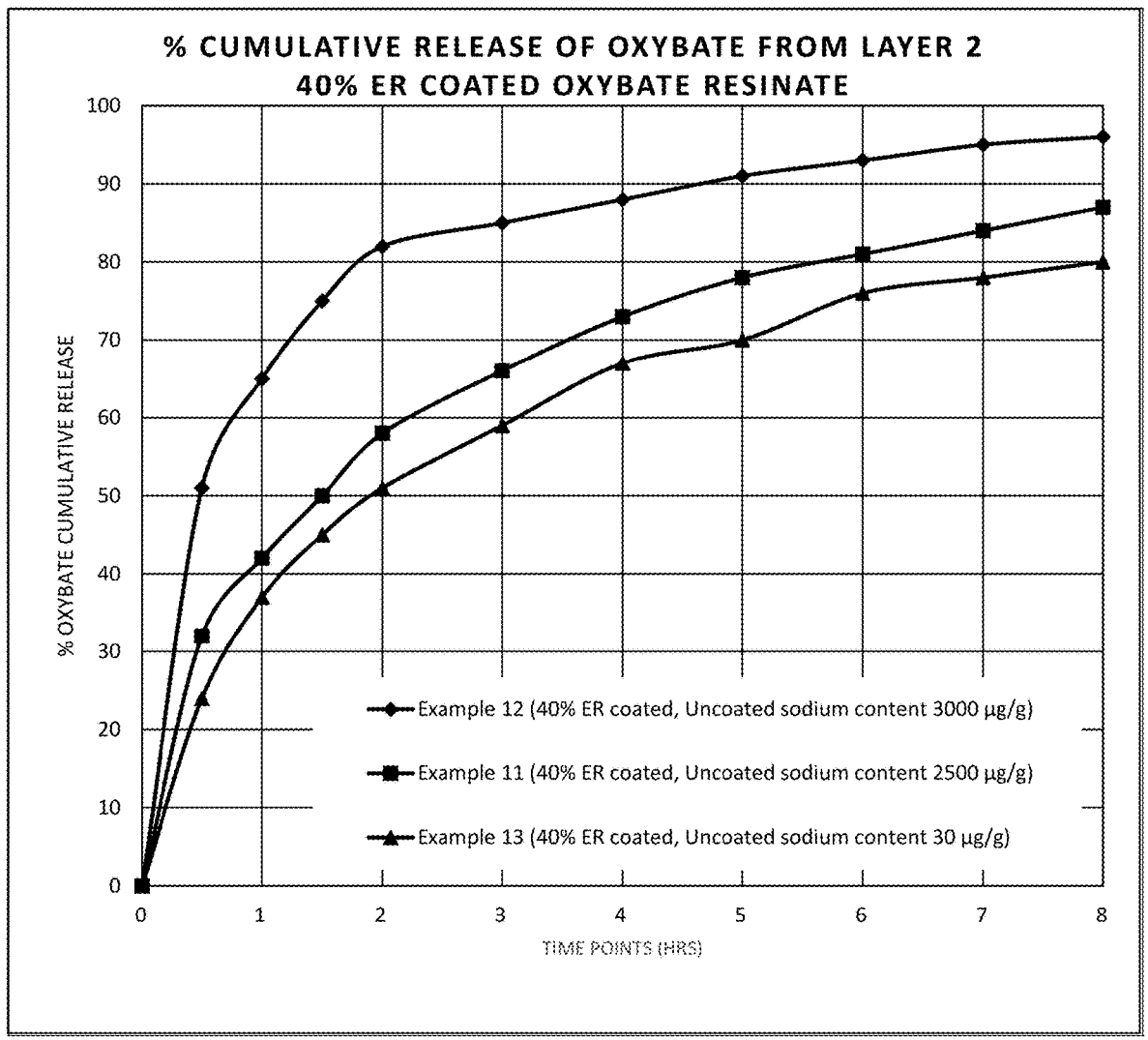
FIG. 2 provides the percentage of cumulative release of oxybate from a two-layer, 40% delayed, extended release (DER) coated oxybate—anion exchange resin complex (resinate) as described in Example 12 (40% DER coated resinate, 3000 µg/g uncoated sodium content), Example 11 (40% DER coated resinate, uncoated sodium content 2500 µg/mg), or Example 19 (40% DER coated resinate, uncoated sodium content 30 µg/g).

Coating solution prepared by first preparing plasticizer solution of triacetin by dissolving in purified water and added gradually to polyvinyl acetate dispersion with stirring. The dispersion is stirred for 60 minutes and screened through Screen #40 (Step-1). The oxybate-cholestyramine resinate is coated in a fluid bed coater (FLM-5) using the Step-1 dispersion at product temperature of about 29° C. to 37° C. The coated particles are cured in an oven and screened through sieve #40. Coated oxybate resinate particles are tested in vitro for release of oxybate. The dissolution conditions are: USP App. II (Paddle), 75 RPM, 1 L Vessel, 0.02 N HCl with pH change after 2 hours. Results are summarized in FIG. 2.

TABLE 6

Extended release Coated Oxybate-cholestyramine resinate

| | Final Batch size | | |
|---|---|---|---|
| | 2.9325 kg (Example 11) | 3.158 kg (Example 12) | 3.158 kg (Example 13) |
| Ingredients | Kg/batch | Kg/batch | Kg/batch |
| Purified Water, USP[1] | 1.4700 | 1.4700 | 1.4700 |
| Triacetin, USP | 0.0231 | 0.0231 | 0.0231 |
| Talc, USP | 0.0231 | 0.0231 | 0.0231 |
| Polyvinyl Acetate Dispersion 30% (KOLLICOAT® SR30D) pH-independent barrier coating layer | 1.617 | 1.617 | 1.617 |
| pH-independent [EUDRAGIT® NM 30D] Ethyl Acrylate & Methyl Methacrylate Copolymer Dispersion, NF pH-independent barrier coating layer | 1.029 | 1.029 | 1.029 |
| Purified Water, USP[1] | 1.9552 | 1.9552 | 1.9552 |
| Triacetin, USP | 0.0523 | 0.0523 | 0.0523 |
| Polyvinyl Acetate Dispersion 30% (KOLLICOAT® SR30D) pH-independent barrier coating layer | 3.4925 | 3.4925 | 3.4925 |
| Coated oxybate resinate | 2.2500 (Example 8) | 2.2500 (Example 9) | 2.2500 (Example 10) |
| Uncoated Oxybate-Cholestyramine Resinate | 2.2500 (Prepared as in Example 1) | 2.2500 (Prepared as in Example 2) | 2.2500 (Prepared as in Example 3) |
| Elemental sodium content (μg/g) | 2500 | 3000 | 30 |

[1] Removed during processing

40% weight gain coating is applied on already coated oxybate resinate. Faster release of oxybate is observed with higher sodium content in the oxybate resinate complex at the same level of barrier coating.

The delayed extended-release (DER) coated oxybate-cholestyramine resinate can be prepared by coating the resin particles using water-insoluble film forming polymer/s followed by coating with pH dependent polymeric coating system/s. In one of the approaches, water-insoluble coating system, combination of Polyvinyl acetate-based aqueous coating system and ethyl acrylate & methyl methacrylate copolymer dispersion, (pH-independent) was used followed by a blended pH-dependent/pH-independent methacrylic acid-based coating system (pH-dependent).

TABLE 7

| | Final Batch size | | |
|---|---|---|---|
| | 3.4887 kg (Example 17) | 3.4887 kg (Example 18) | 3.4887 kg (Example 19) |
| Ingredients | Kg/batch | Kg/batch | Kg/batch |
| Purified Water, USP[1] | 1.4700 | 1.4700 | 1.4700 |
| Triacetin, USP | 0.0231 | 0.0231 | 0.0231 |

TABLE 7-continued

|  | Final Batch size | | |
| --- | --- | --- | --- |
| Ingredients | 3.4887 kg (Example 17) Kg/batch | 3.4887 kg (Example 18) Kg/batch | 3.4887 kg (Example 19) Kg/batch |
| Talc, USP | 0.0231 | 0.0231 | 0.0231 |
| Polyvinyl Acetate Dispersion 30% (KOLLICOAT ® SR30D) pH-independent barrier coating layer | 1.617 | 1.617 | 1.617 |
| pH-independent [EUDRAGIT ® NM 30D] Ethyl Acrylate & Methyl Methacrylate Copolymer Dispersion, NF pH-independent barrier coating layer | 1.029 | 1.029 | 1.029 |
| Purified Water, USP[1] | 2.1900 | 2.1900 | 2.1900 |
| Polysorbate 80, NF | 0.0111 | 0.0111 | 0.0111 |
| Mono- and Di-glycerides, NF | 0.0279 | 0.0279 | 0.0279 |
| Dibutyl Sebacate, NF | 0.0540 | 0.0540 | 0.0540 |
| Methacrylic Acid Copolymer Dispersion, NF (Eudragit L30D-55)[1] | 1.8450 | 1.8450 | 1.8450 |
| Ethyl Acrylate & Methyl Methacrylate Copolymer Dispersion, NF (Eudragit NM 30D) | 1.8450 | 1.8450 | 1.8450 |
| Coated oxybate resinate | 2.4000 (Example 14) | 2.4000 (Example 15) | 2.4000 (Example 16) |
| Uncoated Oxybate-Cholestyramine Resinate | 2.2500 (Example 1) | 2.2500 (Example 2) | 2.2500 (Example 3) |
| Elemental sodium content (µg/g) | 2500 | 3000 | 30 |

[1]Removed during processing

For the methylacrylic acid dispersion-based blended coating layer, purified water was heated. Polysorbate 80, Mono-/Di-glycerides and Dibutyl sebacate (plasticizer) were dispersed in heated purified water. The dispersion was split into two equal quantities. One portion of plasticizer dispersion was added to the pH-dependent Methacrylic acid copolymer enteric coat dispersion system while the other portion was added to the pH-independent Ethyl Acrylate & Methyl Methacrylate Copolymer barrier coating dispersion. The two dispersions were mixed for 15 minutes. Stirring was continued for about 2 hours followed by screening through Sieve #40. The barrier coated oxybate-cholestyramine resinate was further coated with the blended pH-independent/pH-dependent layer in a fluid bed coater at product temperature of about 22° C. to 30° C. The resulting coated particles were cured and screened through Sieve #40.

Figure 3:
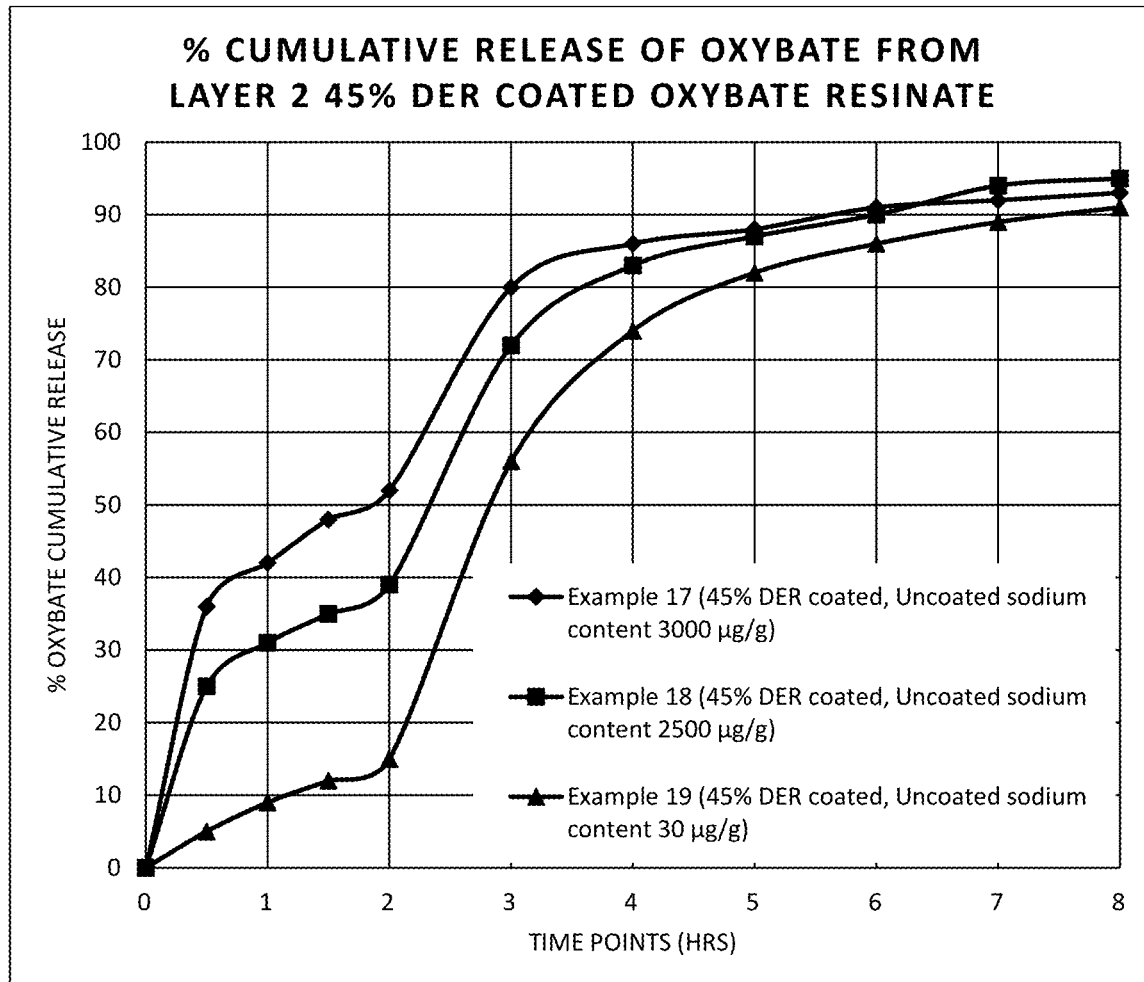
FIG. 3 provides the percentage of cumulative release of oxybate from a two layer 45% delayed, extended release (DER) coated oxybate—anion exchange resin complex (resinate) as described in Example 17 (45% DER coated resinate, 3000 µg/g uncoated sodium content) Example 18 (45% DER coated resinate, uncoated sodium content 2500 µg/mg), or Example 19 (45% DER coated resinate, uncoated sodium content 30 µg/g).

45% weight gain DER coating is applied on already coated oxybate resinate. Intermediates (Examples 17, 18, and 19) are studied for in vitro drug release. The data is summarized in FIG. 3. The dissolution conditions are: USP App. II (Paddle), 75 RPM, 1 L Vessel, 0.02 N HCl with pH change after 2 hours. Prominent enteric protection is observed in the lower sodium content in the oxybate resinate complex at the same level of barrier coating and accordingly slower release was observed.

Examples 20-23: Effect of Calcium Chloride on Release of ER POS

Oxybate extended-release powder for suspension (ER POS) is prepared by combination of different proportions of the uncoated oxybate resinate, diffusion barrier coated oxybate resinate and other excipients such as Silicon dioxide (Syloid 244FP), Sodium Methyl paraben, Sodium Propyl paraben, Povidone, USP (Kollidon K30), Sucralose, Carrageen (Gelcarin GP-911), Potassium bicarbonate, Gellan gum, Calcium Chloride Dihydrate, Hypromellose K100M, Pearlitol 100SD, Eudragit L100, Titanium Dioxide, Microcrystalline Cellulose, NF (Avicel® PH 102). One of the functional excipients is calcium chloride which contribute toward the immediate release dose of the formulation.

Four different levels of calcium chloride formulations are prepared as per Table 8 and tested in vitro for release of oxybate from the reconstituted suspension. Dissolution testing: USP type II, 65 rpm, pH change method—0.02 N HCl for 2 hours followed by pH 6 using phosphate buffer.

TABLE 8

| ER POS Formulation Ingredient Masses | | | | |
| --- | --- | --- | --- | --- |
| Ingredient | Example 20 g/Unit | Example 21 g/Unit | Example 22 g/Unit | Example 23 g/Unit |
| Calcium Chloride Dihydrate | 0.074 (1 mEq to Cl−) | 0.294 (4 mEq to Cl−) | 0.588 (8 mEq to Cl−) | 0.882 (12 mEq to Cl−) |

Figure 4:
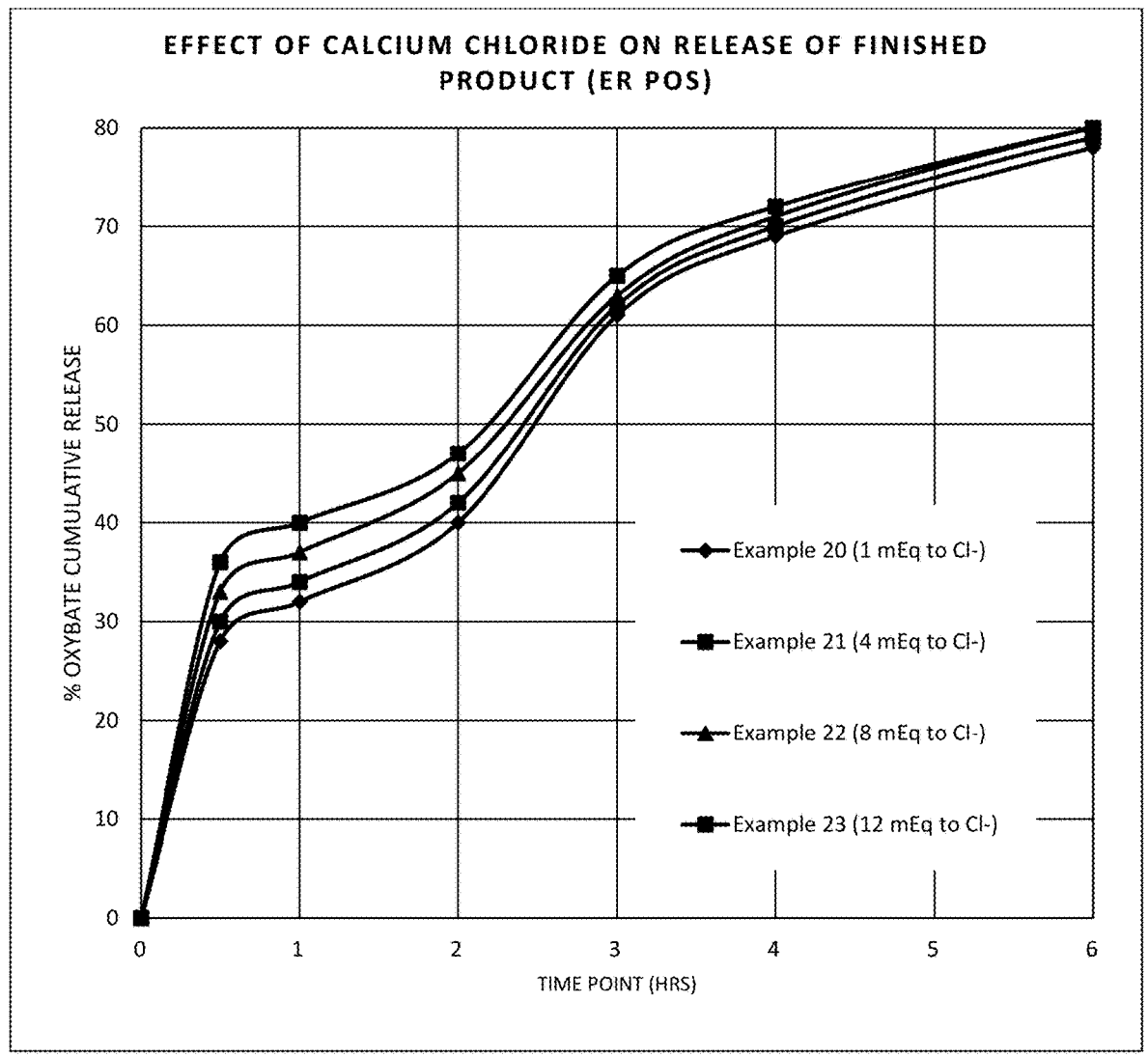
FIG. 4 provides the results of the effect of calcium chloride on the release of a finished ER POS product of Example 20 (1 mEq to Cl—), Example 21 (4 mEq to Cl—), Example 22 (8 mEq to Cl—), and Example 23 (12 mEq to Cl—) over 6 hours.

With higher calcium chloride amount, higher initial release of oxybate is observed as presented in FIG. 4.

B. A finished product, Oxybate extended-release powder for suspension (ER POS) is prepared by combining uncoated oxybate resinate, diffusion barrier coated oxybate resinate, and delayed extended release coated oxybate resinate with other excipients such as Silicon dioxide (Syloid 244FP), Sodium Methyl paraben, Sodium Propyl paraben, Povidone, USP (Kollidon K30), Sucralose, Carrageenan, Potassium bicarbonate, Gellan gum, Calcium Chloride Dihydrate, Hypromellose K100M, Pearlitol 100SD, Eudragit L100, Titanium Dioxide, Microcrystalline Cellulose, NF (Avicel® PH 102) and calcium chloride. The formulation contains 6 mEq of Calcium chloride and less than 100 mg of sodium.

TABLE 9

| # | Description | g/9 g dose | g/7.5 g dose | g/6 g dose | g/4.5 g dose | g/1 g dose | % w/w |
| --- | --- | --- | --- | --- | --- | --- | --- |
| 1 | Uncoated Oxybate Resinate | 16.679 | 13.899 | 11.119 | 8.340 | 1.853 | 37.064 |
|  | Sodium Oxybate, CI | 6.120 | 5.100 | 4.080 | 3.060 | 0.680 |  |
|  | Cholestyramine Resin, USP | 13.396 | 11.163 | 8.931 | 6.698 | 1.488 |  |
| 2 | ER Coated Oxybate Resinate Uncoated Oxybate Resinate | 4.230 | 3.525 | 2.820 | 2.115 | 0.470 | 9.400 |
|  | Sodium Oxybate, CI | 0.990 | 0.825 | 0.660 | 0.495 | 0.110 |  |
|  | Cholestyramine Resin, USP DER Coated Oxybate Resinate (30% coat weight) | 2.167 | 1.806 | 1.445 | 1.083 | 0.241 |  |

TABLE 9-continued

| # | Description | g/9 g dose | g/7.5 g dose | g/6 g dose | g/4.5 g dose | g/1 g dose | % w/w |
|---|---|---|---|---|---|---|---|
| | Polyvinyl Acetate Dispersion 30% (Kollicoat SR 30D Coating) [1] | 0.467 | 0.390 | 0.312 | 0.234 | 0.052 | |
| | Triacetin, USP | 0.022 | 0.019 | 0.015 | 0.011 | 0.002 | |
| | Talc, USP | 0.022 | 0.019 | 0.015 | 0.011 | 0.002 | |
| | Ethyl Acrylate and Methyl Methacrylate Copolymer Dispersion NF (Eudragit® NM 30 D) [1] | 0.297 | 0.248 | 0.198 | 0.149 | 0.033 | |
| | Talc, USP | 0.008 | 0.006 | 0.005 | 0.004 | 0.001 | |
| | ER Coating on Coated Oxybate (20% coat weight) | | | | | | |
| | Polyvinyl Acetate Dispersion 30% (Kollicoat SR 30D Coating) [1] | 0.670 | 0.558 | 0.446 | 0.335 | 0.074 | |
| | Triacetin, USP | 0.033 | 0.028 | 0.022 | 0.017 | 0.004 | |
| | Talc, USP | 0.013 | 0.011 | 0.009 | 0.006 | 0.001 | |
| 3 | DER Coated Oxybate Resinate | 8.412 | 7.010 | 5.608 | 4.206 | 0.935 | 18.693 |
| | Uncoated Oxybate Resinate | | | | | | |
| | Sodium Oxybate, CI | 1.891 | 1.576 | 1.261 | 0.945 | 0.210 | |
| | Cholestyramine Resin, USP | 4.139 | 3.449 | 2.759 | 2.069 | 0.460 | |
| | Coated Oxybate Resinate (30% coat weight) | | | | | | |
| | Polyvinyl Acetate Dispersion 30% (Kollicoat SR 30D Coating) [1] | 0.893 | 0.744 | 0.595 | 0.446 | 0.099 | |
| | Triacetin, USP | 0.043 | 0.035 | 0.028 | 0.021 | 0.005 | |
| | Talc, USP | 0.043 | 0.035 | 0.028 | 0.021 | 0.005 | |
| | Ethyl Acrylate and Methyl Methacrylate Copolymer Dispersion NF (Eudragit® NM 30 D) [1] | 0.568 | 0.473 | 0.379 | 0.284 | 0.063 | |
| | Talc, USP | 0.015 | 0.012 | 0.010 | 0.007 | 0.002 | |
| | Methacrylic Acid Copolymer Dispersion, NF (Eudragit® L30D-55) [1] | 0.774 | 0.645 | 0.516 | 0.387 | 0.086 | |
| | Ethyl Acrylate and Methyl Methacrylate Copolymer Dispersion NF (Eudragit® NM 30 D) [1] | 0.774 | 0.645 | 0.516 | 0.387 | 0.086 | |
| | Mono- and Di-glycerides, NF | 0.040 | 0.034 | 0.027 | 0.020 | 0.004 | |
| | Tween 80 (Polysorbate 80) | 0.016 | 0.013 | 0.010 | 0.008 | 0.002 | |
| | Dibutyl Sebacate, NF | 0.075 | 0.063 | 0.050 | 0.038 | 0.008 | |
| | Talc, USP | 0.020 | 0.016 | 0.013 | 0.010 | 0.002 | |
| 4 | Silicon dioxide (Syloid 244FP) | 0.350 | 0.292 | 0.233 | 0.175 | 0.039 | 0.778 |
| 5 | Preservative granules | 1.175 | 0.979 | 0.783 | 0.588 | 0.131 | 2.611 |
| | Povidone, USP | 0.04 | 0.033 | 0.027 | 0.020 | 0.004 | |
| | Propylparaben Sodium, NF | 0.07 | 0.058 | 0.047 | 0.035 | 0.008 | |
| | Methylparaben Sodium, NF | 0.34 | 0.283 | 0.227 | 0.170 | 0.038 | |
| | Sucralose, NF | 0.11 | 0.092 | 0.073 | 0.055 | 0.012 | |
| | Microcrystalline Cellulose, NF | 0.62 | 0.513 | 0.410 | 0.308 | 0.068 | |
| 6 | Carrageenan, NF (Gelcarin® GP-911, NF) | 0.250 | 0.208 | 0.167 | 0.125 | 0.028 | 0.556 |
| 7 | Potassium Bicarbonate USP Anhydrous | 0.800 | 0.667 | 0.533 | 0.400 | 0.089 | 1.778 |
| 8 | Gellan Gum (Kelcogel F) | 0.450 | 0.375 | 0.300 | 0.225 | 0.050 | 1.000 |
| 9 | Calcium Chloride Dihydrate, USP | 0.441 | 0.368 | 0.294 | 0.221 | 0.049 | 0.980 |
| 10 | Hypromellose, USP (METHOCEL™ K100M premium Hydroxypropyl Methylcellulose) | 0.350 | 0.292 | 0.233 | 0.175 | 0.039 | 0.778 |
| 11 | Mannitol, USP (Pearlitol 100SD) | 10.313 | 8.594 | 6.875 | 5.157 | 1.146 | 22.918 |
| 12 | Methacrylic Acid and Methyl Methacrylate Copolymer (1:1), NF (Eudragit® L 100) | 1.000 | 0.833 | 0.667 | 0.500 | 0.111 | 2.222 |
| 13 | Titanium Dioxide, USP | 0.250 | 0.208 | 0.167 | 0.125 | 0.028 | 0.556 |
| 14 | Microcrystalline Cellulose, NF | 0.300 | 0.250 | 0.200 | 0.150 | 0.033 | 0.667 |
| | Total | 45.000 | 37.500 | 30.000 | 22.500 | 5.000 | 100.00 |

The formulation contains less than 100 mg of sodium.

Example 24: Clinical Evaluation of Finished Product, Oxybate Extended-Release Powder for Suspension (ER POS)

A finished product, Oxybate extended-release powder for suspension (ER POS) is prepared by combination of different proportion of the uncoated oxybate resinate and diffusion barrier coated oxybate resinate with other excipients such as Silicon dioxide (Syloid 244FP), Sodium Methyl paraben, Sodium Propyl paraben, Povidone, USP (Kollidon K30), Sucralose, Carrageenan, Potassium bicarbonate, Gellan gum, Calcium Chloride Dihydrate, Hypromellose K100M, Pearlitol 100SD, Eudragit L100, Titanium Dioxide, Microcrystalline Cellulose, NF (Avicel® PH 102) and calcium chloride.

Figure 5:
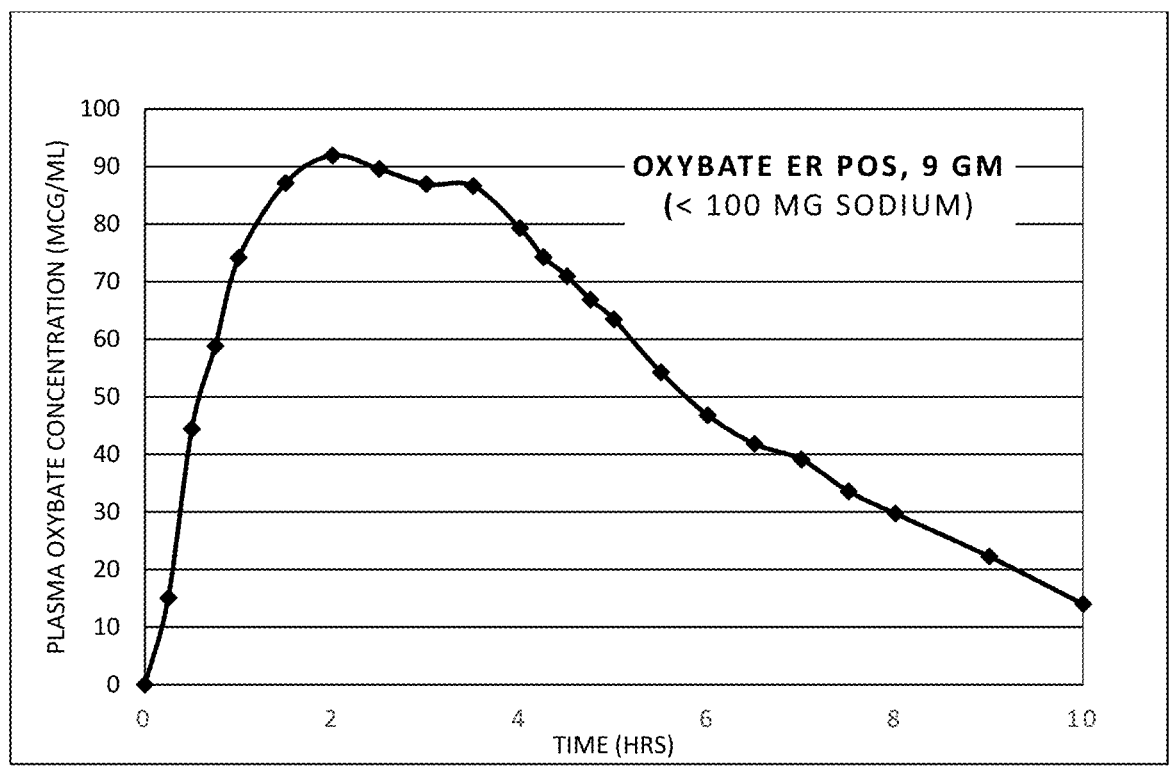
FIG. 5 is a curve showing a plasma concentration curve for oxybate (mcg/mL) over 10 hours provided by an oxybate-release powder for suspension (equivalent to 9 g sodium oxybate).

An Open-label, single-dose, randomized, crossover study was conducted to evaluate extended-release formulation (equivalent of 9 gm of sodium Oxybate) described above. Study was conducted in healthy male and female subjects. The high-fat, high-calorie meal consumed 2 hours prior to administration of extended release once a night formulation. Blood samples from each patient were taken at various time intervals and analyzed by LC/MS for total sodium oxybate content in the plasma. The mean plasma concentration of sodium oxybate over time and a summary of pharmacokinetic paraments is presented below. See, also FIG. 5.

TABLE 10

Summary of PK parameters for Oxybate ER POS, 9 gm
Summary of PK parameters for Oxybate ER POS, 9 gm

|  | Kel (1/hr) | T½ (hr) | Tmax (hr) | Cmax (µg/mL) | AUC t (hr*µg/mL) | AUC inf (hr*µg/mL) |
|---|---|---|---|---|---|---|
| N |  |  |  | 14 |  |  |
| GeoMean | 0.6303 | 1.10 | 1.99 | 105.47 | 520.55 | 535.73 |
| Arith Mean | 0.8191 | 1.71 | 2.16 | 107.01 | 542.03 | 575.78 |
| SD | 0.4824 | 2.05 | 0.95 | 19.02 | 162.88 | 270.89 |
| % CV | 58.90 | 119.49 | 43.91 | 17.78 | 30.05 | 47.05 |
| Median | 0.7843 | 0.88 | 1.75 | 108.00 | 498.78 | 491.36 |
| Minimum | 0.1037 | 0.40 | 1.00 | 80.50 | 325.12 | 348.73 |
| Maximum | 1.7338 | 6.68 | 4.25 | 146.00 | 868.81 | 1386.19 |

All patents, patent publications, and other publications listed in this specification are incorporated herein by reference. While the invention has been described with reference to a particularly preferred embodiment, it will be appreciated that modifications can be made without departing from the spirit of the invention. Such modifications are intended to fall within the scope of the appended claims.

The invention claimed is:

1. An extended release oxybate powder for oral suspension (POS) which provides a once-a-night oxybate dose, said powder for oral suspension comprising a blend of oxybate-containing multiparticulates having different release profiles as defined in (a), (b) and (c):
   (a) immediate release oxybate—anion exchange resin complex multiparticulates which comprises oxybate bound to ion exchange sites in an anion exchange resin;
   (b) pH-independent diffusion barrier coated oxybate—anion exchange resin complex—optional matrix multiparticulates, wherein the pH-independent diffusion barrier coating layer comprises a water-insoluble film-forming polymer which confers an extended release to the oxybate, and wherein the pH-independent diffusion barrier coating layer is over the oxybate—anion exchange resin complex—optional matrix;
   (c) small intestine targeted drug coating system (SITCS) coated oxybate multiparticulates which comprise a blended coating over pH-independent diffusion barrier coated oxybate—anion exchange resin complex—optional matrix multiparticulates, wherein the pH-independent diffusion barrier coating comprises a water-insoluble film-forming polymer, and wherein the pH-independent diffusion barrier coating layer is over the oxybate—anion exchange resin complex—optional matrix; wherein the blended coating comprises a pH-dependent polymer and a pH-independent polymer, wherein the SITCS coating confers a delayed and extended release profile to the oxybate in the coated oxybate—anion exchange resin—optional matrix of (c), and
   wherein the oxybate—anion exchange resin complex—optional matrix of (b) or (c) comprise oxybate bound to ion exchange sites in an anion exchange resin in an optional matrix, wherein when in a matrix, the oxybate—anion exchange complex—matrix further comprises at least one hydrophilic or hydrophobic polymer, wherein the complex—optional matrix in (b) or (c) may be the same or may differ from each other;
   (d) a floating interpenetrating polymer network (IPN) forming system and
   wherein the POS contains less than the equivalent of 200 mg of total sodium per 9 gm oxybate dose of the POS.

2. The extended release oxybate powder for oral suspension (POS) of claim 1, wherein about 10% w/w to about 80% w/w of the total oxybate in the POS is in the immediate release multiparticulates (a).

3. The extended release oxybate powder for oral suspension (POS) of claim 1, wherein about 30% w/w to about 75% w/w of the total oxybate in the POS is in the immediate release multiparticulates (a).

4. The extended release oxybate powder for oral suspension (POS) of claim 1, wherein about 50% w/w to about 70% w/w of the total oxybate in the POS is in the immediate release multiparticulates (a).

5. The extended release oxybate powder for oral suspension (POS) of claim 1, wherein about 25% w/w to about 70% w/w of the total oxybate in the POS is in the extended release components (b) and (c).

6. The extended release oxybate powder for oral suspension (POS) of claim 1, wherein about 25% w/w to about 50% w/w of the total oxybate in the POS is in the extended release components (b) and (c).

7. The extended release oxybate powder for oral suspension (POS) of claim 1, wherein about 40% w/w of the total oxybate in the POS is in the extended release components (b) and (c).

8. The extended release oxybate powder for oral suspension (POS) of claim 1, wherein about 5% w/w to about 30% w/w of the total oxybate in the POS is in the extended release components.

9. The extended release oxybate powder for oral suspension (POS) of claim 8, wherein about 10% w/w to about 15% w/w of the total oxybate in the POS is in extended release components (b).

10. The extended release oxybate powder for oral suspension (POS) of claim 1, wherein the POS contains the equivalent of 175 mg or less of total sodium per 9 gm dose.

11. The extended release oxybate powder for oral suspension (POS) of claim 1, wherein the POS contains the equivalent of about 5 mg to about 175 mg of total sodium per 9 gm dose.

12. The extended release oxybate powder for oral suspension (POS) of claim 1, wherein the POS contains the equivalent of about 150 mg of total sodium per 9 gm dose.

13. The extended release oxybate powder for oral suspension (POS) of claim 1, wherein the POS contains the equivalent of about 1 g, 4.5 g, 6 g, 7.5 g, 9 g, or 10 gm dose oxybate, as determined based on the equivalent of sodium oxybate.

14. The extended release oxybate powder for oral suspension (POS) of claim 1, wherein the floating IPN system comprises a calcium chloride equivalent comprising one or more of: magnesium chloride, sodium chloride, zinc chloride, potassium chloride, calcium carbonate, potassium carbonate, sodium bicarbonate and/or combination thereof.

15. The extended release oxybate powder for oral suspension (POS) of claim 1, wherein the oxybate—anion exchange resin complex of (b) and/or (c) comprises about 15% w/w to about 35% w/w oxybate, based on the total weight of the oxybate—anion exchange resin complex absent any matrix or coating component.

16. The extended release oxybate powder for oral suspension (POS) of claim 12, wherein the oxybate—anion exchange resin complex of (b) and/or (c) comprises 25% w/w to about 30% w/w oxybate, based on the total weight of the oxybate—anion exchange resin complex absent any matrix or coating component.

17. The extended release oxybate powder for oral suspension (POS) of claim 1, wherein the extended release coated oxybate—anion exchange resin complex of (b) and/or (c) comprises a matrix in an amount of about 20% w/w to about 40% w/w matrix forming polymer, based on the total weight of the oxybate—anion exchange resin complex—matrix, absent any coating component.

18. The extended release oxybate power for oral suspension (POS) of claim 1, wherein the floating IPN forming system comprises two independently crosslinked polymers cross-linked to at least one crosslinking agent, an optional gas generating agent, and the ionic equivalent of about 1 mEq to about 12 mEq of chloride ions per 9 gm oxybate dose of the POS.

19. The extended release oxybate power for oral suspension (POS) of claim 1, wherein the POS further comprises one or more of a potassium bicarbonate, a calcium carbonate, carrageenan gum, gellan gum, a pH adjuster, a polysorbate, a glidant, a bulking agent, a filler, a colorant, or combinations thereof.

20. An extended release oxybate powder for oral suspension (POS) composition which provides a once-a-night oral oxybate dose comprising:
(a) oxybate-containing multiparticulates having different release profiles as defined in (i), (ii) and (iii):
(i) immediate release oxybate—anion exchange resin complex multiparticulates which comprises oxybate bound to ion exchange sites in an anion exchange resin;
(ii) extended release oxybate—anion exchange resin complex multiparticulates which comprise an oxybate—anion exchange resin complex multiparticulates comprising a first diffusion barrier coating layer which comprises a pH-independent, water-insoluble film-forming polymer which confers an extended release to the oxybate, wherein the first diffusion barrier coating layer is over the oxybate—anion exchange resin complex;
(iii) delayed extended-release coated oxybate multiparticulates which comprise:
an oxybate—anion exchange resin complex;
a pH-independent diffusion barrier coating which is a first coating over the oxybate—anion exchange resin complex and comprises a water-insoluble film-forming polymer which confers an extended release profile to the oxybate in the coated oxybate—anion exchange resin of (iii);
a second coating over the diffusion barrier coated oxybate—anion exchange resin complex, wherein the second coating comprises a blend having a pH-dependent polymer and a pH-independent polymer which confers a delayed and extended release profile to the oxybate in the coated oxybate—anion exchange resin complex,
wherein the first coating and the second coating confer a delayed and extended release profile to the oxybate in the coated oxybate—anion exchange resin of (iii), and
wherein the oxybate—anion exchange resin complex of (i), (ii) and (iii) comprise oxybate bound to ion exchange sites in an anion exchange resin; and
(b) one or more of at least two anionic hydrophilic polymers, at least one ionic cross-linking agent for the at least two anionic polymers, a gas generating agent, and a non-ionic hydrophilic polymer, microcrystalline cellulose, and at least one preservative;
wherein the POS contains less than the equivalent of 200 mg of total sodium per 9 gm oxybate dose of the POS.

21. The extended release oxybate powder for oral suspension (POS) of claim 20, wherein the second coating of (iii) comprises a blend of about 40% w/w to about 60% w/w enteric coating polymer/copolymer to about 60% w/w to 40% w/w pH-independent barrier coating polymer/copolymer, based on the weight of polymers/copolymers in the second coating.

22. The extended release oxybate powder for oral suspension (POS) of claim 20, wherein the first, inner coating of (iii) comprises about 15% w/w to about 50% w/w of the extended release component, and further comprises a polyvinyl acetate, a stabilizer, and a neutral copolymer comprising an ethyl acrylate and methyl methacrylate.

23. The extended release oxybate powder for oral suspension of claim 20, wherein the outer coating of (iii) comprises about 20% ww/w to about 35% w/w of a blended coating comprising a barrier coating comprising a neutral ethyl acrylate and methyl methacrylate copolymer and an enteric copolymer comprising an anionic methacrylic acid and ethyl acrylate copolymer.

24. The extended release oxybate powder for oral suspension (POS) of claim 20, wherein the first diffusion barrier coating of (ii) comprises about 15% w/w to about 80% w/w of the extended release component, and further comprises a polyvinyl acetate, a stabilizer, and a neutral copolymer comprising on ethyl acrylate and methyl methacrylate.

25. The extended release oxybate powder for oral suspension (POS) of claim 20, wherein the first diffusion barrier coating of (ii) further comprises a second coating over the first coating, the second coating being a barrier coat and comprising 10% w/w to about 40% w/w of a barrier coat comprising polyvinyl acetate and a plasticizer.

26. The extended release oxybate powder for oral suspension (POS) of claim 20, wherein about 25% w/w to about 80% w/w of the total oxybate in the POS is in the immediate release component (i).

27. The extended release oxybate powder for oral suspension (POS) of claim 20, wherein about 25% w/w to about 50% w/w of the total oxybate in the POS is in components (b) and (c).

28. The extended release oxybate powder for oral suspension (POS) of claim 20, wherein about 5% w/w to about 15% w/w of the total oxybate in the POS is in extended release component (ii).

29. The extended release oxybate powder for oral suspension (POS) of claim 20, wherein the extended release component of (ii) comprises a first barrier coat comprising a polyvinyl acetate, a stabilizer, and a neutral copolymer comprising on ethyl acrylate and methyl methacrylate; and a second barrier coat over the first barrier coat, comprising a polyvinyl acetate, a polyvinylpyrrolidone, and a plasticizer.

\* \* \* \* \*